(12) United States Patent
Rosson

(10) Patent No.: US 10,386,584 B2
(45) Date of Patent: Aug. 20, 2019

(54) OPTICAL CONNECTORS WITH LOCKING AND KEYING FEATURES FOR INTERFACING WITH MULTIPORTS

(71) Applicant: Corning Research & Development Corporation, Corning, NY (US)

(72) Inventor: Joel Christopher Rosson, Hickory, NC (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/018,997

(22) Filed: Jun. 26, 2018

(65) Prior Publication Data

US 2019/0004252 A1    Jan. 3, 2019

Related U.S. Application Data

(60) Provisional application No. 62/526,011, filed on Jun. 28, 2017, provisional application No. 62/526,018, (Continued)

(51) Int. Cl.
    *G02B 6/38*    (2006.01)
    *G02B 6/42*    (2006.01)
    *G02B 6/44*    (2006.01)

(52) U.S. Cl.
    CPC .......... *G02B 6/3879* (2013.01); *G02B 6/389* (2013.01); *G02B 6/3825* (2013.01); *G02B 6/3826* (2013.01); *G02B 6/3831* (2013.01); *G02B 6/3837* (2013.01); *G02B 6/3841* (2013.01); *G02B 6/3843* (2013.01); *G02B 6/3851* (2013.01); *G02B 6/3869* (2013.01);
    (Continued)

(58) Field of Classification Search
    USPC .................................... 385/53, 81, 135–139
    See application file for complete search history.

(56) References Cited

U.S. PATENT DOCUMENTS 3,074,107 A    1/1963  Mase et al.
3,532,783 A    10/1970 Pusey et al.
(Continued)

FOREIGN PATENT DOCUMENTS

CN    1213783 A    4/1999
CN    1231430 A    10/1999
(Continued)

OTHER PUBLICATIONS

Brown, "What is Transmission Welding?" Laser Plastic Welding website, 6 pgs, Retrieved on Dec. 7, 2018 from: http://www.laserplasticwelding.com/what-is-transmission-welding.
(Continued)

*Primary Examiner* — Eric Wong
(74) *Attorney, Agent, or Firm* — Michael E. Carroll, Jr.

(57) ABSTRACT

Fiber optic connectors and connectorized fiber optic cables include connector housings having locking portions defined on the connector housing that allow the connector housing to be selectively coupled to a corresponding push-button securing member of a multiport assembly. Methods for selectively connecting a fiber optic connector to, and disconnecting the fiber optic connector from the multiport assemblies allow for connector housings to be forcibly and nondestructively removed from the multiport assembly.

4 Claims, 26 Drawing Sheets

Related U.S. Application Data filed on Jun. 28, 2017, provisional application No. 62/526,195, filed on Jun. 28, 2017.

(52) U.S. Cl.
CPC .......... *G02B 6/3871* (2013.01); *G02B 6/3887* (2013.01); *G02B 6/3889* (2013.01); *G02B 6/3893* (2013.01); *G02B 6/3895* (2013.01); *G02B 6/3897* (2013.01); *G02B 6/4262* (2013.01); *G02B 6/4446* (2013.01); *G02B 6/4471* (2013.01); *G02B 6/3849* (2013.01)

(56) References Cited

U.S. PATENT DOCUMENTS

| | | |
|---|---|---|
| 3,792,284 A | 2/1974 | Kaelin |
| 4,148,557 A | 4/1979 | Garvey |
| 4,188,088 A | 2/1980 | Anderson et al. |
| 4,354,731 A | 10/1982 | Mouissie |
| 4,413,880 A | 11/1983 | Forrest et al. |
| 4,515,434 A | 5/1985 | Margolin et al. |
| 4,560,232 A | 12/1985 | O'Hara |
| 4,615,581 A | 10/1986 | Morimoto |
| 4,634,214 A | 1/1987 | Cannon, Jr. et al. |
| 4,684,205 A | 8/1987 | Margolin et al. |
| 4,688,200 A | 8/1987 | Poorman et al. |
| 4,699,458 A | 10/1987 | Ohtsuki et al. |
| 4,705,352 A | 11/1987 | Margolin et al. |
| 4,715,675 A | 12/1987 | Kevern et al. |
| 4,763,983 A | 8/1988 | Keith |
| 4,783,137 A | 11/1988 | Kosman et al. |
| 4,854,664 A | 8/1989 | McCartney |
| 4,856,867 A | 8/1989 | Gaylin |
| 4,902,238 A | 2/1990 | Iacobucci |
| 4,913,514 A | 4/1990 | Then |
| 4,921,413 A | 5/1990 | Blew |
| 4,960,318 A | 10/1990 | Nilsson et al. |
| 4,961,623 A | 10/1990 | Midkiff et al. |
| 4,964,688 A | 10/1990 | Caldwell et al. |
| 4,995,836 A | 2/1991 | Toramoto |
| 5,007,860 A | 4/1991 | Robinson et al. |
| 5,016,968 A | 5/1991 | Hammond et al. |
| 5,028,114 A | 7/1991 | Krausse et al. |
| 5,058,984 A | 10/1991 | Bulman et al. |
| 5,067,783 A | 11/1991 | Lampert |
| 5,095,176 A | 3/1992 | Harbrecht et al. |
| 5,129,023 A | 7/1992 | Anderson et al. |
| 5,134,677 A | 7/1992 | Leung et al. |
| 5,136,683 A | 8/1992 | Aoki et al. |
| 5,180,890 A | 1/1993 | Pendergrass et al. |
| 5,189,718 A | 2/1993 | Barrett et al. |
| 5,210,810 A | 5/1993 | Darden et al. |
| 5,212,752 A | 5/1993 | Stephenson et al. |
| 5,214,732 A | 5/1993 | Beard et al. |
| 5,263,105 A | 11/1993 | Johnson et al. |
| 5,313,540 A | 5/1994 | Ueda et al. |
| 5,367,594 A | 11/1994 | Essert et al. |
| 5,371,823 A | 12/1994 | Barrett et al. |
| 5,381,494 A | 1/1995 | O'Donnell et al. |
| 5,394,494 A | 2/1995 | Jennings et al. |
| 5,394,497 A | 2/1995 | Erdman et al. |
| 5,408,570 A | 4/1995 | Cook et al. |
| 5,416,874 A | 5/1995 | Giebel et al. |
| 5,553,186 A | 9/1996 | Allen |
| 5,569,050 A | 10/1996 | Lloyd |
| 5,600,747 A | 2/1997 | Yamakawa et al. |
| 5,631,993 A | 5/1997 | Cloud et al. |
| 5,647,045 A | 7/1997 | Robinson et al. |
| 5,682,451 A | 10/1997 | Lee et al. |
| 5,748,821 A | 5/1998 | Schempp et al. |
| 5,781,686 A | 7/1998 | Robinson et al. |
| 5,789,701 A | 8/1998 | Wettengel et al. |
| 5,791,918 A | 8/1998 | Pierce |
| 5,862,290 A | 1/1999 | Burek et al. |
| 5,913,001 A | 6/1999 | Nakajima et al. |
| 5,923,804 A | 7/1999 | Rosson |
| 5,960,141 A | 9/1999 | Sasaki et al. |
| 5,993,070 A | 11/1999 | Tamekuni et al. |
| 6,079,881 A | 6/2000 | Roth |
| 6,108,482 A | 8/2000 | Roth |
| 6,112,006 A | 8/2000 | Foss |
| 6,149,313 A | 11/2000 | Giebel et al. |
| 6,151,432 A | 11/2000 | Nakajima et al. |
| RE37,028 E | 1/2001 | Cooke et al. |
| 6,173,097 B1 | 1/2001 | Throckmorton et al. |
| 6,179,482 B1 | 1/2001 | Takizawa et al. |
| 6,188,822 B1 | 2/2001 | McAlpine et al. |
| 6,206,579 B1 | 3/2001 | Selfridge et al. |
| 6,229,944 B1 | 5/2001 | Yokokawa et al. |
| 6,234,683 B1 | 5/2001 | Waldron et al. |
| 6,234,685 B1 | 5/2001 | Carlisle et al. |
| 6,249,628 B1 | 6/2001 | Rutterman et al. |
| 6,256,438 B1 | 7/2001 | Gimblet |
| 6,261,006 B1 | 7/2001 | Selfridge |
| 6,264,374 B1 | 7/2001 | Selfridge et al. |
| 6,287,016 B1 | 9/2001 | Weigel |
| 6,305,849 B1 | 10/2001 | Roehrs et al. |
| 6,356,390 B1 | 3/2002 | Hall, Jr. |
| 6,356,690 B1 | 3/2002 | McAlpine et al. |
| 6,357,929 B1 | 3/2002 | Roehrs et al. |
| 6,371,660 B1 | 4/2002 | Roehrs et al. |
| 6,375,363 B1 | 4/2002 | Harrison et al. |
| 6,379,054 B2 | 4/2002 | Throckmmton et al. |
| 6,422,764 B1 | 7/2002 | Marrs |
| 6,427,035 B1 | 7/2002 | Mahony |
| 6,439,780 B1 | 8/2002 | Mudd et al. |
| 6,466,725 B2 | 10/2002 | Battey et al. |
| 6,496,641 B1 | 12/2002 | Mahony |
| 6,501,888 B2 | 12/2002 | Gimblet et al. |
| 6,522,804 B1 | 2/2003 | Mahony |
| 6,529,663 B1 | 3/2003 | Parris et al. |
| 6,539,147 B1 | 3/2003 | Mahony |
| 6,540,410 B2 | 4/2003 | Childers et al. |
| 6,542,674 B1 | 4/2003 | Gimblet |
| 6,546,175 B1 | 4/2003 | Wagman et al. |
| 6,579,014 B2 | 6/2003 | Melton et al. |
| 6,599,026 B1 | 7/2003 | Fahrnbauer et al. |
| 6,599,027 B2 | 7/2003 | Miyake et al. |
| 6,614,980 B1 | 9/2003 | Mahony |
| 6,618,526 B2 | 9/2003 | Jackman et al. |
| 6,619,697 B2 | 9/2003 | Griffioen et al. |
| 6,621,964 B2 | 9/2003 | Quinn et al. |
| 6,625,375 B1 | 9/2003 | Mahony |
| 6,648,520 B2 | 11/2003 | McDonald et al. |
| 6,668,127 B1 | 12/2003 | Mahony |
| 6,678,448 B2 | 1/2004 | Maisel et al. |
| 6,685,361 B1 | 2/2004 | Rubino et al. |
| 6,714,708 B2 | 3/2004 | McAlpine et al. |
| 6,714,710 B2 | 3/2004 | Gimblet |
| 6,729,773 B1 | 5/2004 | Finona et al. |
| 6,738,555 B1 | 5/2004 | Cooke et al. |
| 6,748,147 B2 | 6/2004 | Quinn et al. |
| 6,771,861 B2 | 8/2004 | Wagner et al. |
| 6,785,450 B2 | 8/2004 | Wagman et al. |
| 6,789,950 B1 | 9/2004 | Loder et al. |
| 6,809,265 B1 | 10/2004 | Gladd et al. |
| 6,848,838 B2 | 2/2005 | Doss et al. |
| 6,899,467 B2 | 5/2005 | McDonald et al. |
| 6,909,821 B2 | 6/2005 | Ravasio et al. |
| 7,011,454 B2 | 3/2006 | Caveney et al. |
| 7,025,507 B2 | 4/2006 | de Marchi |
| 7,079,734 B2 | 7/2006 | Seddon et al. |
| 7,090,406 B2 | 8/2006 | Melton et al. |
| 7,090,407 B2 | 8/2006 | Melton et al. |
| 7,104,702 B2 | 9/2006 | Barnes et al. |
| 7,111,990 B2 | 9/2006 | Melton et al. |
| 7,113,679 B2 | 9/2006 | Melton et al. |
| 7,120,347 B2 | 10/2006 | Blackwell, Jr. et al. |
| 7,137,742 B2 | 11/2006 | Theuerkorn et al. |
| 7,146,090 B2 | 12/2006 | Vo et al. |
| 7,165,893 B2 | 1/2007 | Schmitz |
| 7,178,990 B2 | 2/2007 | Caveney et al. |
| 7,184,634 B2 | 2/2007 | Hurley et al. |
| 7,204,644 B2 | 4/2007 | Barnes et al. |

(56) References Cited

U.S. PATENT DOCUMENTS

| | | |
|---|---|---|
| 7,213,975 B2 | 5/2007 | Khemakhem et al. |
| 7,228,047 B1 | 6/2007 | Szilagyi et al. |
| 7,241,056 B1 | 7/2007 | Kuffel et al. |
| 7,270,487 B2 | 9/2007 | Billman et al. |
| 7,277,614 B2 | 10/2007 | Cody et al. |
| 7,302,152 B2 | 11/2007 | Luther et al. |
| 7,330,629 B2 | 2/2008 | Cooke et al. |
| 7,333,708 B2 | 2/2008 | Blackwell, Jr. et al. |
| 7,444,056 B2 | 10/2008 | Allen et al. |
| 7,467,896 B2 | 12/2008 | Melton et al. |
| 7,489,849 B2 | 2/2009 | Reagan et al. |
| 7,565,055 B2 | 7/2009 | Reagan et al. |
| 7,621,675 B1 | 11/2009 | Bradley |
| 7,627,222 B2 | 12/2009 | Reagan et al. |
| 7,653,282 B2 | 1/2010 | Blackwell, Jr. et al. |
| 7,680,388 B2 | 3/2010 | Reagan et al. |
| 7,709,733 B1 | 5/2010 | Plankell |
| 7,942,590 B2 | 5/2010 | Lu et al. |
| 7,740,409 B2 | 6/2010 | Bolton et al. |
| 7,753,596 B2 | 7/2010 | Cox |
| 7,785,015 B2 | 8/2010 | Melton et al. |
| 7,806,599 B2 | 10/2010 | Margolin et al. |
| 7,844,148 B2 | 11/2010 | Jenkins et al. |
| 7,844,160 B2 | 11/2010 | Reagan et al. |
| 7,903,923 B2 | 3/2011 | Gronvall et al. |
| 7,918,609 B2 | 4/2011 | Melton et al. |
| 8,025,445 B2 | 9/2011 | Rambow et al. |
| 8,213,761 B2 | 7/2012 | Gronvall et al. |
| 8,218,935 B2 | 7/2012 | Reagan et al. |
| 8,267,596 B2 | 9/2012 | Theuerkorn |
| 8,272,792 B2 | 9/2012 | Coleman et al. |
| RE43,762 E | 10/2012 | Smith et al. |
| 8,301,004 B2 | 10/2012 | Cooke et al. |
| 8,439,577 B2 | 5/2013 | Jenkins |
| 8,465,235 B2 | 6/2013 | Jenkins et al. |
| 8,466,262 B2 | 6/2013 | Siadak et al. |
| 8,520,996 B2 | 8/2013 | Cowen et al. |
| 8,737,837 B2 | 5/2014 | Conner et al. |
| 8,755,654 B1 | 6/2014 | Danley et al. |
| 8,755,663 B2 | 6/2014 | Makrides-Saravanos et al. |
| 8,764,316 B1 | 7/2014 | Barnette et al. |
| 8,770,861 B2 | 7/2014 | Smith et al. |
| 9,513,444 B2 | 12/2016 | Barnette, Jr. et al. |
| 9,551,842 B2 | 1/2017 | Theuerkorn |
| 9,684,138 B2 | 6/2017 | Lu |
| 10,114,176 B2 | 10/2018 | Gimblet et al. |
| 2001/0019654 A1 | 9/2001 | Waldron et al. |
| 2001/0036345 A1 | 11/2001 | Gimble et al. |
| 2002/0062978 A1 | 5/2002 | Sakabe et al. |
| 2002/0064364 A1 | 5/2002 | Battey et al. |
| 2002/0122653 A1 | 9/2002 | Donaldson et al. |
| 2003/0063866 A1 | 4/2003 | Melton et al. |
| 2003/0063867 A1 | 4/2003 | McDonald et al. |
| 2003/0063868 A1 | 4/2003 | Fentress |
| 2003/0063897 A1 | 4/2003 | Heo |
| 2003/0094298 A1 | 5/2003 | Morrow et al. |
| 2003/0099448 A1 | 5/2003 | Gimblet |
| 2004/0047566 A1 | 3/2004 | McDonald et al. |
| 2004/0072454 A1 | 4/2004 | Nakajima et al. |
| 2004/0076377 A1 | 4/2004 | Mizukami et al. |
| 2004/0120662 A1 | 6/2004 | Lail et al. |
| 2004/0120663 A1 | 6/2004 | Lail et al. |
| 2004/0157499 A1 | 8/2004 | Nania et al. |
| 2004/0223699 A1 | 11/2004 | Melton et al. |
| 2004/0223720 A1 | 11/2004 | Melton et al. |
| 2004/0228589 A1 | 11/2004 | Melton et al. |
| 2005/0054237 A1 | 3/2005 | Gladd et al. |
| 2005/0129379 A1 | 6/2005 | Reagan et al. |
| 2005/0175307 A1 | 8/2005 | Battey et al. |
| 2005/0232552 A1 | 10/2005 | Takahashi et al. |
| 2005/0281510 A1 | 12/2005 | Vo et al. |
| 2005/0281514 A1 | 12/2005 | Oki et al. |
| 2006/0045430 A1 | 3/2006 | Theuerkorn et al. |
| 2006/0093278 A1 | 5/2006 | Elkins, II et al. |
| 2006/0120672 A1 | 6/2006 | Cody et al. |
| 2006/0133758 A1 | 6/2006 | Mullaney et al. |
| 2006/0133759 A1 | 6/2006 | Mullaney et al. |
| 2006/0147172 A1 | 7/2006 | Luther et al. |
| 2006/0153503 A1 | 7/2006 | Suzuki et al. |
| 2006/0153517 A1 | 7/2006 | Reagan et al. |
| 2006/0171638 A1 | 8/2006 | Dye |
| 2006/0269204 A1 | 11/2006 | Barth et al. |
| 2006/0269208 A1 | 11/2006 | Allen et al. |
| 2006/0280420 A1 | 12/2006 | Blackwell, Jr. et al. |
| 2006/0283619 A1 | 12/2006 | Kowalczyk et al. |
| 2006/0291787 A1 | 12/2006 | Seddon |
| 2007/0031100 A1 | 2/2007 | Garcia et al. |
| 2007/0031103 A1 | 2/2007 | Tinucci et al. |
| 2007/0077010 A1 | 4/2007 | Melton et al. |
| 2007/0098343 A1 | 5/2007 | Miller et al. |
| 2008/0080817 A1 | 4/2008 | Melton et al. |
| 2008/0138016 A1 | 6/2008 | Katagiyama et al. |
| 2008/0175542 A1 | 7/2008 | Lu et al. |
| 2008/0175544 A1 | 7/2008 | Fujiwara et al. |
| 2008/0175548 A1 | 7/2008 | Knecht et al. |
| 2008/0264664 A1 | 10/2008 | Dinh et al. |
| 2008/0273837 A1 | 11/2008 | Margolin et al. |
| 2009/0060421 A1 | 3/2009 | Parikh et al. |
| 2009/0148101 A1 | 6/2009 | Lu et al. |
| 2009/0148104 A1 | 6/2009 | Lu et al. |
| 2009/0185835 A1 | 7/2009 | Park et al. |
| 2009/0245743 A1 | 10/2009 | Cote et al. |
| 2009/0263097 A1 | 10/2009 | Solheid et al. |
| 2010/0008909 A1 | 1/2010 | Siadak et al. |
| 2010/0014813 A1 | 1/2010 | Ito et al. |
| 2010/0015834 A1 | 1/2010 | Siebens |
| 2010/0054680 A1 | 3/2010 | Lochkovic et al. |
| 2010/0092136 A1 | 4/2010 | Nehp |
| 2010/0172616 A1 | 7/2010 | Lu et al. |
| 2010/0197222 A1 | 8/2010 | Scheucher |
| 2010/0247053 A1 | 9/2010 | Cowen et al. |
| 2010/0272399 A1 | 10/2010 | Griffiths et al. |
| 2010/0303426 A1 | 12/2010 | Davis |
| 2010/0310213 A1 | 12/2010 | Lewallen et al. |
| 2011/0019964 A1 | 1/2011 | Nhep et al. |
| 2011/0108719 A1 | 5/2011 | Ford et al. |
| 2011/0164854 A1 | 7/2011 | Desard et al. |
| 2011/0222826 A1 | 9/2011 | Blackburn et al. |
| 2011/0299814 A1 | 12/2011 | Nakagawa |
| 2012/0008909 A1 | 1/2012 | Mertesdorf et al. |
| 2012/0106912 A1 | 5/2012 | McGranahan et al. |
| 2012/0251063 A1 | 10/2012 | Reagan et al. |
| 2012/0252244 A1 | 10/2012 | Elkins, II et al. |
| 2013/0034333 A1 | 2/2013 | Holmberg et al. |
| 2013/0109213 A1 | 5/2013 | Chang |
| 2014/0016902 A1 | 1/2014 | Pepe et al. |
| 2014/0050446 A1 | 2/2014 | Chang |
| 2014/0079356 A1* | 3/2014 | Pepin ............... G02B 6/3624 385/81 |
| 2014/0133806 A1 | 5/2014 | Hill et al. |
| 2014/0133807 A1 | 5/2014 | Katoh |
| 2014/0161397 A1 | 6/2014 | Gallegos et al. |
| 2014/0205257 A1* | 7/2014 | Durrant ............... G02B 6/3825 385/139 |
| 2014/0219622 A1 | 8/2014 | Coan et al. |
| 2014/0233896 A1 | 8/2014 | Ishigami et al. |
| 2014/0241671 A1 | 8/2014 | Koreeda et al. |
| 2014/0294395 A1 | 10/2014 | Waldron et al. |
| 2014/0328559 A1 | 11/2014 | Kobayashi et al. |
| 2014/0355936 A1 | 12/2014 | Bund et al. |
| 2015/0003788 A1 | 1/2015 | Chen et al. |
| 2015/0036982 A1 | 2/2015 | Nhep et al. |
| 2015/0144883 A1 | 5/2015 | Sendelweek |
| 2015/0185423 A1 | 7/2015 | Matsui et al. |
| 2015/0253528 A1 | 9/2015 | Corbille et al. |
| 2015/0268434 A1 | 9/2015 | Barnette, Jr. et al. |
| 2015/0316727 A1 | 11/2015 | Kondo et al. |
| 2015/0346436 A1 | 12/2015 | Pepe et al. |
| 2016/0131851 A1 | 5/2016 | Theuerkorn |
| 2016/0131857 A1 | 5/2016 | Pimentel et al. |
| 2016/0139346 A1 | 5/2016 | Bund et al. |
| 2016/0154186 A1 | 6/2016 | Gimblet et al. |
| 2016/0161688 A1 | 6/2016 | Nishimura |
| 2016/0161689 A1 | 6/2016 | Nishimura |

(56) References Cited

U.S. PATENT DOCUMENTS

| | | |
|---|---|---|
| 2016/0209599 A1 | 7/2016 | Van Baelen et al. |
| 2016/0246019 A1 | 8/2016 | Ishii et al. |
| 2016/0259133 A1* | 9/2016 | Kobayashi ........... G02B 6/3869 |
| 2016/0306122 A1 | 10/2016 | Tong et al. |
| 2017/0038538 A1 | 2/2017 | Isenhour et al. |
| 2017/0131509 A1 | 5/2017 | Xiao et al. |
| 2017/0139158 A1 | 5/2017 | Coenegracht |
| 2017/0160492 A1 | 6/2017 | Lin et al. |
| 2017/0176690 A1 | 6/2017 | Bretz et al. |
| 2017/0219782 A1 | 8/2017 | Nishimura |
| 2017/0254961 A1* | 9/2017 | Kamada ............... G02B 6/3821 |
| 2017/0261699 A1 | 9/2017 | Compton et al. |
| 2017/0285279 A1 | 10/2017 | Daems et al. |
| 2018/0081127 A1 | 3/2018 | Coenegracht |

FOREIGN PATENT DOCUMENTS

| | | |
|---|---|---|
| CN | 1646962 A | 7/2005 |
| CN | 101195453 A | 6/2008 |
| CN | 201704194 U | 1/2011 |
| CN | 104064903 A | 9/2014 |
| DE | 3537684 A1 | 4/1987 |
| DE | 3737842 C1 | 9/1988 |
| DE | 19805554 A1 | 8/1998 |
| EP | 0026553 A1 | 10/1980 |
| EP | 0 122 566 A2 | 10/1984 |
| EP | 0 130 513 A2 | 1/1985 |
| EP | 0 462 362 A2 | 12/1991 |
| EP | 0 547 788 A1 | 6/1993 |
| EP | 0 468 671 B1 | 1/1996 |
| EP | 0 762 171 A1 | 3/1997 |
| EP | 0 855 610 A2 | 7/1998 |
| EP | 0 856 761 A1 | 8/1998 |
| EP | 0 940 700 A2 | 9/1999 |
| EP | 0 949 522 A2 | 10/1999 |
| EP | 0 957 381 A1 | 11/1999 |
| EP | 0 997 757 A2 | 5/2000 |
| EP | 1 065 542 A1 | 1/2001 |
| EP | 1 258 758 A2 | 11/2002 |
| EP | 1391762 A1 | 2/2004 |
| EP | 0 997 757 B1 | 9/2004 |
| EP | 1 122 566 B1 | 7/2005 |
| EP | 3101740 A1 | 12/2016 |
| EP | 3207223 A1 | 8/2017 |
| ES | 1184287 U | 5/2017 |
| GB | 2 022 284 A | 12/1979 |
| GB | 2 154 333 A | 9/1985 |
| GB | 2 169 094 A | 7/1986 |
| JP | S52-30447 A | 3/1977 |
| JP | S58-142308 A | 8/1983 |
| JP | S62-54204 A | 3/1987 |
| JP | 63-20111 U | 2/1988 |
| JP | S63-89421 A | 4/1988 |
| JP | 63078908 U1 | 5/1988 |
| JP | H05-106765 A | 4/1993 |
| JP | H05-142439 A | 6/1993 |
| JP | 05297246 A | 11/1993 |
| JP | 07318758 A | 12/1995 |
| JP | H08-050211 A | 2/1996 |
| JP | H08-054522 A | 2/1996 |
| JP | H08-062432 A | 3/1996 |
| JP | H08-292331 A | 11/1996 |
| JP | 09049942 A | 2/1997 |
| JP | H09-135526 A | 5/1997 |
| JP | H09-159867 A | 6/1997 |
| JP | H09-203831 A | 8/1997 |
| JP | H09-325223 A | 12/1997 |
| JP | H09-325249 A | 12/1997 |
| JP | H10-170781 A | 6/1998 |
| JP | H10-332953 A | 12/1998 |
| JP | 11064682 A | 3/1999 |
| JP | 11119064 A | 4/1999 |
| JP | 11248979 A | 9/1999 |
| JP | H11-271582 A | 10/1999 |
| JP | H11-281861 A | 10/1999 |
| JP | 11326693 A | 11/1999 |
| JP | H11-337768 A | 12/1999 |
| JP | H11-352368 A | 12/1999 |
| JP | 2000-002828 A | 1/2000 |
| JP | 2001-116968 A | 4/2001 |
| JP | 2001290051 A | 10/2001 |
| JP | 2002-520987 A | 7/2002 |
| JP | 2003-009331 A | 1/2003 |
| JP | 2003-070143 A | 3/2003 |
| JP | 2003121699 A | 4/2003 |
| JP | 2003177279 A | 6/2003 |
| JP | 2003-302561 A | 10/2003 |
| JP | 2004-361521 A | 12/2004 |
| JP | 2005-024789 A | 1/2005 |
| JP | 2005031544 A | 2/2005 |
| JP | 2005077591 A | 3/2005 |
| JP | 2005-114860 A | 4/2005 |
| JP | 2006023502 A | 1/2006 |
| JP | 2006-146084 A | 6/2006 |
| JP | 2006259631 A | 9/2006 |
| JP | 2006337637 A | 12/2006 |
| JP | 2007078740 A | 3/2007 |
| JP | 2007121859 A | 5/2007 |
| JP | 2008191422 A | 8/2008 |
| JP | 2008250360 A | 10/2008 |
| JP | 2009265208 A | 11/2009 |
| JP | 2010152084 A | 7/2010 |
| JP | 2010191420 A | 9/2010 |
| JP | 2011033698 A | 2/2011 |
| JP | 2013041089 A | 2/2013 |
| JP | 2013156580 A | 8/2013 |
| JP | 2014085474 A | 5/2014 |
| JP | 2014095834 A | 5/2014 |
| JP | 05537852 B2 | 7/2014 |
| JP | 05538328 B2 | 7/2014 |
| JP | 2014134746 A | 7/2014 |
| JP | 2014157214 A | 8/2014 |
| JP | 2014219441 A | 11/2014 |
| JP | 2015125217 A | 7/2015 |
| JP | 2016109816 A | 6/2016 |
| JP | 2016109817 | 6/2016 |
| JP | 2016109819 A | 6/2016 |
| JP | 2016156916 A | 9/2016 |
| JP | 03207223 U | 11/2016 |
| WO | 94/25885 A1 | 11/1994 |
| WO | 98/36304 A1 | 8/1998 |
| WO | 01/27660 A2 | 4/2001 |
| WO | 01/92927 A1 | 12/2001 |
| WO | 02/25340 A1 | 3/2002 |
| WO | 2006/113726 A1 | 10/2006 |
| WO | 2006123777 A1 | 11/2006 |
| WO | 2012/037727 A1 | 3/2012 |
| WO | 2013177016 A1 | 11/2013 |
| WO | 2014/151259 A1 | 9/2014 |
| WO | 2014/167447 A1 | 10/2014 |
| WO | 2014/197894 A1 | 12/2014 |
| WO | 2015144883 A1 | 10/2015 |
| WO | 2015197588 A1 | 12/2015 |
| WO | 2016095213 A1 | 6/2016 |
| WO | 2016156610 A1 | 10/2016 |
| WO | 2016168389 A1 | 10/2016 |

OTHER PUBLICATIONS

Clearfield, "FieldShield ® SC and LC Pushable Connectors," Last Updated Jun. 1, 2018, 2 pgs.

Clearfield, "FieldShield ® SmarTerminal: Hardened Pushable Connectors" Last Updated Jun. 29, 2018, 2 pgs.

Clearfield, "Fieldshield Optical Fiber Protection System: Installation Manual." for part No. 016164. Last Updated Dec. 2014. 37 pgs.

International Search Report and Written Opinion PCT/US2017/063938 dated May 14, 2018.

International Search Report and Written Opinion PCT/US2017/063953 dated May 14, 2018.

International Search Report and Written Opinion PCT/US2017/063991 dated May 14, 2018.

International Search Report and Written Opinion PCT/US2017/064027 dated Oct. 9, 2018.

(56) References Cited

OTHER PUBLICATIONS

International Search Report and Written Opinion PCT/US2017/064063 dated May 15, 2018.
International Search Report and Written Opinion PCT/US2017/064071 dated May 14, 2018.
International Search Report and Written Opinion PCT/US2017/064072 dated May 14, 2018.
International Search Report and Written Opinion PCT/US2017/064077 dated Feb. 26, 2018.
International Search Report and Written Opinion PCT/US2017/064084 dated Feb. 26, 2018.
International Search Report and Written Opinion PCT/US2017/064087 dated Feb. 26, 2018.
International Search Report and Written Opinion PCT/US2017/064092 dated Feb. 23, 2018.
International Search Report and Written Opinion PCT/US2017/064093 dated Feb. 26, 2018.
International Search Report and Written Opinion PCT/US2017/064095 dated Feb. 23, 2018.
International Search Report and Written Opinion PCT/US2017/064096 dated Feb. 26, 2018.
Search Report for International Application No. PCT/US2017/063862 dated Feb. 4, 2019.
Fiber Systems International: Fiber Optic Solutions, "TFOCA-II 4-Channel Fiber Optic Connector", data sheet, 2 pgs.
Stratos: Lightwave, "Innovation Brought to Light", Hybrid HMA Series, Hybrid Multi Application, 2 pgs.
Infolite, "Design and Data Specifications", 1 pg.
Nawata, "Multimode and Single-Mode Fiber Connectors Technology"; IEEE Journal of Quantum Electronics, vol. QE-16, No. 6 Published Jun. 1980.
Corning Cable Systems, "SST-Drop (Dielectric) Cables 1-12 Fibers", Product Specifications, 2 pgs.
Schneier, Bruce, "Applied Cryptography", 1995 SEC. 10.3, 12.2.
Corning Cable Systems, "SST Figure-8 Drop Cables 1-12 Fibers", Preliminary Product Specifications, 11 pgs.
Corning Cable Systems, "SST-Drop (armor) Cables 1-12 Fibers", Product Specifications, 2 pgs.
International Search Report received for International Patent Application Serial No. PCT/US2018/040130 dated Sep. 18, 2018, 16 pages.
International Search Report received for International Patent Application Serial No. PCT/US2018/039019 dated Sep. 18, 2018, 15 pages.
International Search Report received for International Patent Application Serial No. PCT/US2018/039490 dated Oct. 4, 2018, 14 pages.
International Search Report received for International Patent Application Serial No. PCT/US2018/040011 dated Oct. 5, 2018, 15 pages.
International Search Report received for International Patent Application Serial No. PCT/US2018/040104 dated Oct. 9, 2018, 14 pages.
International Search Report received for International Patent Application Serial No. PCT/US2018/040126 dated Oct. 9, 2018, 18 pages.
International Search Report received for International Patent Application Serial No. PCT/US2018/039494 dated Oct. 11, 2018, 14 pages.
Office Action pertaining to U.S. Appl. No. 16/018,918 dated Sep. 28, 2018.
Office Action pertaining to U.S. Appl. No. 16/018,988 dated Oct. 31, 2018.
Office Action pertaining to U.S. Appl. No. 16/109,008 dated Oct. 31, 2018.
Notice of Allowance received in U.S. Appl. No. 16/018,997 dated Oct. 4, 2018.
Office Action pertaining to U.S. Appl. No. 16/015,588 dated Jan. 24, 2019.
International Search Report pertaining to Application No. PCT/US2018/039020 dated Mar. 8, 2019.

* cited by examiner

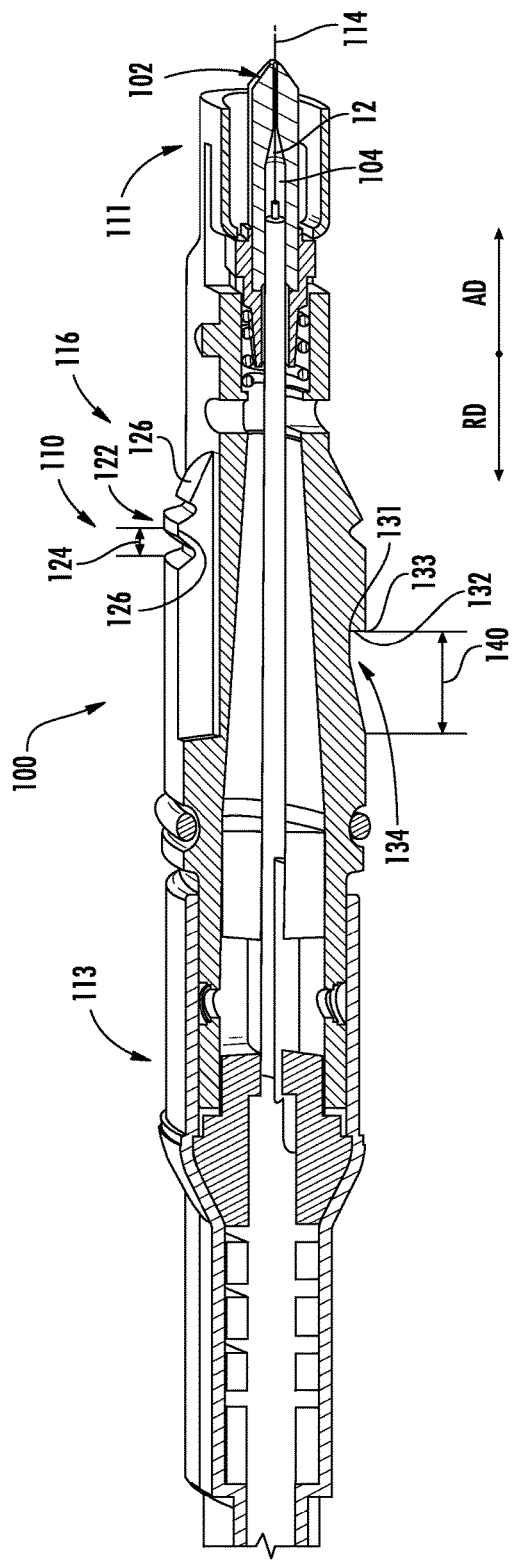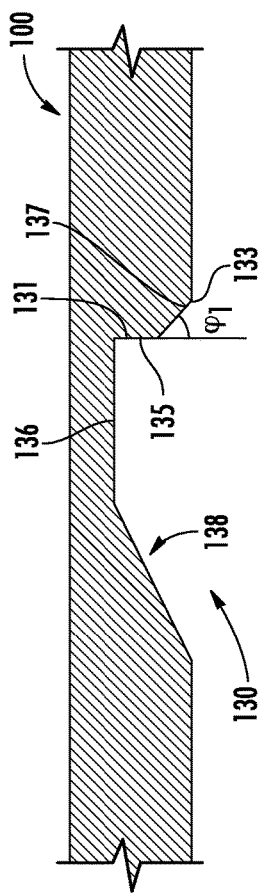
FIG. 3A
FIG. 3B

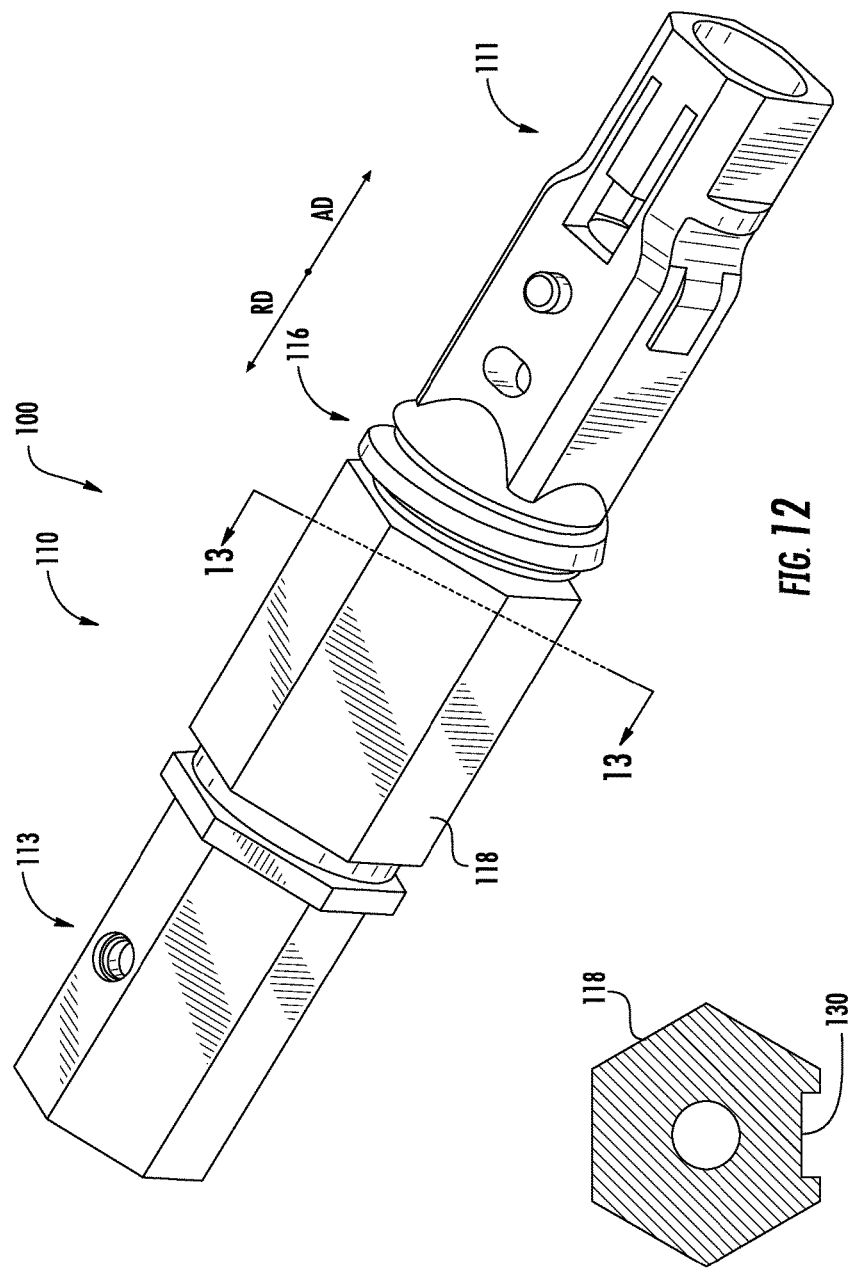

OPTICAL CONNECTORS WITH LOCKING AND KEYING FEATURES FOR INTERFACING WITH MULTIPORTS

CROSS-REFERENCE TO RELATED APPLICATIONS

This application claims the benefit of U.S. Provisional Patent Application 62/526,011, filed on Jun. 28, 2017, U.S. Provisional Patent Application 62/526,018 filed on Jun. 28, 2017, and U.S. Provisional Patent Application 62/526,195 filed on Jun. 28, 2017, the contents each of which are hereby incorporated by reference in their entirety.

BACKGROUND

Field

The present disclosure relates generally to assemblies for interconnecting or otherwise terminating optical fibers and fiber optic cables in a manner suitable for mating with corresponding optical receptacles.

Technical Background

Optical fibers are used in an increasing number and variety of applications, such as a wide variety of telecommunications and data transmission applications. As a result, fiber optic networks include an ever increasing number of terminated optical fibers and fiber optic cables that can be conveniently and reliable mated with corresponding optical receptacles in the network. These terminated optical fibers and fiber optic cables are available in a variety of connectorized formats including, for example, hardened OptiTap® and OptiTip® connectors, field-installable UniCam® connectors, preconnectorized single or multi-fiber cable assemblies with SC, FC, or LC connectors, etc, all of which are available from Corning Incorporated, with similar products available from other manufacturers, as is well documented in the patent literature.

The optical receptacles with which the aforementioned terminated fibers and cables are coupled are commonly provided at optical network units (ONUs), network interface devices (NIDs), and other types of network devices or enclosures, and often require hardware that is sufficiently robust to be employed in a variety of environments under a variety of installation conditions. These conditions may be attributable to the environment in which the connectors are employed, or the habits of the technicians handling the hardware. Consequently, there is a continuing drive to enhance the robustness of these connectorized assemblies, while preserving quick, reliable, and trouble-free optical connection to the network.

BRIEF SUMMARY

Fiber optic connectors, connectorized cable assemblies, multiport assemblies, and methods for connecting fiber optic connectors to, and disconnecting fiber optic connectors from multiport assemblies are disclosed herein.

In one embodiment, a fiber optic connector includes a ferrule including an optical fiber bore and a connector housing, where the connector housing includes a ferrule retaining portion positioned at a front portion of the connector housing, the ferrule retaining portion structurally configured to engage and retain the ferrule, a longitudinal axis extending from the front portion of the connector housing, through the ferrule retaining portion to a rear portion of the connector housing positioned opposite the front portion, a nominal housing portion defined on an outer surface of the connector housing, and a locking portion defined on the outer surface of the connector housing and interrupting the nominal housing portion, where the locking portion includes a port engagement face that extends inward from the nominal housing portion of the connector housing toward the longitudinal axis and that is oriented transverse to the longitudinal axis, and the locking portion further includes a locking portion recess positioned rearward of the port engagement face and inward of the nominal housing portion of the connector housing, and the locking portion recess is oriented transverse to the port engagement face and includes a planar surface extending across at least a portion of the outer surface of the connector housing.

In another embodiment, a connectorized fiber optic cable includes a ferrule including an optical fiber bore and a connector housing including a ferrule retaining portion positioned at a front portion of the connector housing, the ferrule retaining portion engaged with the ferrule, a longitudinal axis extending from the front portion of the connector housing, through the ferrule retaining portion and the optical fiber bore of the ferrule to a rear portion of the connector housing positioned opposite the front portion, a nominal housing portion defined on an outer surface of the connector housing, and a locking portion defined on the outer surface of the connector housing and interrupting the nominal housing portion, where the locking portion includes a port engagement face that extends inward from the nominal housing portion of the connector housing toward the longitudinal axis and that is oriented transverse to the longitudinal axis, and the locking portion further includes a locking portion recess positioned rearward of the port engagement face and inward of the nominal housing portion of the connector housing, and the locking portion recess is oriented transverse to the port engagement face and includes a planar surface extending across at least a portion of the outer surface of the connector housing, and a fiber optic cable including an optical fiber extending along the longitudinal axis of the connector housing to the optical fiber bore of the ferrule.

In yet another embodiment, a multiport assembly includes a shell defining a cavity positioned within the shell, a plurality of optical adapters positioned within the cavity of the shell, the plurality of optical adapters structurally configured to receive, align, and optically couple dissimilar optical connectors, a plurality of optical connector ports including respective connection port passageways permitting external optical connectors to access the plurality of optical adapters positioned within the cavity of the shell, the connection port passageways including respective connector insertion paths, and a plurality of push-button securing members associated with respective ones of the connection port passageways, each push-button securing member of the plurality of push-button securing members including a bore extending through the push-button securing member, the bore defining an inner perimeter, a connector engagement face positioned on the bore and oriented transverse to a corresponding connector insertion path, the connector engagement face including an inner end and an outer end positioned outward of the inner end, and a ramp positioned on the bore, the ramp extending between the inner perimeter of the bore and the inner end of the connector engagement face.

In yet another embodiment, a fiber optic junction includes a multiport assembly includes a shell defining a cavity positioned within the shell, an optical adapter positioned within the cavity of the shell, the optical adapter structurally configured to receive, align, and optically couple dissimilar optical connectors, an optical connection port defined by the shell and in communication with the cavity, the optical connection port includes a connection port passageway extending into the cavity and defining a connector insertion path, and a push-button securing member that intersects the connection port passageway, the push-button securing member including a bore extending through the push-button securing member and defining an inner perimeter, and a connector engagement face extending inward from the inner perimeter of the bore, and a fiber optic connector positioned at least partially within the connector insertion path of the multiport assembly, the fiber optic connector including a connector housing including a ferrule retaining portion positioned at a front portion of the connector housing, the ferrule retaining portion structurally configured to engage and retain a ferrule, a longitudinal axis extending from the front portion of the connector housing, through the ferrule retaining portion to a rear portion of the connector housing positioned opposite the front portion, a nominal housing portion defined on an outer surface of the connector housing, and a locking portion defined on the outer surface of the connector housing and interrupting the nominal housing portion, where the locking portion includes a port engagement face that extends inward from the nominal housing portion of the connector housing toward the longitudinal axis and that is oriented transverse to the longitudinal axis, and the locking portion further includes a locking portion recess positioned rearward of the port engagement face and inward of the nominal housing portion of the connector housing, and the locking portion recess is oriented transverse to the port engagement face and includes a planar surface extending across at least a portion of the outer surface of the connector housing, and where the port engagement face is selectively engaged with the connector engagement face of the multiport assembly.

In yet another embodiment, a method for selectively connecting a fiber optic connector to a multiport assembly includes inserting a connector housing of a fiber optic connector into a connector port of a multiport assembly, the connector housing including a longitudinal axis extending through the connector housing, engaging a ramp of a push-button securing member of the multiport assembly with the connector housing, moving the push-button securing member away from a connector insertion path defined by the multiport assembly, moving at least a portion of the connector housing through a bore of the push-button securing member of the multiport assembly, moving at least a portion of the push-button securing member into a locking portion recess of the connector housing, and engaging a connector engagement face of the push-button securing member that is oriented transverse to the connector insertion path of the multiport assembly, with a port engagement face of the connector housing that is oriented transverse to the longitudinal axis of the connector housing to selectively couple the connector housing to the multiport assembly.

In yet another embodiment, a fiber optic connector includes a ferrule and a connector housing, where the ferrule includes an optical fiber bore and the connector housing includes a ferrule retaining portion structurally configured to engage and retain the ferrule at a front portion of the connector housing, a longitudinal axis extending from a leading edge plane of the front portion of the connector housing, through the ferrule retaining portion, to a rear portion of the connector housing, a nominal housing portion defined on an outer surface of the connector housing, a rotationally discrete keying portion defined on the outer surface of the connector housing, and a rotationally discrete locking portion defined on the outer surface of the connector housing, where the nominal housing portion is interrupted by the rotationally discrete keying portion and the rotationally discrete locking portion, the connector housing has an unobstructed line of sight from the rotationally discrete keying portion to the leading edge plane of the connector housing along an advancing direction of the fiber optic connector, the rotationally discrete keying portion includes at least one rotationally discrete contact surface that is structurally configured to inhibit rotation of the connector housing about the longitudinal axis when engaged with a complementary keying portion of an optical connector port, the rotationally discrete locking portion includes a rearwardly facing port engagement face and a locking portion recess that is positioned rearward of the port engagement face, the locking portion recess is obstructed from the leading edge plane of the connector housing along the advancing direction of the fiber optic connector by the port engagement face, and the port engagement face of the locking portion is structurally configured to inhibit axial movement of the connector housing along a retracting direction of the fiber optic connector when engaged with a complementary securing member of an optical connector port.

In yet another embodiment, a multiport assembly includes a shell defining a cavity positioned within the shell, a plurality of optical adapters positioned within the cavity of the shell, the optical adapters structurally configured to receive, align, and optically couple dissimilar optical connectors, a plurality of optical connector ports including respective connection port passageways permitting external optical connectors to access the plurality of optical adapters positioned within the cavity of the shell, the connection port passageways including corresponding connector insertion paths, a plurality of rotationally discrete keying portions associated with respective ones of the connection port passageways, where each keying portion includes at least one rotationally discrete contact surface in unobstructed line of sight with an open end of a respective connection port passageway and the at least one rotationally discrete contact surface is structurally configured to inhibit rotation of a connector housing residing in the respective connection port passageway, and a plurality of push-button securing members associated with respective ones of the connection port passageways, where each push-button securing member is biased in an engaged position, in which a rotationally discrete locking portion of the push-button securing member is positioned within the corresponding connector insertion path, and is selectively positionable into and out of a disengaged position, in which the rotationally discrete locking portion of the push-button securing member is positioned outside the corresponding connector insertion path, the rotationally discrete locking portion of each push-button securing member includes a ramp oriented to progressively constrict the corresponding connector insertion path along an advancing direction of a fiber optic connector in the respective connection port passageway and an locking portion recess obstructed from the open end of the respective connection port passageway by a connector engagement face of the rotationally discrete locking portion of the push-button securing member, and the connector engagement face of the rotationally discrete locking portion is structurally configured to inhibit axial movement of a fiber optic connector in the connection port passageway along a retracting direction of a fiber optic connector in the respective connection port passageway.

In yet another embodiment, a method for connecting a fiber optic connector to a multiport assembly includes providing a fiber optic connector including a ferrule and a connector housing, where the ferrule includes an optical fiber bore and the connector housing includes a ferrule retaining portion structurally configured to engage and retain the ferrule at a front portion of the connector housing, a longitudinal axis extending from a leading edge plane of the front portion of the connector housing, through the ferrule retaining portion to a rear portion of the connector housing, a nominal housing portion defined on an outer surface of the connector housing, a rotationally discrete keying portion defined on the outer surface of the connector housing, and a rotationally discrete locking portion defined on the outer surface of the connector housing, where the nominal housing portion is interrupted by the rotationally discrete keying portion and the locking portion, the rotationally discrete keying portion includes an unobstructed line of sight with the leading edge plane of the connector housing along an advancing direction of the fiber optic connector, the rotationally discrete keying portion including at least one rotationally discrete contact surface structurally configured to inhibit rotation of the connector housing about the longitudinal axis when engaged with a complementary keying portion of an optical connector port, the locking portion includes a rearwardly facing port engagement face and a locking portion recess that is positioned rearward of the port engagement face, the locking portion recess is obstructed from the leading edge plane of the connector housing along the advancing direction of the fiber optic connector by the port engagement face, and the port engagement face of the locking portion is structurally configured to inhibit axial movement of the connector housing along a retracting direction of the fiber optic connector when engaged with a complementary locking portion of an optical connector port, advancing the fiber optic connector along the advancing direction into an optical connector port of a multiport assembly including a plurality of optical adapters, the optical adapters structurally configured to receive, align, and optically couple the fiber optic connector with a dissimilar optical connector within the multiport assembly, aligning the rotationally discrete keying portion of the connector housing with a complementary rotationally discrete keying portion associated with the optical connector port to permit the rotationally discrete locking portion of the connector housing to engage a rotationally discrete locking portion of a push-button securing member associated with the optical connector port, and engaging the rotationally discrete locking portion of the connector housing with the rotationally discrete locking portion of the push-button securing member associated with the optical connector port.

In yet another embodiment, a connectorized fiber optic cable assembly includes a ferrule, a connector housing, a cable adapter, a fiber optic cable, and a type SC conversion housing, where the connector housing includes a ferrule retaining portion, an adapter seating portion, a longitudinal axis extending transversely from a leading edge plane of the front portion of the connector housing, through the ferrule retaining portion and the adapter seating portion of the connector housing, to a rear portion of the connector housing, a rotationally discrete keying portion defined on the outer surface of the connector housing, a rotationally discrete locking portion defined on the outer surface of the connector housing, and a nominal housing portion defined on an outer surface of the connector housing and interrupted by the keying portion and the locking portion of the connector housing, the ferrule comprises a 2.5 millimeter nominal ferrule diameter, is retained by the ferrule retaining portion of the connector housing, and comprises an optical fiber bore, the keying portion of the connector housing comprises at least one rotationally discrete contact surface that is structurally configured to inhibit rotation of the connector housing about the longitudinal axis when engaged with a complementary keying portion of an optical connector port, the locking portion of the connector housing includes a rearwardly facing port engagement face and a locking portion recess that is positioned rearward of the port engagement face, the locking portion recess of the locking portion is obstructed from the leading edge plane of the connector housing along the advancing direction of the fiber optic connector by the port engagement face, the port engagement face of the locking portion is structurally configured to inhibit axial movement of the connector housing along a retracting direction of the fiber optic connector when engaged with a complementary locking portion of an optical connector port, the cable adapter comprises an optical cable passageway, an optical fiber passageway, a housing insert portion seated in the adapter seating portion of the connector housing to align the optical cable passageway and the optical fiber passageway with the longitudinal axis of the connector housing, and an adapter abutment limiting an extent to which the cable adapter extends into the adapter seating portion of the connector housing, the fiber optic cable extends along the optical cable passageway of the cable adapter and comprises an optical fiber extending along optical fiber passageway of the cable adapter and the optical fiber bore of the ferrule, and the connector housing comprises a line of sight from the keying portion to the leading edge plane of the connector housing that is obstructed only by the type SC conversion housing along an advancing direction of the fiber optic connector.

In yet another embodiment, a connectorized fiber optic cable assembly includes a ferrule, a connector housing, a cable adapter, a fiber optic cable, and a hardened conversion housing, where the connector housing includes a ferrule retaining portion, an adapter seating portion, a longitudinal axis extending transversely from a leading edge plane of the front portion of the connector housing, through the ferrule retaining portion and the adapter seating portion of the connector housing, to a rear portion of the connector housing, a rotationally discrete keying portion defined on the outer surface of the connector housing, a rotationally discrete locking portion defined on the outer surface of the connector housing, and a nominal housing portion defined on an outer surface of the connector housing and interrupted by the keying portion and the locking portion of the connector housing, the ferrule includes a 2.5 millimeter nominal ferrule diameter, is retained by the ferrule retaining portion of the connector housing, and includes an optical fiber bore, the keying portion of the connector housing includes at least one rotationally discrete contact surface that is structurally configured to inhibit rotation of the connector housing about the longitudinal axis when engaged with a complementary keying portion of an optical connector port, the locking portion of the connector housing includes a rearwardly facing port engagement face and a locking portion recess that is positioned rearward of the port engagement face, the locking portion recess of the locking portion is obstructed from the leading edge plane of the connector housing along the advancing direction of the fiber optic connector by the port engagement face, the port engagement face of the locking portion is structurally configured to inhibit axial movement of the connector housing along a retracting direction of the fiber optic connector when engaged with a complementary locking portion of an optical connector port, the cable adapter including an optical cable passageway, an optical fiber passageway, a housing insert portion seated in the adapter seating portion of the connector housing to align the optical cable passageway and the optical fiber passageway with the longitudinal axis of the connector housing, and an adapter abutment limiting an extent to which the cable adapter extends into the adapter seating portion of the connector housing, the fiber optic cable extends along the optical cable passageway of the cable adapter and includes an optical fiber extending along optical fiber passageway of the cable adapter and the optical fiber bore of the ferrule, the hardened conversion housing including a pair of opposing fingers including opposing interior faces that extend parallel to, and are arranged symmetrically about, the longitudinal axis of the connector housing, a finger spacing between the opposing interior faces of the opposing fingers is between 10.80 millimeters and 10.85 millimeters, a finger depth along a direction parallel to the longitudinal axis of the connector housing is between 8.45 millimeters and 8.55 millimeters, a finger width along a direction perpendicular to the finger depth and the longitudinal axis of the connector housing is less than 10 millimeters, outer faces of the opposing fingers lie along a common outside diameter of between 15.75 millimeters and 15.85 millimeters, an outer face of one of the opposing fingers is truncated in a plane parallel to the opposing interior faces to define a truncated span of between about 14.75 millimeters and about 14.95 millimeters, extending from the outer face of the truncated opposing finger to the outer face of the opposite finger, and the connector housing includes a line of sight from the keying portion to the leading edge plane of the connector housing that is obstructed only by the hardened conversion housing along an advancing direction of the fiber optic connector.

In yet another embodiment, a connectorized fiber optic cable assembly includes a ferrule, a connector housing, a cable adapter, a fiber optic cable, and a type SC conversion housing, where the connector housing includes a ferrule retaining portion positioned at a front portion of the connector housing, an adapter seating portion, a longitudinal axis extending transversely from a leading edge plane of the front portion of the connector housing, through the ferrule retaining portion and the adapter seating portion of the connector housing, to a rear portion of the connector housing, a nominal housing portion defined on an outer surface of the connector housing, and a locking portion defined on the outer surface of the connector housing and interrupting the nominal housing portion of the connector housing, the locking portion of the connector housing includes a port engagement face that extends inward from the nominal housing portion of the connector housing toward the longitudinal axis and is oriented transverse to the longitudinal axis, the locking portion of the connector housing further includes a locking portion recess positioned rearward of the port engagement face of the locking portion and inward of the nominal housing portion of the connector housing, the locking portion recess is oriented transverse to the port engagement face of the locking portion and includes a planar surface extending across at least a portion of the outer surface of the connector housing, the ferrule includes a 2.5 millimeter nominal ferrule diameter, is retained by the ferrule retaining portion of the connector housing, and includes an optical fiber bore, the cable adapter includes an optical cable passageway, an optical fiber passageway, a housing insert portion seated in the adapter seating portion of the connector housing to align the optical cable passageway and the optical fiber passageway with the longitudinal axis of the connector housing, and an adapter abutment limiting an extent to which the cable adapter extends into the adapter seating portion of the connector housing, the fiber optic cable extends along the optical cable passageway of the cable adapter and includes an optical fiber extending along optical fiber passageway of the cable adapter and the optical fiber bore of the ferrule, the type SC conversion housing surrounds the ferrule retaining portion of the connector housing and a portion of the connector housing rearward of the ferrule retaining portion of the connector housing, and the type SC conversion housing is positioned forward of the locking portion of the connector housing along the longitudinal axis of the connector housing such that the type SC conversion housing would present potential interfere with engagement of the locking portion of the connector housing with a securing member of an optical port.

In yet another embodiment, a connectorized fiber optic cable assembly includes a ferrule, a connector housing, a cable adapter, a fiber optic cable, and a hardened conversion housing, where the connector housing includes a ferrule retaining portion positioned at a front portion of the connector housing, an adapter seating portion, a longitudinal axis extending transversely from a leading edge plane of the front portion of the connector housing, through the ferrule retaining portion and the adapter seating portion of the connector housing, to a rear portion of the connector housing, a nominal housing portion defined on an outer surface of the connector housing, and a locking portion defined on the outer surface of the connector housing and interrupting the nominal housing portion of the connector housing, the locking portion of the connector housing includes a port engagement face that extends inward from the nominal housing portion of the connector housing toward the longitudinal axis and is oriented transverse to the longitudinal axis, the locking portion of the connector housing further includes a locking portion recess positioned rearward of the port engagement face of the locking portion and inward of the nominal housing portion of the connector housing, the locking portion recess is oriented transverse to the port engagement face of the locking portion and includes a planar surface extending across at least a portion of the outer surface of the connector housing, the ferrule includes a 2.5 millimeter nominal ferrule diameter, is retained by the ferrule retaining portion of the connector housing, and includes an optical fiber bore, the cable adapter includes an optical cable passageway, an optical fiber passageway, a housing insert portion seated in the adapter seating portion of the connector housing to align the optical cable passageway and the optical fiber passageway with the longitudinal axis of the connector housing, and an adapter abutment limiting an extent to which the cable adapter extends into the adapter seating portion of the connector housing, the fiber optic cable extends along the optical cable passageway of the cable adapter and includes an optical fiber extending along optical fiber passageway of the cable adapter and the optical fiber bore of the ferrule, the hardened conversion housing includes a pair of opposing fingers includes opposing interior faces that extend parallel to, and are arranged symmetrically about, the longitudinal axis of the connector housing, a finger spacing between the opposing interior faces of the opposing fingers is between 10.80 millimeters and 10.85 millimeters, a finger depth along a direction parallel to the longitudinal axis of the connector housing is between 8.45 millimeters and 8.55 millimeters, a finger width along a direction perpendicular to the finger depth and the longitudinal axis of the connector housing is less than 10 millimeters, outer faces of the opposing fingers lie along a common outside diameter of between 15.75 millimeters and 15.85 millimeters, an outer face of one of the opposing fingers is truncated in a plane parallel to the opposing interior faces to define a truncated span e of between about 14.75 millimeters and about 14.95 millimeters, extending from the outer face of the truncated opposing finger to the outer face of the opposite finger, and the hardened conversion housing surrounds the ferrule retaining portion of the connector housing and the locking portion of the connector housing to interfere with engagement of the locking portion of the connector housing with a securing member of an optical port.

In yet another embodiment, a multiport assembly includes a shell defining a cavity positioned within the shell, a plurality of optical adapters positioned within the cavity of the shell, the optical adapters structurally configured to receive, align, and optically couple dissimilar optical connectors, a plurality of optical connection ports including respective connection port passageways permitting external optical connectors to access the plurality of optical adapters positioned within the cavity of the shell, the connection port passageways including respective connector insertion paths, and a plurality of push-button securing members associated with respective ones of the connection port passageways, where each push-button securing member is biased in an engaged position, in which a locking portion of the push-button securing member is positioned within a corresponding connector insertion path, and is selectively positionable into and out of a disengaged position, in which the locking portion of the push-button securing member is positioned outside the corresponding connector insertion path, and the locking portion of each push-button securing member is configured to permit forcible nondestructive disengagement of an external optical connector from the locking portion of the push-button securing member upon application of a force on the external optical connector in a direction along an axis extending along the corresponding connector insertion path.

In yet another embodiment, a multiport assembly includes a shell defining a cavity positioned within the shell, a plurality of optical adapters positioned within the cavity of the shell, the optical adapters structurally configured to receive, align, and optically couple dissimilar optical connectors, a plurality of optical connection ports including respective connection port passageways permitting external optical connectors to access the plurality of optical adapters positioned within the cavity of the shell, the connection port passageways including respective connector insertion paths, and a plurality of push-button securing members associated with respective ones of the connection port passageways, where each push-button securing member includes a locking portion, where the push-button securing member is repositionable between a disengaged position, in which the locking portion is positioned outside a corresponding connector insertion path, and an engaged position, in which the locking portion is positioned within the corresponding connector insertion path.

In yet another embodiment, a method for selectively connecting a fiber optic connector to a multiport assembly includes inserting a connector housing of a fiber optic connector into a connector port of a multiport assembly, engaging a push-button securing member of the multiport assembly with the connector housing, moving the push-button securing member away from a connector insertion path defined by the multiport assembly, moving the connector housing through the push-button securing member of the multiport assembly, and engaging a locking portion of the push-button securing member with the connector housing to selectively couple the connector housing to the multiport assembly.

In yet another embodiment, a method for selectively disconnecting a fiber optic connector from a multiport assembly includes disengaging a locking portion of a push-button securing member of a multiport assembly from a connector housing of a fiber optic connector, moving the push-button securing member away from a connector insertion path defined by the multiport assembly, and moving the connector housing through the push-button securing member of the multiport assembly.

Although the concepts of the present disclosure are described herein with reference to a set of drawings that show a particular type of fiber optic cable, and connector components of particular size and shape, it is contemplated that the concepts may be employed in any optical fiber connectorization scheme including, for example, and without limitation, hardened OptiTap® and OptiTip® connectors, field-installable UniCam® connectors, single or multi-fiber cable assemblies with SC, FC, LC, or multi-fiber connectors, etc.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 3A schematically depicts a cross-section of the fiber optic connector of FIG. 1, according to one or more embodiments shown and described herein;

FIG. 3B schematically depicts another cross-section of a port engagement face of the fiber optic connector of FIG. 1, according to one or more embodiments shown and described herein;

FIG. 12 schematically depicts a perspective view of another connector housing, according to one or more embodiments shown and described herein;

FIG. 13 schematically depicts a cross-section of the connector housing for FIG. 12 along section 13-13 of FIG. 12, according to one or more embodiments shown and described herein;

DETAILED DESCRIPTION

Embodiments described herein generally relate to various devices for forming an optical connection between optical fibers. More particularly, embodiments described herein include fiber optic connectors including connector housings having a locking portion that selectively engages a push-button securing member of a multiport assembly to selectively couple the fiber optic connector to the multiport assembly. The locking portion of the connector housing and/or the push-button securing member of the multiport assembly may be configured to allow forcible, non-destructive disengagement of the connector housing from the multiport assembly upon the application of a predetermined force to the connector housing. In this way, damage to the multiport assembly and/or the fiber optic connector resulting from unexpected or unintended forces applied to the connector housing may be minimized.

In embodiments, the push-button securing members may generally intersect a connection port passageway of the multiport assembly, which may reduce the need for securing features positioned on the perimeter of the connection port passageway. By reducing the need for securing features positioned on the perimeter of the connection port passageway, adjacent connection port passageways on the multiport assembly may be positioned closer to one another such that a greater number of connection port passageways to be included in a multiport assembly without increasing the overall size of the multiport assembly. Furthermore, the push-button securing members may be configured to automatically engage a connector housing upon the full insertion of the connector housing to the connection port passageway, such that a user may selectively couple the connector housing to the multiport assembly with one hand, thereby simplifying the connection of the connector housing to the multiport assembly. The connector housings may further include a keying portion that selectively engages a corresponding keying portion of the multiport assembly to ensure and maintain the rotational orientation of the fiber optic connector with the multiport assembly. These and other embodiments of fiber optic connectors and multiport assemblies are disclosed in greater detail herein with reference to the appended figures.

As used herein, the term "advancing direction" refers to a direction that is parallel to a longitudinal axis of the connector housing and in which the connector housing may be inserted into a corresponding port. Conversely, reference herein to the "retracting direction" refers to the opposite direction, i.e., a direction that is parallel to the longitudinal axis of the connector housing and in which the connector housing may be retracted from a corresponding port. In the appended figures, the advancing direction is depicted as "AD" and the retracting direction is depicted as "RD."

Figure 1:
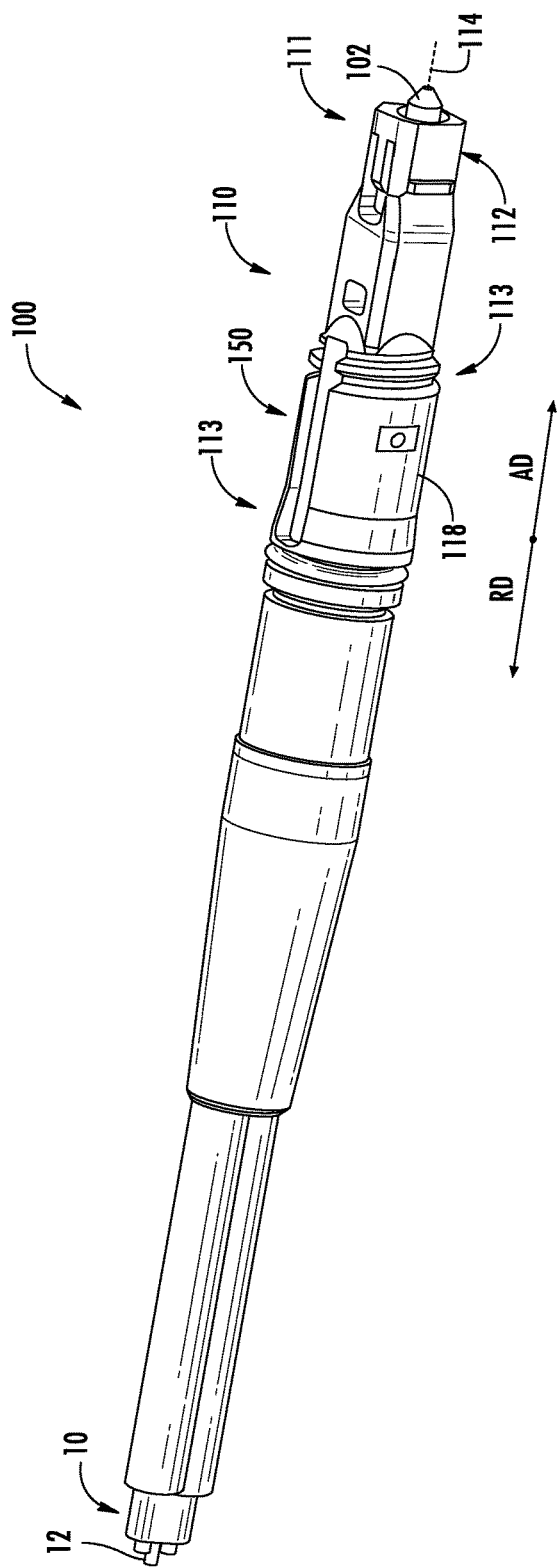
FIG. 1 schematically depicts a perspective view of a fiber optic connector including a connector housing, according to one or more embodiments shown and described herein.

Referring initially to FIG. 1, a perspective view of a fiber optic connector 100 is schematically depicted. The fiber optic connector 100 generally includes a connector housing 110, including a ferrule retaining portion 112 at a front portion 111 of the connector housing 110. The connector housing 110 further includes a rear portion 113 positioned opposite the front portion 111 in an axial direction. The ferrule retaining portion 112 of the connector housing 110 is generally configured to hold and retain a ferrule 102 that is positioned at least partially within the ferrule retaining portion 112.

In embodiments, the fiber optic connector 100 is coupled to a fiber optic cable 10 at the rear portion 113 of the fiber optic connector 100. The fiber optic cable 10 generally includes an optical fiber 12 extending through the fiber optic cable 10. The optical fiber 12 may generally extend through the connector housing 110 and the ferrule 102 along a longitudinal axis 114 of the connector housing 110. For fiber optic cables 10 including a single optical fiber 12, the optical fiber 12 may be coaxial with the longitudinal axis 114. For multifiber cables, this alignment will be orthogonally offset for one, more than one, or all of the optical fibers of the cable.

In embodiments, the connector housing 110 generally includes an outer surface 118 that extends around a perimeter of the connector housing 110, and the outer surface 118 may include one or more cross-sectional shapes. For example, in the embodiment depicted in FIG. 1, the front portion 111 of the connector housing 110 includes a rectangular cross-section including planar sides, while the rear portion 113 of the connector housing 110 includes a curved outer surface 118.

Figure 2:
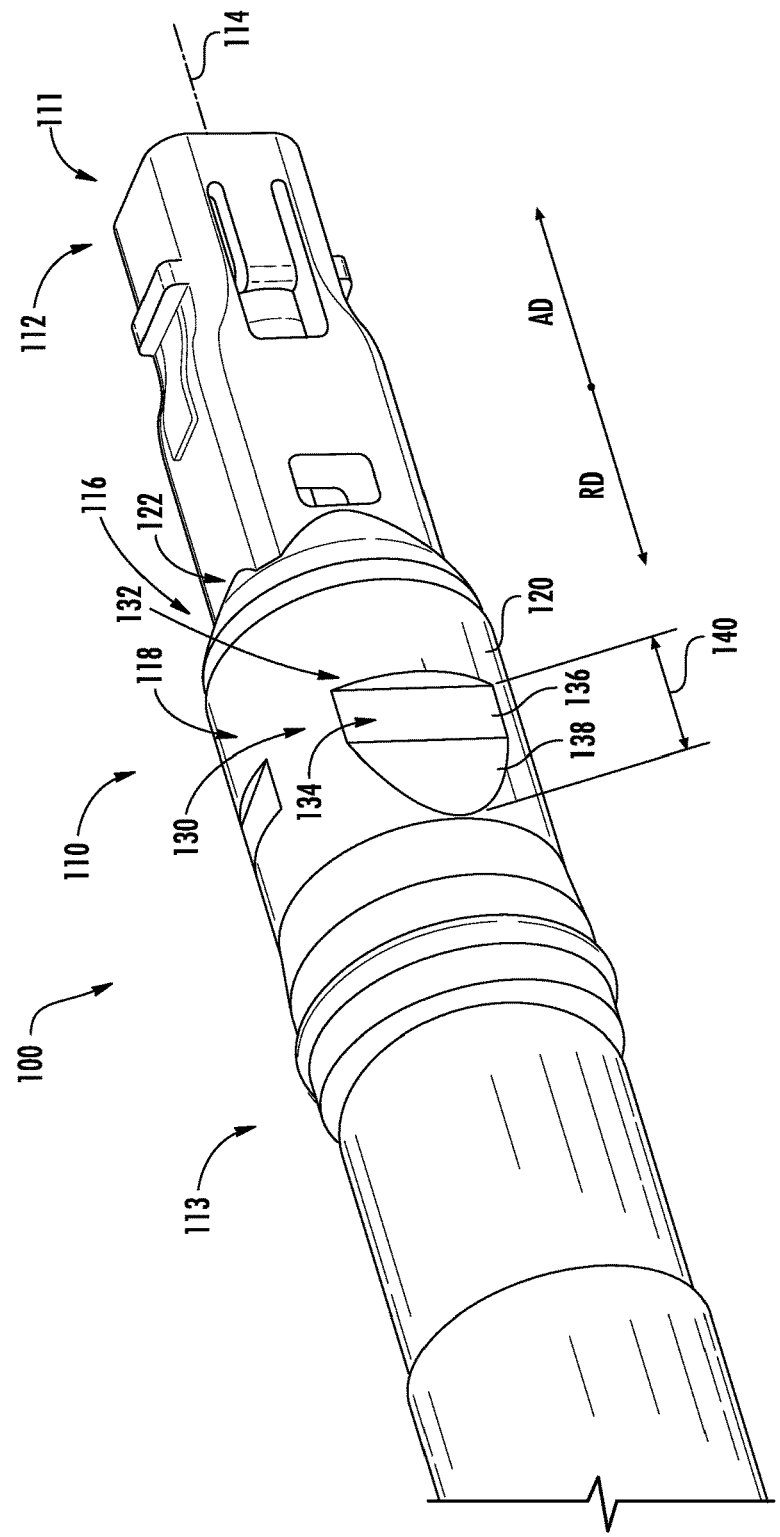
FIG. 2 schematically depicts a lower perspective view of the fiber optic connector of FIG. 1 including a locking portion, according to one or more embodiments shown and described herein.

Referring to FIG. 2, a lower perspective view of the connector housing 110 is schematically depicted. The connector housing 110 includes a nominal housing portion 120 defined on the outer surface 118 of the connector housing 110. The nominal housing portion 120 extends about and axially along the outer surface 118 of the connector housing 110 but may be interrupted by a variety of distinctive surface features defined on the outer surface 118 of the connector housing 110. The nominal housing portion 120 is referenced herein as being "nominal" to help distinguish it from the various distinctive surface features that are defined on the connector housing 110. Without these distinctive surface features, the nominal housing portion 120 would form a relatively uniform and continuous surface of the connector housing 110, and would extend far enough along a length of the connector housing 110 to provide a convenient surface for a user to handle the connector housing 110 without the use of a specialized connector handling tool or other supplemental hardware. Reference herein to a surface feature, e.g., a keying portion or a locking portion, that is "defined on" the outer surface 118 of the connector housing 110 contemplates that the surface feature may be a subtractive surface feature, like a cut-out, or an additive surface feature, like a projection.

In the embodiment depicted in FIG. 2, the connector housing 110 includes a locking portion 130 defined on the outer surface 118 at the rear portion 113 of the connector housing 110. The locking portion 130 is positioned on a curved surface of the outer surface 118 in the embodiment depicted in FIG. 2, and generally includes a port engagement face 132 that extends inward from the nominal housing portion 120 toward the longitudinal axis 114 of the connector housing 110. In one embodiment, the port engagement face 132 may generally define an edge-to-edge cross sectional cut-out of the connector housing 110, in which the port engagement face 132 extends across the outer surface 118 in a direction transverse to the longitudinal axis 114. In other embodiments, the port engagement face 132 may generally define a pocket cut-out of the connector housing 110, in which the port engagement face 132 extends radially inward from the outer surface 118 toward the longitudinal axis 114, and is bounded in a circumferential direction by the nominal housing portion 120.

The locking portion 130 further includes a locking portion recess 134 positioned rearward of the port engagement face 132 and inward of the nominal housing portion 120. The locking portion recess 134 includes a generally planar surface 136 that is oriented transverse to the port engagement face 132 and that extends at least partially across the outer surface 118 of the connector housing 110. The locking portion recess 134 may also include a ramp portion 138 positioned rearward of the planar surface 136 and that extends outward from the planar surface 136 to the nominal housing portion 120 moving along the locking portion recess 134 in the retracting direction.

Figure 17:
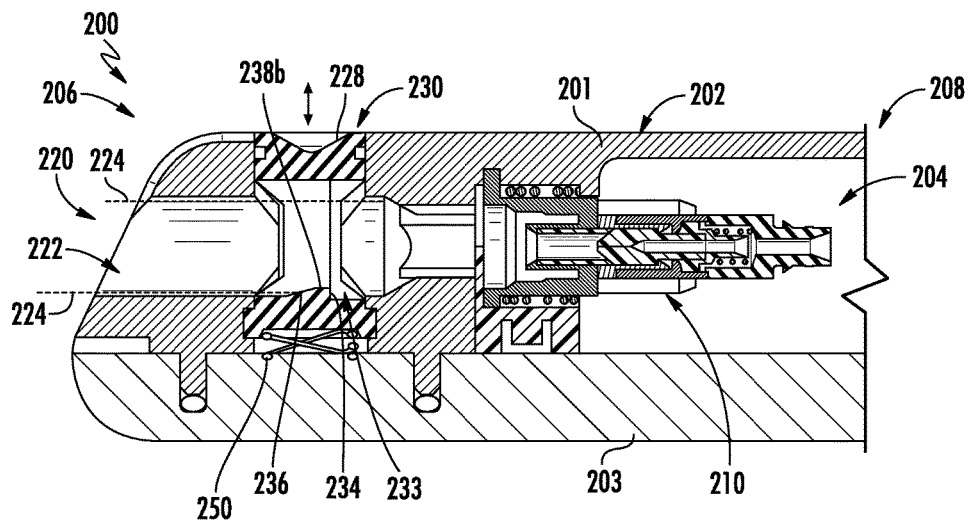
FIG. 17 schematically depicts cross-section of an optical connector port of the multiport assembly of FIG. 16, according to one or more embodiments shown and described herein.

In embodiments, the port engagement face 132 extends inward from the nominal housing portion 120 of the connector housing 110 by a distance that corresponds to features of a push-button securing member 230 (FIG. 17) such that the connector housing 110 may be selectively coupled to and removed from the push-button securing member 230 (FIG. 17). In one embodiment, the port engagement face 132 extends inward from the nominal housing portion 120 by a distance of at least about 0.75 millimeters.

Referring collectively to FIGS. 2 and 3A, the port engagement face 132 generally defines a planar surface that is oriented transverse to the longitudinal axis 114. The port engagement face 132 includes and extends between an inner end 131 and an outer end 133 that is positioned outward of the inner end 131. The outer end 133 may include a rounded or chamfered edge, which may assist in preventing breakage of the outer end 133 when the connector housing 110 is forcibly removed from a connection port, as described in greater detail herein.

In some embodiments, the outer end 133 is positioned closer to the front portion 111 of the connector housing 110 in an axial direction than the inner end 131, such that the port engagement face 132 is both rearward and outward facing.

In these embodiments, the port engagement face 132 generally defines a plane that intersects the longitudinal axis 114 at an angle that is less than 30 degrees evaluated from perpendicular.

Figure 5:
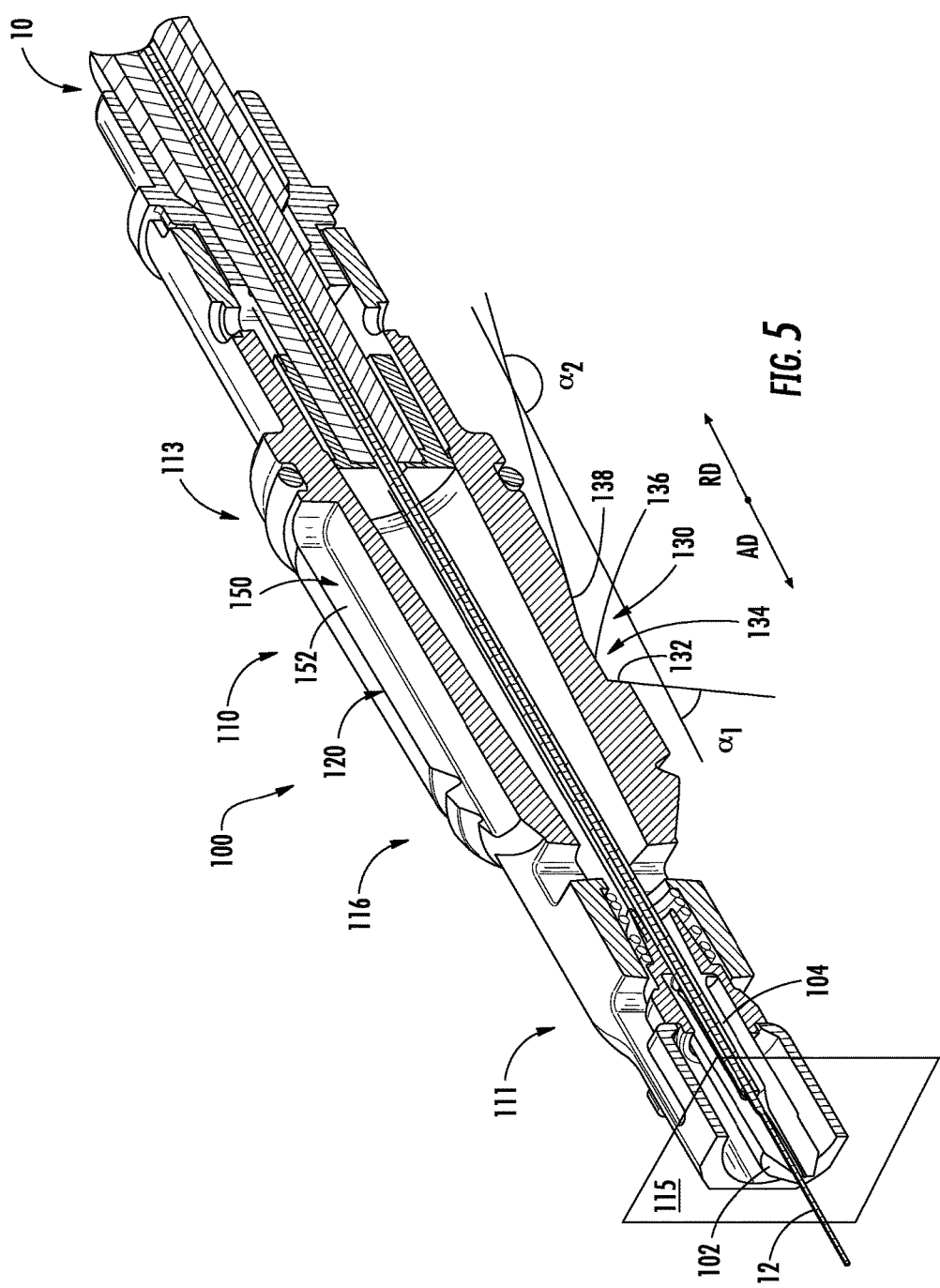
FIG. 5 schematically depicts a perspective cross-section of the connector housing of the fiber optic connector of FIG. 1, according to one or more embodiments shown and described herein.

For example, as best shown in FIG. 5, the port engagement face 132 is a formed as a rearward-facing cut-out that lies in a plane that intersects the longitudinal axis 114 at an acute angle $\alpha_1$, and the ramp portion 138 is formed as a forward-facing cut-out that lies in a plane that intersects the longitudinal axis 114 at an angle $\alpha_2$ that is greater than $\alpha_1$. In embodiments, $\alpha_2$ is generally between 110 degrees and 180 degrees and may generally be selected to correspond to a feature of a push-button securing member 230 (FIG. 17), as described in greater detail herein. As noted above, in embodiments, the angle $\alpha_1$ is generally within 30 degrees of perpendicular (i.e., the port engagement face 132 lies in a plane that intersects the longitudinal axis at an angle between 60 degrees and 90 degrees) such that the port engagement face 132 is outward and rearward facing. By orienting the port engagement face 132 in a rearward and outward facing orientation, the port engagement face 132 may be selectively disengaged from a push-button securing member 230 (FIG. 17) upon the application of a force above a predetermined threshold, as described in greater detail herein. In other embodiments, the port engagement face 132 is oriented such that the port engagement face 132 that extends in a plane that is orthogonal to the longitudinal axis 114.

Referring to FIG. 3B, in some embodiments, the port engagement face 132 may include a locking face 135 that extends in a plane that is orthogonal to the longitudinal axis 114 (FIG. 3A), and a release face 137 positioned outward from the locking face 135. In the embodiment depicted in FIG. 3B, the release face 137 extends in a plane that intersects the locking face 135 at an angle $\varphi_1$. In embodiments, the angle $\varphi_1$ is between about 0 degrees and 30 degrees, inclusive of the endpoints, such that the release face 137 is outward and rearward facing. By including both a locking face 135 that extends in a plane that is orthogonal to the longitudinal axis 114 and a release face 137 that is outward and rearward facing, the port engagement face 132 of the connector housing 110 may be rigidly connected to a push-button securing member 230 (FIG. 17) engaged with the locking face 135. However, the port engagement face 132 of the connector housing may be releasably engaged with a push-button securing member 230 (FIG. 17) engaged with the release face 137 upon the application of a force above a predetermined threshold, as described in greater detail herein.

Referring again to FIGS. 2 and 3A, in embodiments, the front portion 111 has a perimeter extending around the outer surface 118 of the front portion 111 that is less than a perimeter extending around the outer surface 118 of the rear portion 113 of the connector housing 110. The connector housing further includes a transition region 116 positioned between the front portion 111 and the rear portion 113, where the perimeter of the connector housing 110 extending around the outer surface 118 increases moving along the transition region 116 from the front portion 111 to the rear portion 113 in an axial direction.

In embodiments, the connector housing 110 includes a thread 122 extending around the outer surface 118 at the transition region 116. The thread 122 generally includes crests 126 that are separated from one another by a pitch 124. The thread 122 may be utilized to selectively couple one or more conversion housings to the connector housing 110, as described in greater detail herein. While the thread 122 is depicted as being positioned on the transition region 116, it should be understood that the thread 122 may be alternatively or additionally positioned on the outer surface 118 of the front portion 111 and/or the rear portion 113 of the connector housing 110.

In embodiments, the pitch 124 between the crests 126 of the thread 122 is less than a length 140 of the locking portion recess 134 evaluated in an axial direction. Because the pitch 124 of the thread 122 is less than the length 140 of the locking portion recess 134, the locking portion recess 134 may selectively interact with a push-button securing member 230 (FIG. 17) while the pitch 124 prevents the thread 122 from interacting the push-button securing member 230 (FIG. 17), as described in greater detail herein.

Referring particularly to FIG. 3A, the ferrule 102 is positioned within and engaged with the ferrule retaining portion 112 of the connector housing 110. The ferrule 102 defines an optical fiber bore 104 that is configured to retain the optical fiber 12. The optical fiber bore 104 is generally aligned with the longitudinal axis 114 of the connector housing 110 such that the longitudinal axis 114 is coaxial with the optical fiber bore 104.

Figure 4:
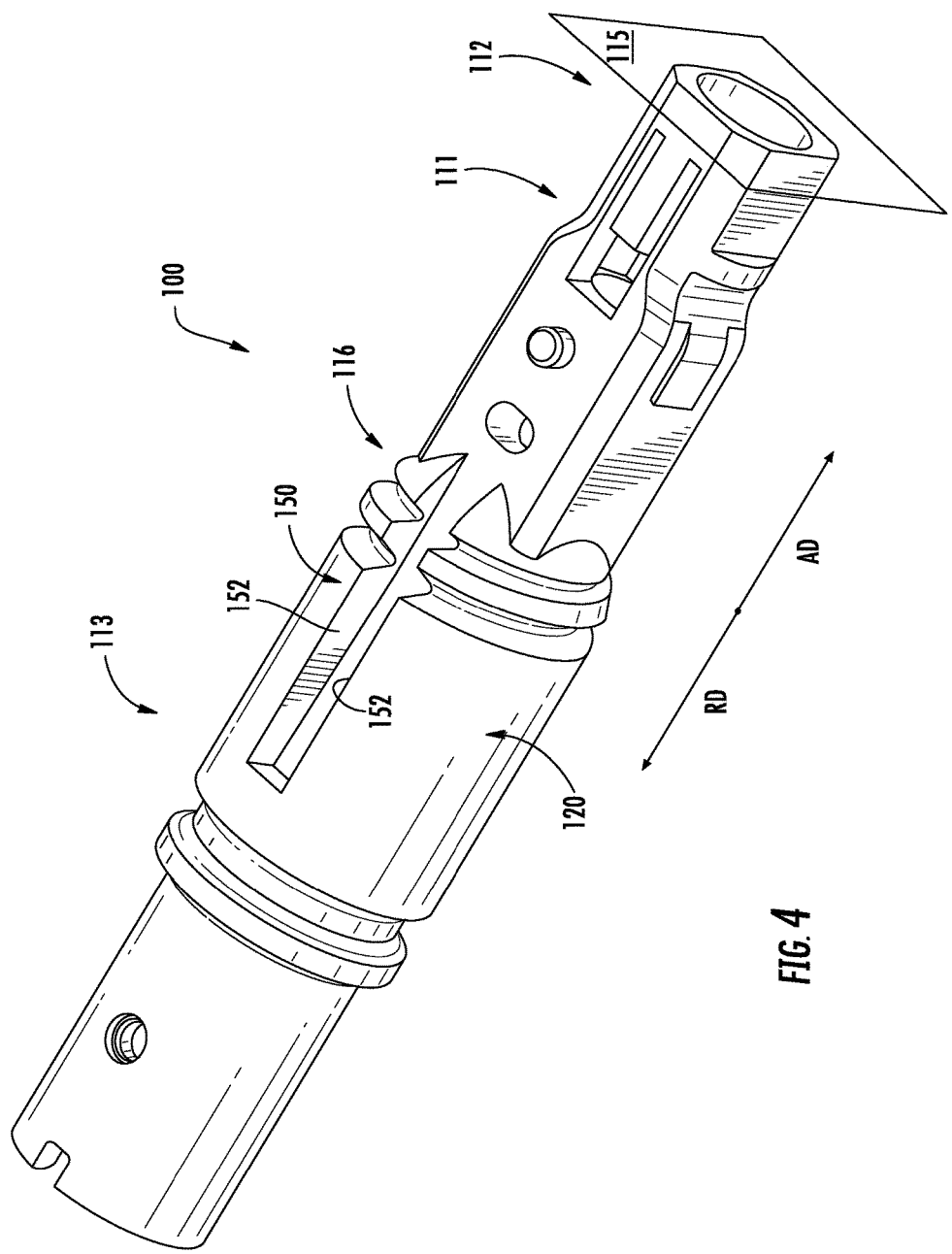
FIG. 4 schematically depicts a top perspective view of the connector housing of the fiber optic connector of FIG. 1, according to one or more embodiments shown and described herein.

Referring collectively to FIGS. 4 and 5, a perspective view of the connector housing 110 and a cross-section of the fiber optic connector 100 are schematically depicted. The connector housing 110 includes a keying portion 150 defined on the outer surface 118 of the connector housing 110, the keying portion 150 including pair of opposing contact surfaces 152. The opposing contact surfaces 152 are structurally configured to inhibit rotation of the connector housing 110 about the longitudinal axis 114 when engaged with a complementary keying portion of an optical connection port 220 (FIG. 17). In the embodiment depicted in FIGS. 4 and 5, the keying portion 150 is positioned at the rear portion 113 of the connector housing 110, and interrupts the nominal housing portion 120. In embodiments, the keying portion 150 of the connector housing 110 extends closer to the front portion 111 of the connector housing 110 than does the locking portion 130 of the connector housing 110, such that the keying portion 150 may contact features of an optical connection port 220 (FIG. 17) prior to the locking portion 130, as described in greater detail herein. In the embodiment depicted in FIG. 5, the keying portion 150 of the connector housing 110 extends at least partially into the transition region 116 of the connector housing 110. In some embodiments, the keying portion 150 may only extend forward into the transition region 116, such that the keying portion 150 terminates prior to the front portion 111 of the connector housing 110 moving forward along the outer surface 118. The keying portion 150 may generally extend in an axial direction a distance that is longer than the transition region 116 and/or the front portion 111 in the axial direction.

Figure 6:
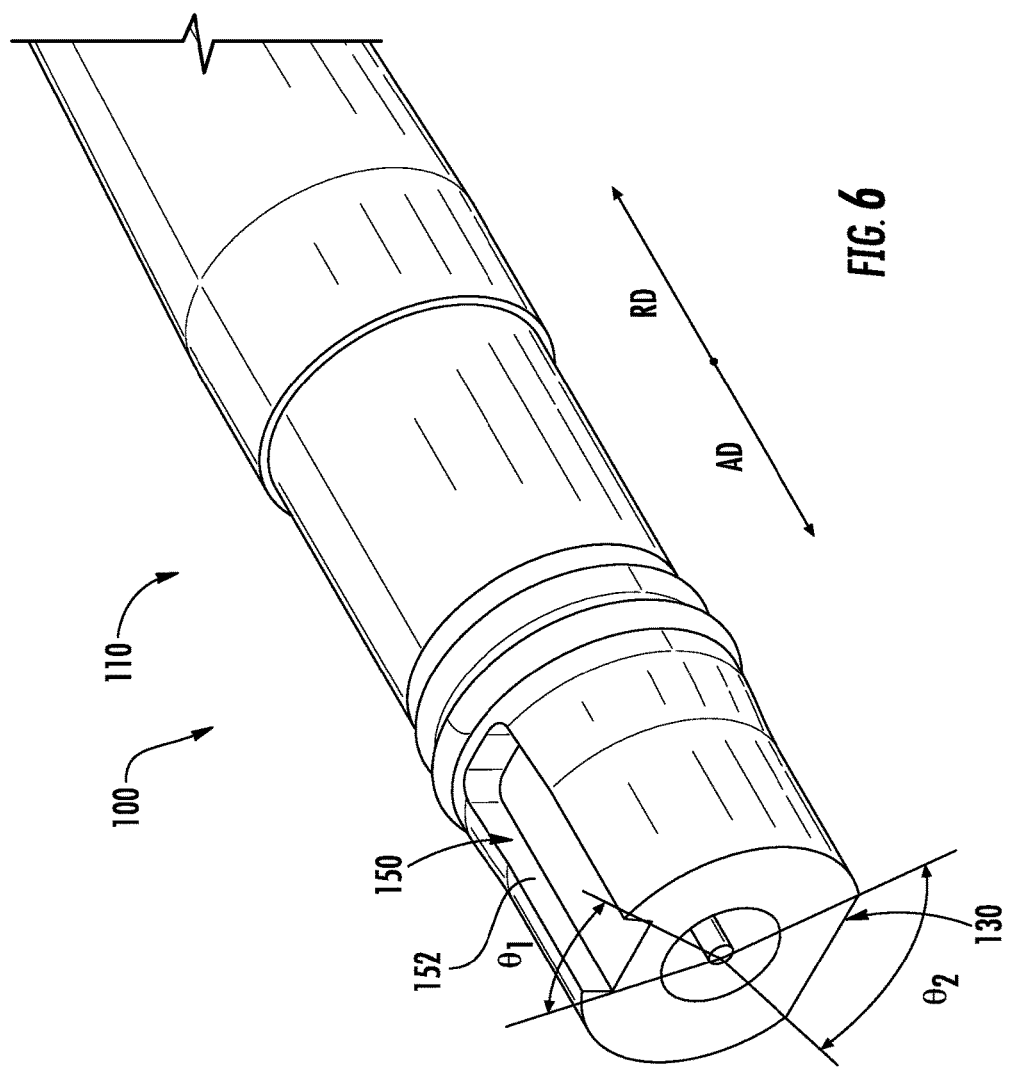
FIG. 6 schematically depicts another cross-section of the fiber optic connector of FIG. 1, according to one or more embodiments shown and described herein.

Referring to FIGS. 5 and 6, in embodiments, the keying portion 150 and/or the locking portion 130 (and portions thereof) may be rotationally discrete on the outer surface 118 of the connector housing 110. As used herein, the term "rotationally" discrete represents a limited width-wise extent along the outer surface 118 of the connector housing 110, as the connector housing 110 is rotated about its longitudinal axis 114. For example, the keying portion 150 may be relatively long and have a relatively narrow width, which width can be described with reference to the rotational arc $\theta_1$ circumscribed by the width of the keying portion 150 relative to the longitudinal axis 114 of the connector housing 110. In the illustrated embodiments, the arc $\theta_1$ is about 50 degrees, and it is contemplated that the arc $\theta_1$ may, in many embodiments, be between about 30 degrees and about 70 degrees. Similarly, in the illustrated embodiments, the locking portion 130 is wider than the keying portion 150, i.e., about 90 degrees, and it is contemplated that the arc $\theta_2$ circumscribed by the width of the locking portion 130 may be between about 120 degrees and about 60 degrees. In some embodiments, the locking portion 130 is wider than the keying portion 150 such that the rotational arc $\theta_1$ is less than about 30% of the rotational arc $\theta_2$. In one embodiment, the rotational arc $\theta_2$ is less than 90 degrees. In the embodiment depicted in FIGS. 5 and 6 the rotational arcs $\theta_1$, $\theta_2$ are mutually exclusive such that the keying portion 150 and the locking portion 130 are defined on different surface portions of the outer surface of the connector housing. In one embodiment, the rotational arc $\theta_2$ circumscribed by the width of the locking portion 130 relative to the longitudinal axis 114 of the connector housing 110 is greater than about 90 degrees, and the rotational arc $\theta_1$ circumscribed by the width of the keying portion 150 relative to the longitudinal axis 114 of the housing is less than a rotational arc $\theta_2$. In another embodiment, the rotational arc $\theta_2$ circumscribed by the width of the locking portion 130 relative to the longitudinal axis 114 of the connector housing 110 is less than about 120 degrees, and the rotational arc $\theta_1$ is greater than about 60 degrees, but does not exceed about 70 degrees. In one embodiment, the sum of the rotational arcs $\theta_1$, $\theta_2$ are limited such that $(\theta_1+\theta_2)<180°$.

The keying portion 150 generally has an unobstructed line of sight to a leading edge plane 115 that is defined by the front portion 111 of the connector housing 110 and that is orthogonal to the longitudinal axis 114. The keying portion 150 of the connector housing 110 helps to ensure proper rotational orientation of the fiber optic connector 100 when it is engaged with an optical connection port 220 (FIG. 17) having a complementary keying portion. The locking portion 130 can also be configured to help ensure that the connector housing 110 cannot be inadvertently locked into an optical connection port 220 (FIG. 17) in a rotationally misaligned state. It is contemplated that it may be insufficient to rely on the locking portion 130 alone for proper rotational alignment of the connector housing because, in some instances, there will not be close contact between the respective surfaces of the locking portion recess 134 and a push-button securing member 230 (FIG. 17) of an optical connection port 220 (FIG. 17). In fact, in some embodiments a gap will be intentionally provided between these surfaces to isolate a spring-loaded movement of the push-button securing member 230 (FIG. 17) of the optical connection port 220 (FIG. 17) from the connector housing 110, as described in greater detail herein. It is also noteworthy that the locking portion 130 does not enjoy an unobstructed line of sight with the leading edge plane 115 of the connector housing 110, as is the case with the keying portion 150. The unobstructed line of sight of the keying portion 150 can be used to help ensure proper rotational orientation of the connector housing 110 as the connector housing 110 is initially advanced into a complementary optical connection port 220 (FIG. 17), and before the obstructions of the locking portion 130 begin to interface and interfere with various portions of the optical connection port 220 (FIG. 17). Accordingly, although in embodiments the keying portion 150 and the locking portion 130 are both rotationally discrete and could conceivably be used on their own to help ensure proper rotational alignment, the present inventors have recognized that it may be best to rely on the keying portion 150 for rotational alignment, and the locking portion 130 for engagement, because the keying portion 150 enjoys an unobstructed line of sight that is not subject to inadvertent interference with the optical connection port 220 (FIG. 17), and the locking portion 130 is often designed to avoid close contact with the hardware of the optical connection port 220 (FIG. 17).

In the embodiment depicted in FIGS. 5 and 6, the keying portion 150 comprises the pair of rotationally discrete contact surfaces 152 that interrupt the nominal housing portion 120 as a negative cut-out. The discrete contact surfaces 152 generally include planar surfaces that are accessible without obstruction from the leading edge plane 115 of the connector housing 110. The contact surfaces 152 generally line in planes that intersect a plane defined by the port engagement face 132. In one embodiment, the contact surfaces 152 lie in planes that are orthogonal to the port engagement face 132. For example, in the embodiment depicted in FIGS. 4 and 5, the contact surfaces 152 lie in planes that are generally parallel with the longitudinal axis 114, such that the contact surfaces 152 are may restrict rotation of the connector housing 110 about the longitudinal axis 114. The port engagement face 132 generally lies in a plane that intersects the longitudinal axis 114 of the connector housing 110, such that the port engagement face 132 may restrict axial movement of the connector housing 110 along the longitudinal axis 114, such as when engaged with a corresponding surface within an optical connection port 220 (FIG. 17).

Figure 7:
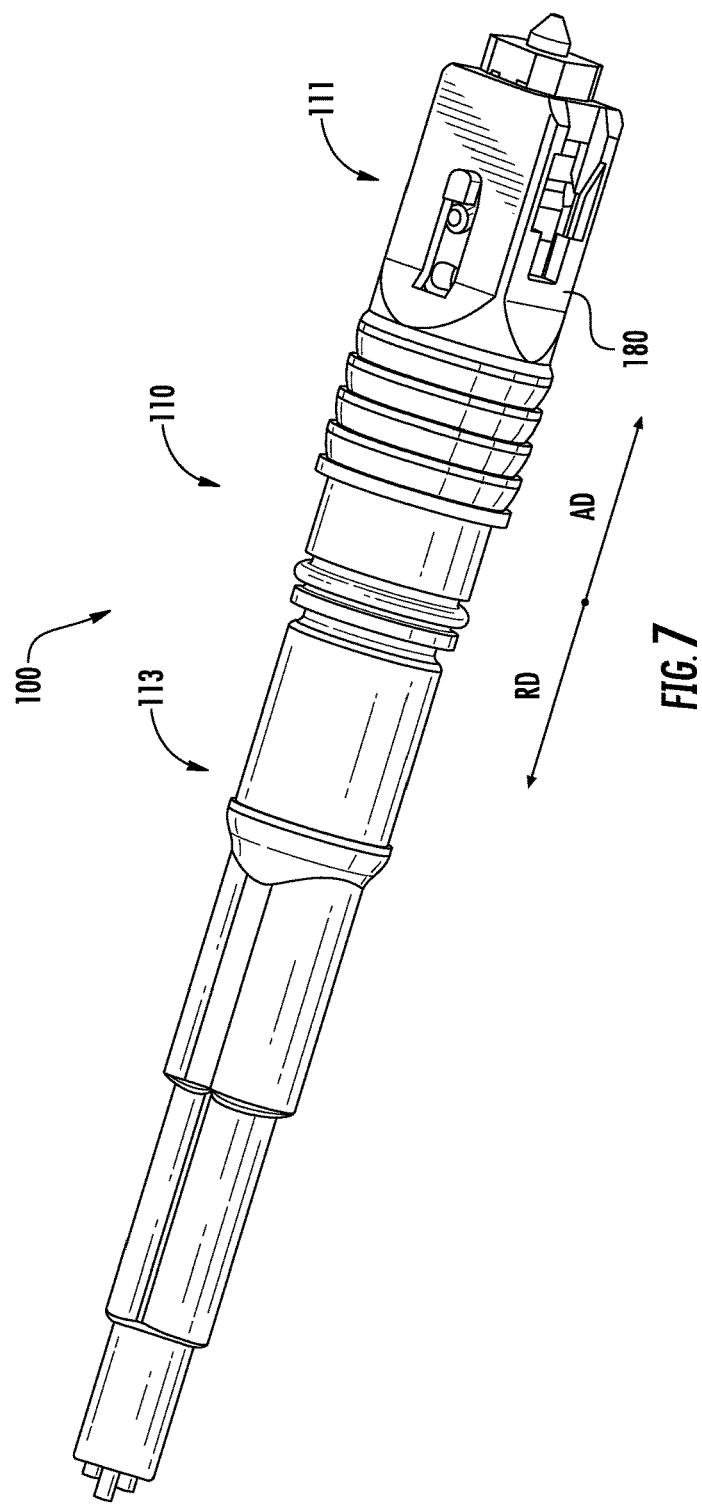
FIG. 7 schematically depicts the fiber optic connector of FIG. 1 with a conversion housing installed to the connecter housing, according to one or more embodiments shown and described herein.
Figure 8:
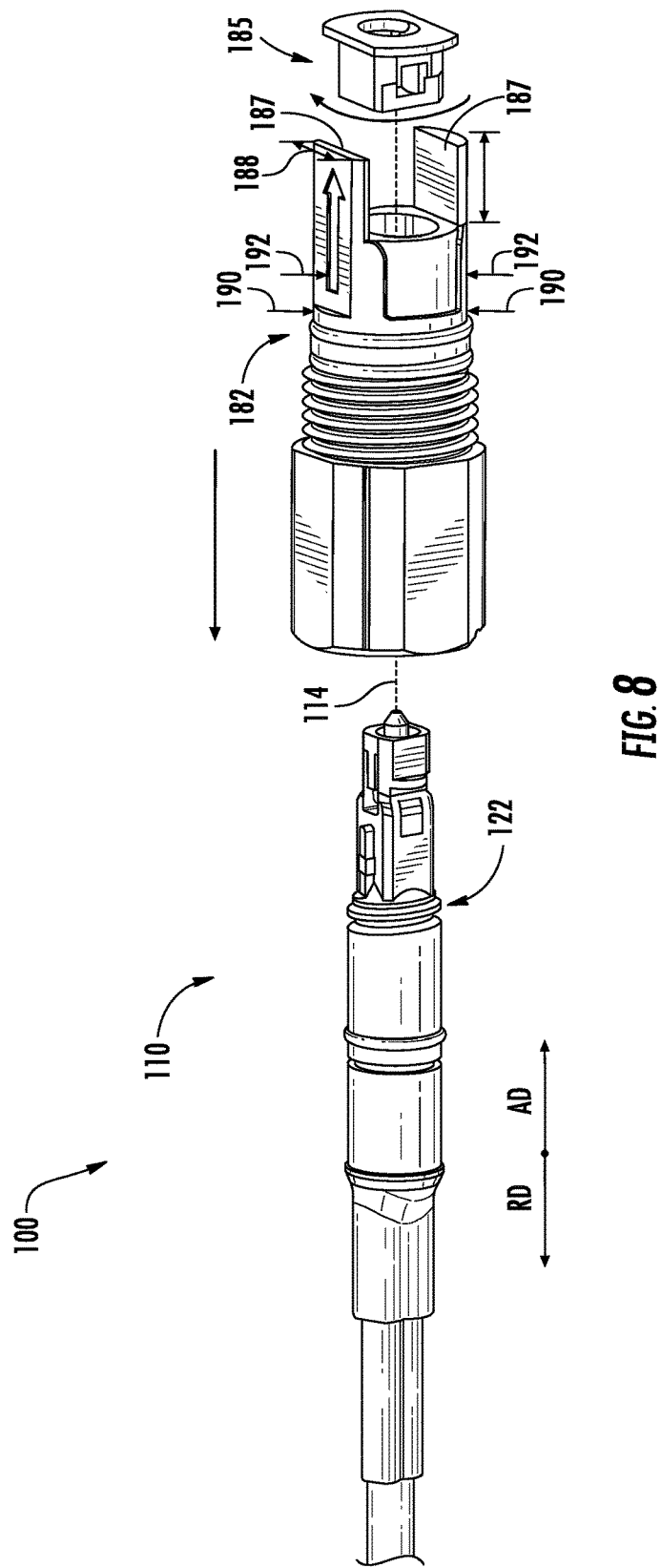
FIG. 8 schematically depicts an exploded view of the fiber optic connector of FIG. 1 including another conversion housing, according to one or more embodiments shown and described herein.
Figure 10:
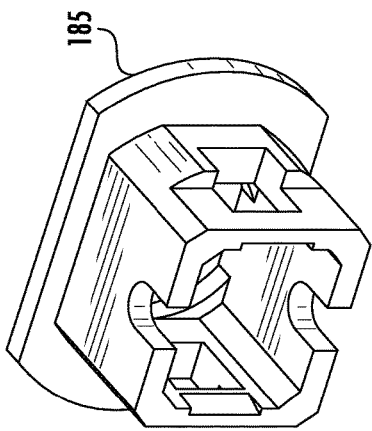
FIG. 10 schematically depicts a rear perspective view of the retaining member of FIG. 9, according to one or more embodiments shown and described herein.
Figure 11:
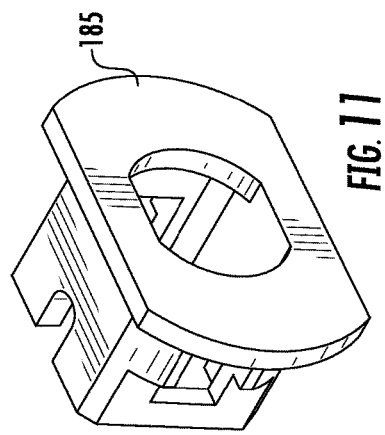
FIG. 11 schematically depicts a front perspective view of the retaining member of FIG. 9, according to one or more embodiments shown and described herein.
Figure 9:
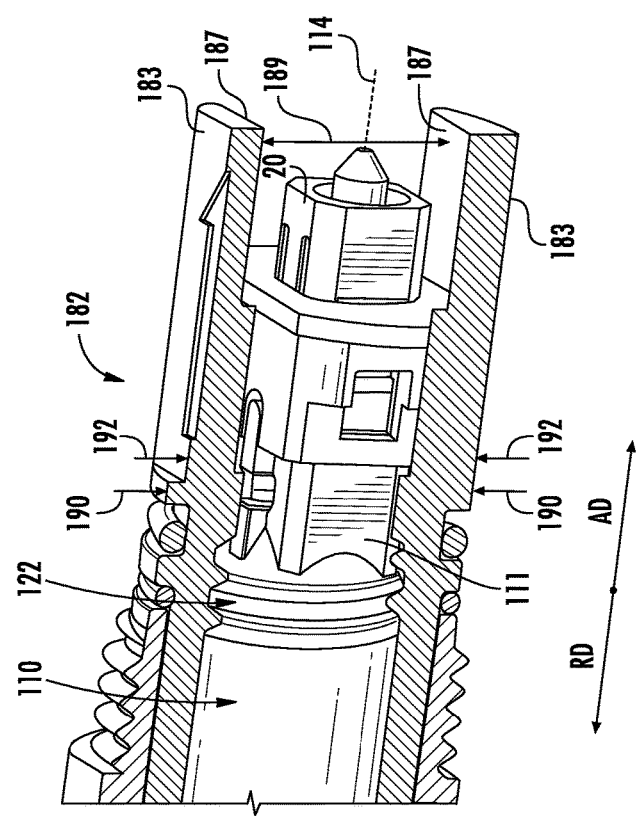
FIG. 9 schematically depicts a cross-section of the conversion housing of FIG. 8 and a retaining member, according to one or more embodiments shown and described herein.

Referring to FIG. 7, a type SC conversion housing 180 is selectively coupled to the front portion 111 of the connector housing 110. In the embodiment depicted in FIG. 7, the type SC conversion housing 180 generally increases perimeter evaluated around the front portion 111 of the connector housing 110, to provide the connector housing 110 a footprint suitable for use in an SC type connection. Type SC conversion housings are characterized by a connector footprint as set forth in IEC 61754-4, published by the International Electrical Commission, which defines the standard interface dimensions for the type SC family of fiber optic connectors and may be updated periodically. As is noted in the aforementioned standard, the parent connector for the type SC connector family is a single position plug connector which is characterized by a 2.5 millimeter nominal ferrule diameter. It includes a push-pull coupling mechanism which is spring loaded relative to the ferrule in the direction of the optical axis. The plug has a single male key which may be used to orient and limit the relative position between the connector and the component to which it is mated. The optical alignment mechanism of the connector is of a resilient sleeve style. IEC 61754-4 defines the standard interface dimensions of active device receptacles for the type SC connectors. The receptacles are used to retain the connector plug and mechanically maintain the optical datum target of the plugs at a defined position within the receptacle housings. The SC connector standard encompasses simplex plug connector interfaces, simplex adaptor connector interfaces, duplex plug connector interfaces, and duplex adaptor connector interfaces.

The connector housing 110 comprises a line of sight from the keying portion 150 (FIG. 6) to the leading edge plane 115 (FIG. 5) of the connector housing 110 that is obstructed only by the type SC conversion housing 180 along the advancing direction of the fiber optic connector 100. The type SC conversion housing 180 surrounds the ferrule retaining portion 112 (FIG. 4) of the connector housing 110 and a portion of the connector housing 110 rearward of the ferrule retaining portion 112 of the connector housing 110. The type SC conversion housing 180 is positioned forward of the locking portion 130 (FIG. 5) of the connector housing 110 along the longitudinal axis 114 of the connector housing 110 such that the type SC conversion housing 180 would present potential interference with engagement of the locking portion 130 (FIG. 5) of the connector housing 110 with a securing member of an optical port.

Referring to FIGS. 8, 9, 10, and 11, a hardened conversion housing 182 is schematically depicted. In embodiments, the hardened conversion housing 182 includes internal threads that engage the thread 122 of the connector housing 110. The hardened conversion housing 182 may be retained in place by a retention member 185 that may be selectively coupled to the front portion 111 of the connector housing 110. The retention member 185 may be configured to mechanically interfere with and prevent rotation of the hardened conversion housing 182 with respect to the connector housing 110, thereby retaining the hardened conversion housing 182 on the thread 122 of the connector housing 110. In embodiments, the hardened conversion housing 182 includes opposing fingers 183 that comprise interior faces 187 that extend parallel to and are arranged symmetrically about the longitudinal axis 114 of the connector housing 110. In embodiments, the opposing interior faces 187 of the opposing fingers 183 are spaced apart from one another by a distance 189, which is selected to be between about 10.80 millimeters and about 10.85 millimeters, inclusive of the endpoints. Each of the fingers 183 have a depth 186 evaluated along a direction parallel to the longitudinal axis 114 of the connector housing 110 that is between about 8.45 millimeters and about 8.55 millimeters, inclusive of the endpoints. Each of the fingers 183 further include a width 188 evaluated along a direction perpendicular to the finger depth 186 and the longitudinal axis 114 of the connector housing 110 that is less than about 10 millimeters. Outer faces of the opposing fingers 183 lie along a common outside diameter 190 of between about 15.75 millimeters and about 15.85 millimeters, inclusive of the endpoints. The outer face of one of the opposing fingers 183 is truncated in a plane parallel to the opposing interior faces 187 to define a truncated span 192 extending from the outer face of the truncated opposing finger 183 to the outer face of the opposite finger 183, the span 192 being between about 14.75 millimeters and about 14.95 millimeters, inclusive of the endpoints.

In embodiments, the connector housing 110 comprises a line of sight from the keying portion 150 (FIG. 6) to the leading edge plane 115 (FIG. 5) of the connector housing 110 that is obstructed only by the hardened conversion housing 182 along the advancing direction of the fiber optic connector 100. The hardened conversion housing 182 surrounds the ferrule retaining portion 112 (FIG. 4) of the connector housing 110 and a portion of the locking portion 130 (FIG. 5) of the connector housing 110 such that the hardened conversion housing 182 would interfere with engagement of the locking portion 130 of the connector housing 110 with a securing member of an optical port.

Referring to FIGS. 12 and 13, a perspective view and a cross-section of another embodiment of a connector housing 110 are schematically depicted, respectively. In the embodiment depicted in FIG. 13, the outer surface 118 of the rear portion 113 of the connector housing 110 includes planar surfaces, as compared to the curved surface depicted in FIG. 1 and described above. The planar surfaces may correspond to planar surfaces within a port assembly configured to receive the connector housing. In the embodiment depicted in FIG. 13, the outer surface 118 of the rear portion 113 of the connector housing 110 forms a hexagonal shape, however, it should be understood that the connector housing 110 may include any suitable number of planar surfaces. In the embodiment shown in FIGS. 12 and 13, the connector housing 110 includes the locking portion 130, but the keying portion 150 (FIG. 6) may optionally be omitted. Because the connector housing 110 includes planar surfaces which may correspond to complementary planar surfaces in a port assembly, rotational mis-alignment between the connector housing 110 and the port assembly may be limited. For example, the connector housing 110 may only be insertable to the port assembly in a number of rotational positions that corresponds the number of planar surfaces of the connector housing 110.

Figure 14:
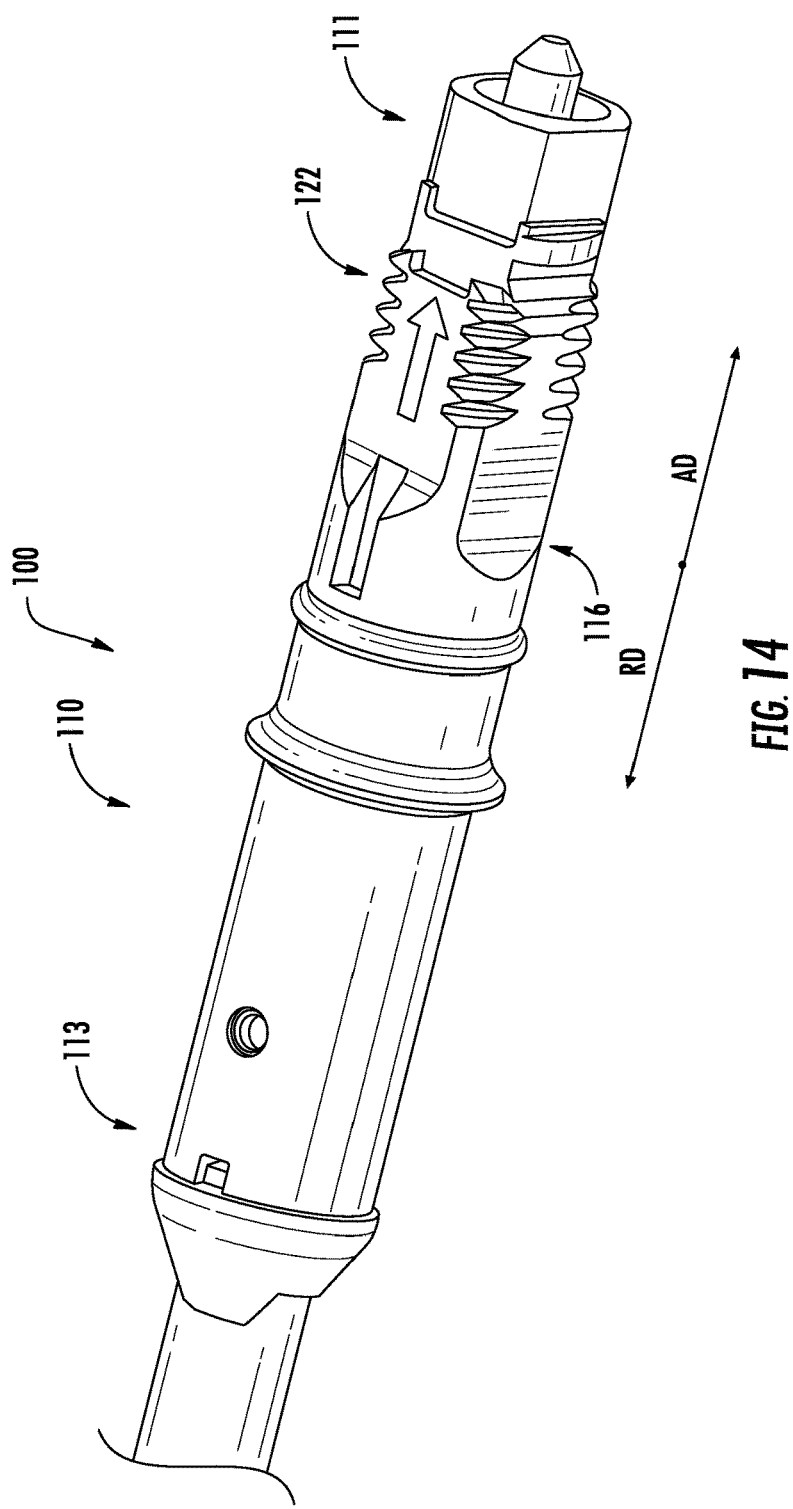
FIG. 14 schematically depicts a perspective view of another connector housing, according to one or more embodiments shown and described herein.

Referring to FIG. 14, a perspective view of another connector housing 110 is schematically depicted. In the embodiment depicted in FIG. 14, the thread 122 is positioned on the front portion 111 of the connector housing 110, forward of the transition region 116. As described above, the thread 122 may be utilized to selectively couple a conversion housing to the connector housing, and the thread 122 may be positioned on the front portion 111, the transition region 116, and/or the rear portion 113 of the connector housing 110.

Figure 15:
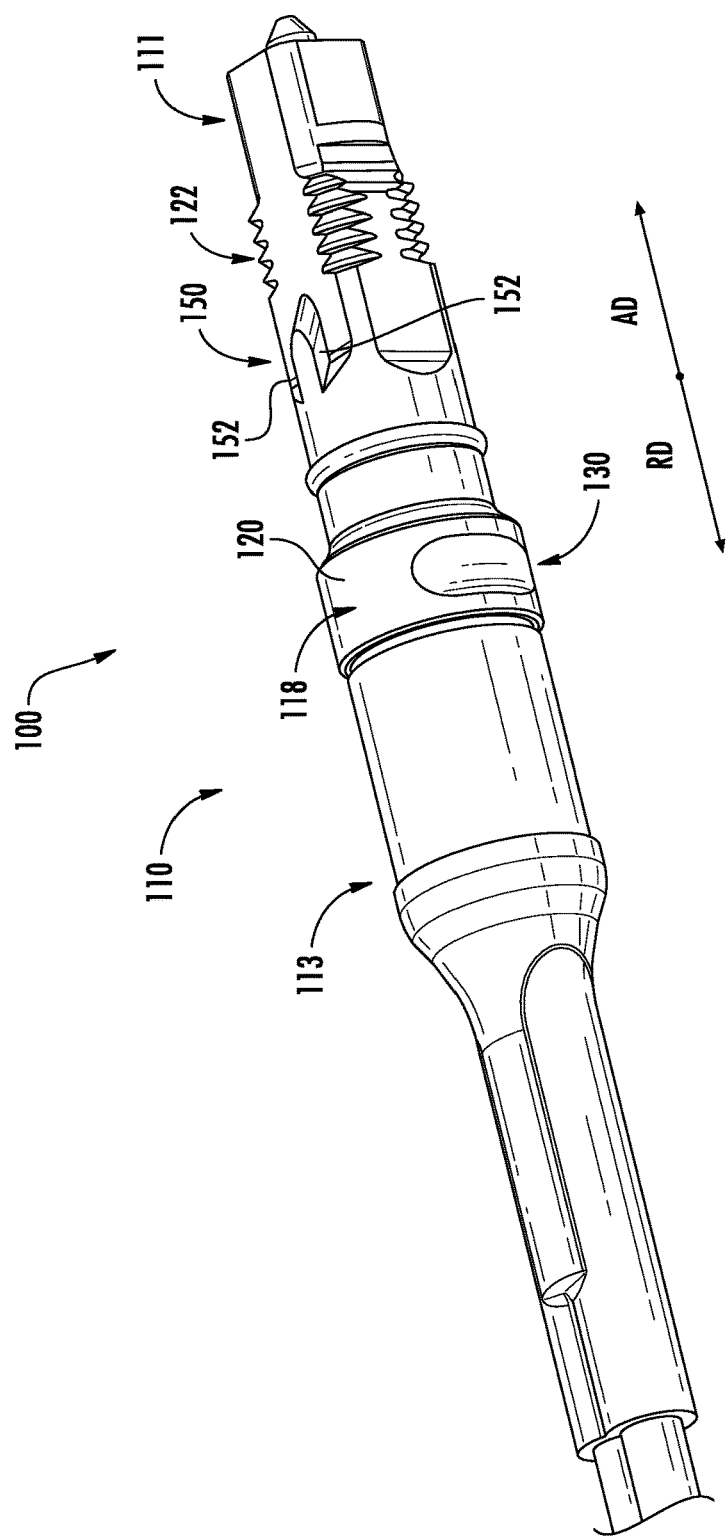
FIG. 15 schematically depicts a perspective view of another connector housing, according to one or more embodiments shown and described herein.

Referring to FIG. 15, a perspective view of another connector housing 110 is schematically depicted. In the embodiment depicted in FIG. 15, the contact surfaces 152 of the keying portion 150 extend outward as a positive surface projection from the connector housing 110, as compared to the recessed contact surfaces 152 described above. The contact surfaces 152 may be configured to engage with recessed contact surfaces of a port assembly to align the connector housing 110. Additionally, in the embodiment depicted in FIG. 15, the locking portion 130 is formed as a curved, concave surface recessed from the nominal housing portion 120, as compared to the locking portions 130 described above having the port engagement face 132 (FIG. 5). The concave surface of the locking portion 130 may be configured to engage with a push-button securing member 230 (FIG. 28) including opposing arms 274 (FIG. 28), as described in greater detail herein.

The fiber optic connectors 100 described above may be utilized to optically couple the optical fibers 12 (FIG. 3A) to other optical fibers. For example the fiber optic connectors 100 may be selectively coupled to an optical connector port to optically couple the optical fiber 12 (FIG. 3A) to another optical fiber positioned within the optical connector port. To facilitate the connection of multiple fiber optic connectors 100, "multiport" assemblies described herein may include multiple optical connector ports. The structure and configuration of example multiport assemblies and the interaction of the connector housing 110 of the fiber optic connectors 100 are described below.

Figure 16:
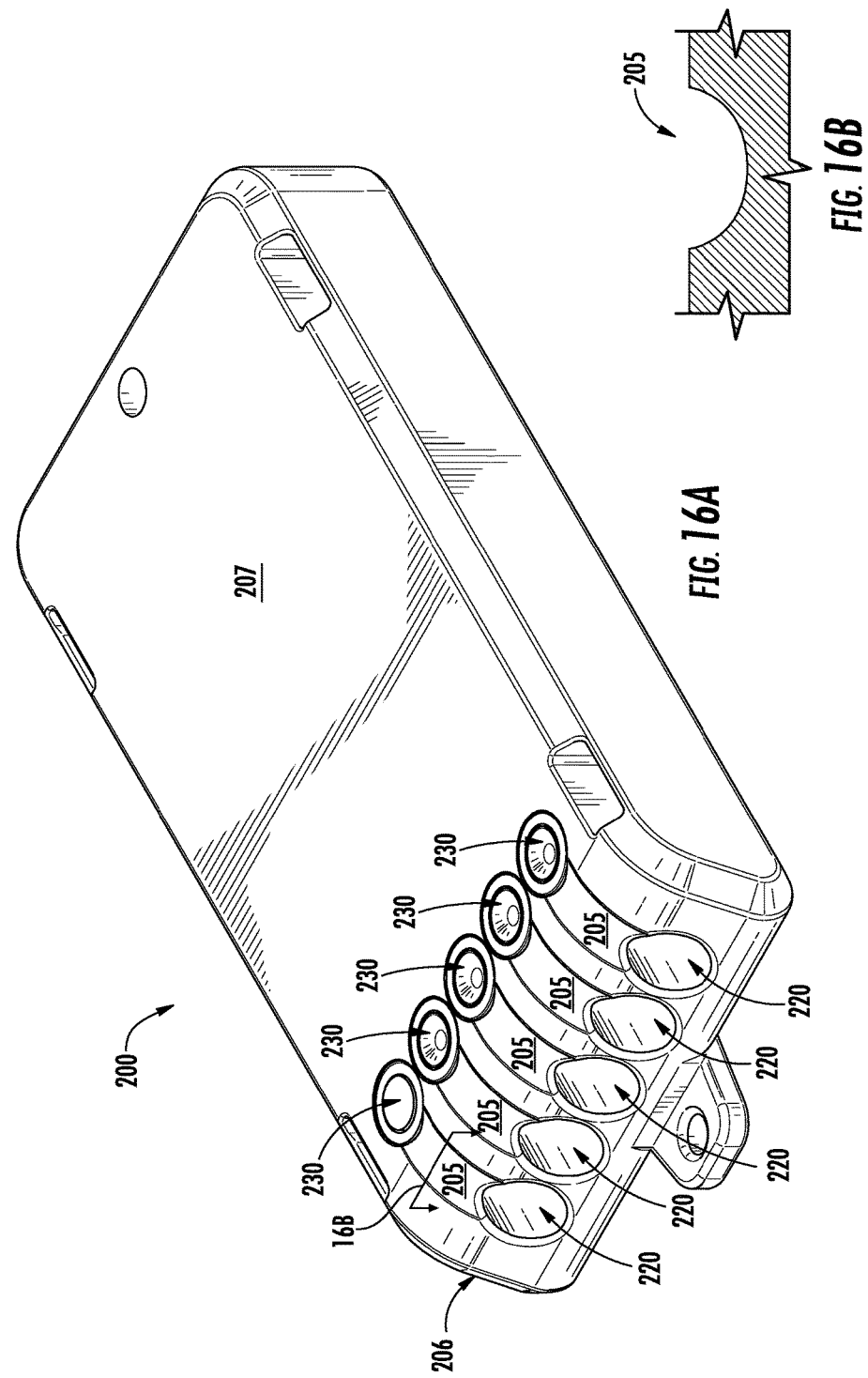
FIG. 16A schematically depicts a multiport assembly, according to one or more embodiments shown and described herein.
FIG. 16B schematically depicts a cross-section of the multiport assembly of FIG. 16A, according to one or more embodiments shown and described herein.

Referring collectively to FIGS. 16A and 16B, a perspective view of a multiport assembly 200 and a section view of the multiport assembly 200 along section 16B-16B are schematically depicted, respectively. The multiport assembly 200 generally includes a plurality of optical connection ports 220 that are configured to receive fiber optic connectors 100 (FIG. 1). In the embodiment depicted in FIG. 16A, the multiport assembly 200 includes five optical connection ports 220, however, it should be understood that multiport assemblies 200 according to the present disclosure may include any suitable number of optical connection ports 220. The multiport assembly 200 includes an upward-facing top surface 207 and an outward-facing front end 206. In embodiments, the multiport assembly 200 generally includes scallops 205 associated and aligned with each of the optical connection ports 220 and extending between the outward-facing front end 206 and the top surface 207. The scallops 205 generally include a cut-out extending into the outward-facing front end 206 and the top surface 207 of the multiport assembly 200 and may provide a tactile indication of the positioning of the optical connection ports 220 and a push-button securing member 230 associated with the optical connection port 220. For example, a user may insert a fiber optic connector 100 (FIG. 1) into the optical connection port 220, and/or may depress a push-button securing member 230 to remove a fiber optic connector 100 (FIG. 1) from the multiport assembly 200. In some settings, the multiport assembly 220 may be difficult to reach and/or the user may not have a direct line of sight to the optical connection port 220 and/or the push-button securing member 230, and the scallop 205 may provide tactile feedback to the user to locate the optical connection port 220 and/or the push-button securing member 230.

Figure 18:
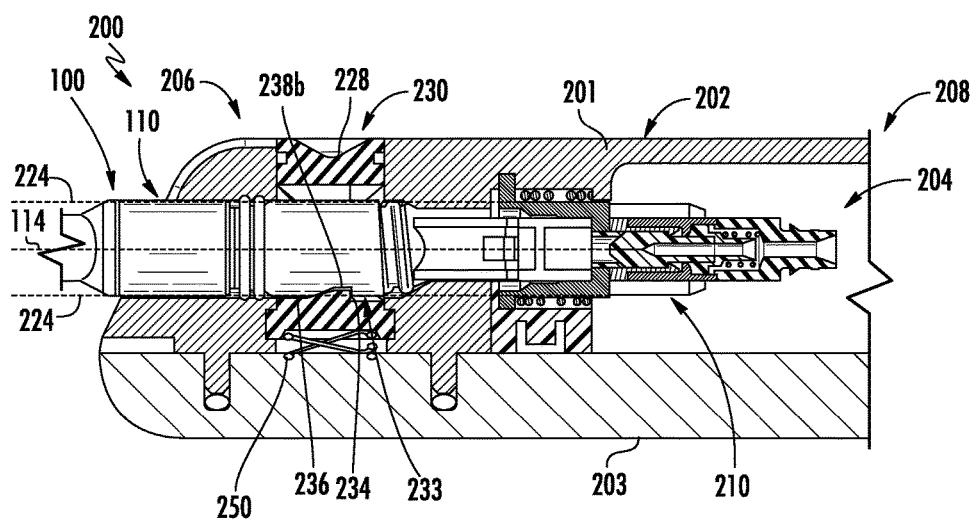
FIG. 18 schematically depicts a fiber optic connector inserted into the optical connector port of FIG. 17, according to one or more embodiments shown and described herein.

Referring collectively to FIGS. 17 and 18, a cross-section of one of the plurality of optical connection ports 220 without and with a fiber optic connector 100 positioned within the optical connection port 220 are schematically depicted, respectively. In embodiments the optical connection ports 220 are generally positioned at a front end 206 of the multiport assembly 200 and extend toward a rear end 208 of the multiport assembly 200 positioned opposite the front end 206. The multiport assembly 200 includes a shell 202 that defines a cavity 204 positioned within the shell 202. In the embodiment depicted in FIGS. 17 and 18, the shell 202 includes an upper member 201 that is coupled to a lower member 203 to form the shell 202. In other embodiments, the shell 202 may have a unitary construction, or may include multiple members coupled to one another to define the cavity 204.

In embodiments, the multiport assembly 200 includes a plurality of optical adapters 210 positioned in the cavity 204 that correspond to each of the optical connection ports 220. Each of the optical adapters 210 are structurally configured to receive, align, and optically couple dissimilar optical connectors. For example, the optical adapters 210 are configured to receive the fiber optic connector 100 on one side, and optically couple the fiber optic connector 100 to another fiber optic connector including a different shape.

Each of the optical connection ports 220 include a connection port passageway 222 that includes an open end positioned opposite the cavity 204 and that permits an external optical connector 100 to access a corresponding optical adapter 210 positioned within the cavity 204 of the shell 202. Each of the connection port passageways 222 define a connector insertion path 224 extending inward along the connection port passageway 222 to the optical adapter 210. The connector insertion path 224 generally defines the path a fiber optic connector 100 follows upon being inserted to the connection port passageway 222.

The multiport assembly 200 includes a plurality of push-button securing members 230, each of which intersect a corresponding connector insertion path 224. The push-button securing members 230 are movable in a direction that is transverse to the connection port passageway 222, as described in further detail herein.

Figure 21:
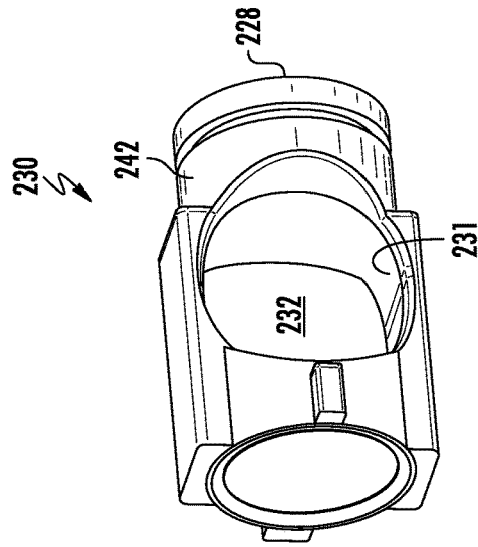
FIG. 21 schematically depicts a side perspective view of a push-button securing member of the multiport assembly of FIG. 16, according to one or more embodiments shown and described herein.
Figure 20:
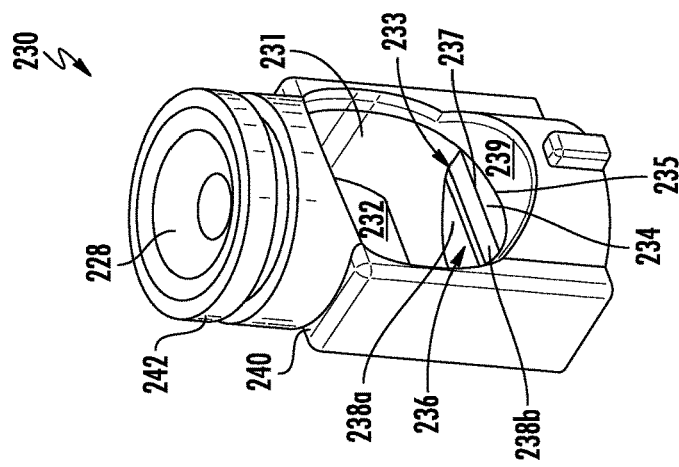
FIG. 20 schematically depicts a rear perspective view of a push-button securing member of the multiport assembly of FIG. 16, according to one or more embodiments shown and described herein.
Figure 19:
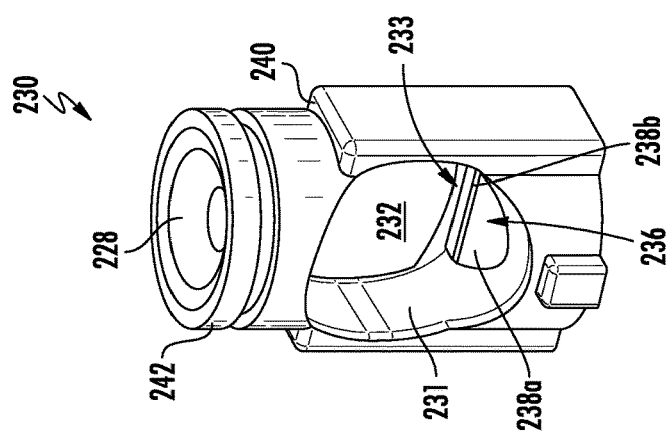
FIG. 19 schematically depicts a front perspective view of a push-button securing member of the multiport assembly of FIG. 16, according to one or more embodiments shown and described herein.

Referring collectively to FIGS. 19, 20, and 21, a rear perspective view, a front perspective view, and a side view of a push-button securing member 230 are schematically depicted, respectively. The push-button securing members 230 generally include a main body 242 and a retention portion 240 extending outward from the main body 242. The retention portion 240 may be configured to contact the shell 202 (FIG. 18) of the multiport assembly 200 (FIG. 18) and retain the push-button securing members 230 within the shell 202 of the multiport assembly 200. Each push-button securing member 230 generally defines a bore 232 extending through the push-button securing member 230, each bore 232 defining an inner perimeter 231. While the bore 232 depicted in FIGS. 19-21 is depicted as including a circular shape, it should be understood that the bore 232 may include any suitable shape for receiving a fiber optic connector 100 (FIG. 1). For example, in some embodiments, the bore 232 may include planar surfaces configured to interface with planar surfaces of a connector housing 110 (FIG. 13).

Each push-button securing member 230 includes a locking portion 233 including a connector engagement face 234 positioned on the bore 232. When installed to the multiport assembly 200 (FIG. 17), in some embodiments, the connector engagement face 234 is generally oriented transverse to the corresponding connector insertion path 224 (FIG. 17), and defines a locking portion recess 239 that is generally obstructed from the open end of the connector insertion path 224 (FIG. 17) by the connector engagement face 234. The connector engagement face 234 extends between an inner end 237 an outer end 235 positioned outward from the inner end 237, as evaluated from a center of the bore 232. In embodiments, the outer end 235 may include a rounded or chamfered edge, which may assist in preventing breakage of the outer end 235 when a connector housing 110 (FIG. 18) is forcibly removed from the connection port passageway 222 (FIG. 18), as described in greater detail herein.

In some embodiments, the outer end 235 is positioned on the inner perimeter 231 of the bore 232 such that the connector engagement face 234 extends inward from the inner perimeter 231. In other embodiments, the connector engagement face 234 may extend outward from the inner perimeter 231 of the bore 232. The push-button securing member 230 further includes a ramp 236 that extends between the inner perimeter 231 of the bore 232 to the inner end 237 of the connector engagement face 234, such that the ramp 236 is upward and forward facing when the push-button securing member 230 is positioned within the multiport assembly 200 (FIG. 17). The ramp 236 generally includes an ascending portion 238a that extends inward from the inner perimeter 231 of the bore 232 and a plateau portion 238b that extends between the ascending portion 238a and the inner end 237 of the connector engagement face 234. The ascending portion 238a of the ramp 236 is oriented to progressively constrict the corresponding connector insertion path 224 (FIG. 17).

Referring again to FIGS. 17 and 18, the plateau portion 238b of each of the push-button securing members 230 is generally aligned with the connector insertion path 224. In embodiments, the ramp 236 of each of the push-button securing members 230 is positioned forward of the connector engagement face 234 of the push-button securing members 230. In other words, the ramps 236 of each of the push-button securing members 230 are positioned closer to the front end 206 of the multiport assembly 200 than the connector engagement face 234 of the push-button securing member 230. In this way, the ramp 236 may contact a fiber optic connector 100 being inserted along the connector insertion path 224 prior to the connector engagement face 234, as described in greater detail herein.

In some embodiments, the connector engagement face 234 of each of the push-button securing members 230 defines a plane that is orthogonal to the connector insertion path 224. In other embodiments, the connector engagement face 234 of each of the push-button securing members 230 are oriented such that the inner end 237 (FIG. 20) of the connector engagement face 234 is positioned closer to the front end 206 of the multiport assembly 200 than the outer end 235 (FIG. 20) of the connector engagement face 234. In these embodiments, the connector engagement face 234 of each of the plurality of push-button securing members 230 defines a plane that intersects the corresponding connector insertion path 224 at an angle that is less than 30 degrees from perpendicular, such that the connector engagement face 234 faces rearward and upward. By orienting the connector engagement face 234 of each of the push-button securing members 230 rearward and upward, a fiber optic connector 100 may be removed from the multiport assembly 200 upon an application of force to the fiber optic connector 100 in a direction along the connector insertion path 224, as described in greater detail herein.

In embodiments, a resilient member 250 is engaged with each of the push-button securing members 230. The resilient members 250 may bias the push-button securing members 230, and may generally include a spring, such as and without limitation a compression spring, a tension spring, a torsion spring, or the like. In embodiments, the resilient members 250 include a spring constant of between about 10 newtons per millimeter and about 50 newtons per millimeter, inclusive of the endpoints. In another embodiment, the resilient members 250 include a spring constant of between about 12 newtons per millimeter and about 16 newtons per millimeter, inclusive of the endpoints. Increasing the spring constant may increase a force required to move the push-button securing members 230 between an engaged position and a disengaged position, as described in greater detail herein. The resilient members 250 may include a free length of between about 3 millimeters and about 20 millimeters, inclusive of the endpoints. In one embodiment, the resilient members 250 have a free length of between about 5 millimeters and about 8 millimeters, inclusive of the endpoints.

The push-button securing members 230 are repositionable between an engaged position, in which the locking portion 233 of each of the push-button securing members 230 is positioned within and intersects the corresponding connector insertion path 224, and a disengaged position, in which the locking portion 233 is spaced apart from the corresponding connector insertion path 224. More particularly, the push-button securing members 230 are repositionable between an engaged position, in which the connector engagement face 234 of each of the push-button securing members 230 is positioned within and intersects the corresponding connector insertion path 224, and a disengaged position, in which the connector engagement face 234 is spaced apart from the corresponding connector insertion path 224.

In embodiments, the resilient members 250 bias the push-button securing members 230 into the engaged position, such that a force must be applied to resilient members 250 to reposition the push-button securing members 230 into the disengaged position.

Figure 22:
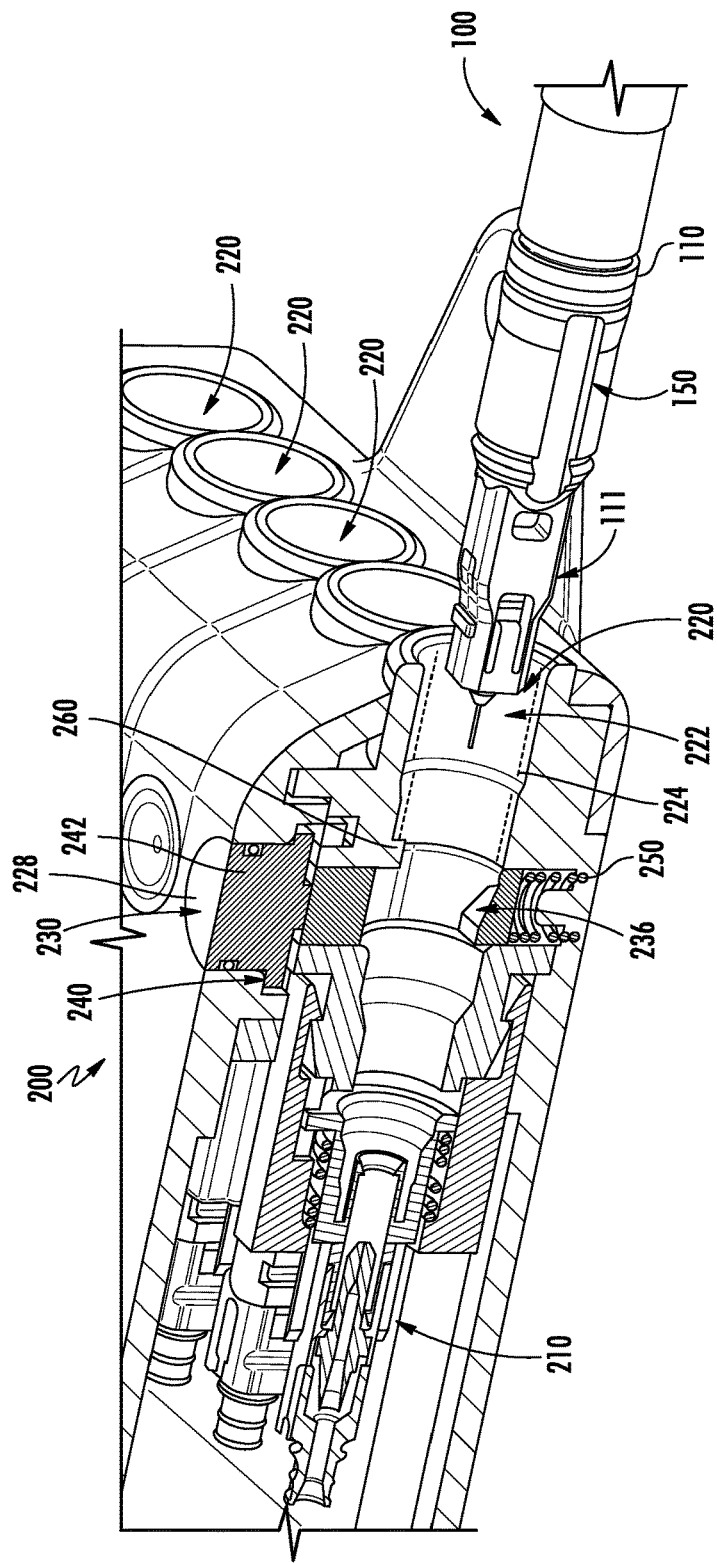
FIG. 22 schematically depicts a fiber optic connector approaching the multiport assembly of FIG. 16, according to one or more embodiments shown and described herein.

For example and referring to FIG. 22, a fiber optic connector 100 is depicted approaching an optical connection port 220. As shown in FIG. 22, the front portion 111 of the connector housing 110 is initially inserted within the connector insertion path 224 of the connection port passageway 222.

Figure 23:
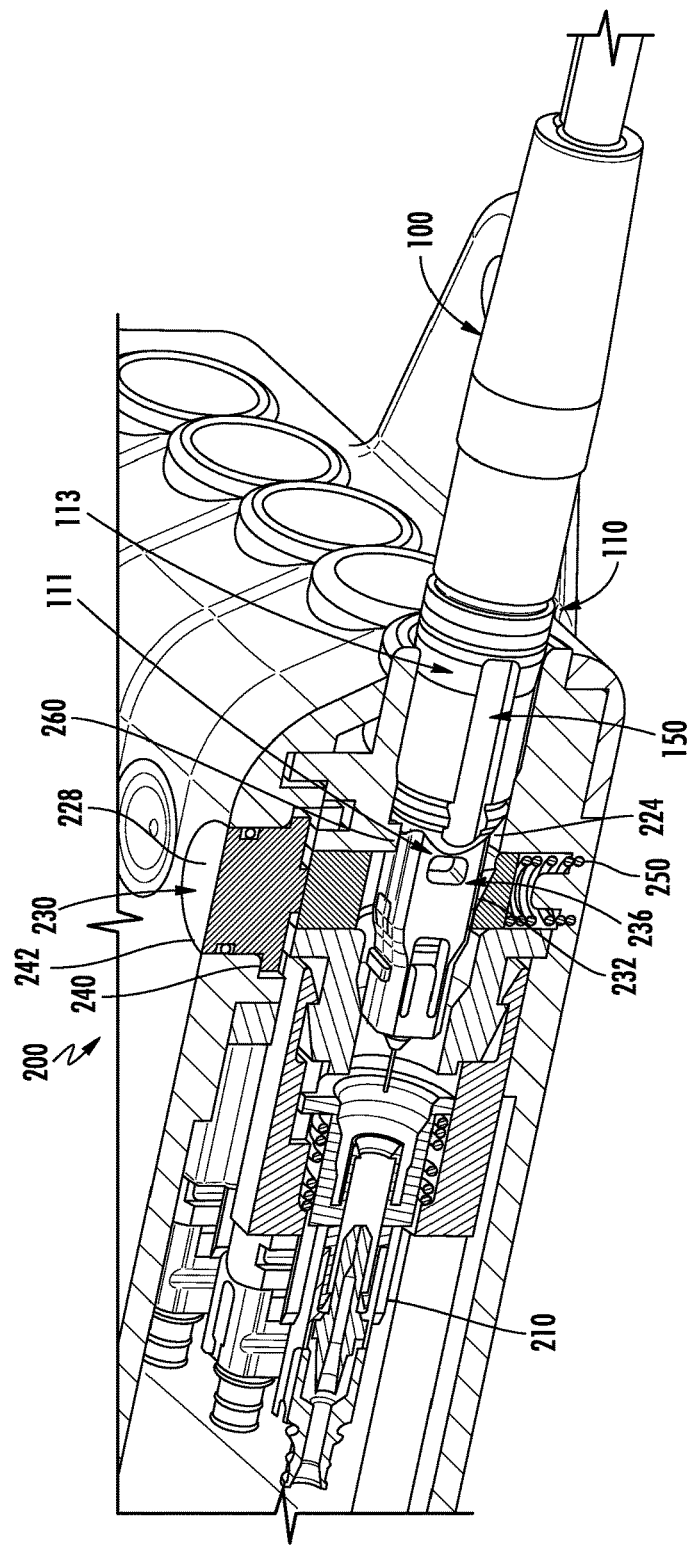
FIG. 23 schematically depicts the fiber optic connector inserted within an optical connection port of the multiport assembly of FIG. 16, according to one or more embodiments shown and described herein.

Referring to FIG. 23, as the fiber optic connector 100 is further inserted along the connector insertion path 224, the front portion 111 of the connector housing 110 may pass through the bore 232 of the push-button securing member 230. As described above, in some embodiments the perimeter of the front portion 111 of the connector housing 110 may be less than a perimeter of the rear portion 113 of the connector housing 110, and in some configurations, the front portion 111 of the connector housing may be sized to pass through the bore 232 of the push-button securing member 230 without contacting the ramp 236 of the push-button securing member 230.

Figure 24:
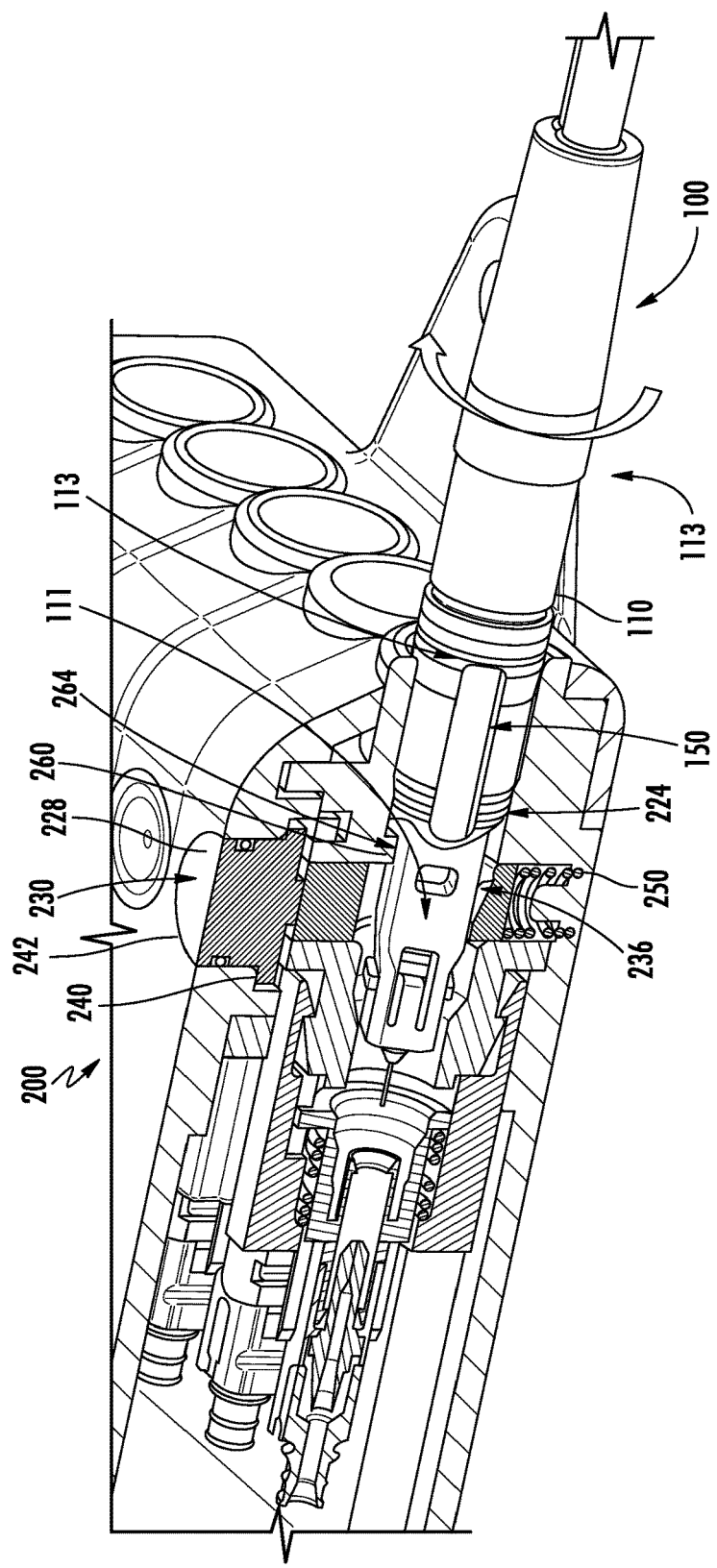
FIG. 24 schematically depicts the fiber optic connector further inserted within the optical connection port of the multiport assembly of FIG. 16, according to one or more embodiments shown and described herein.
Figure 25:
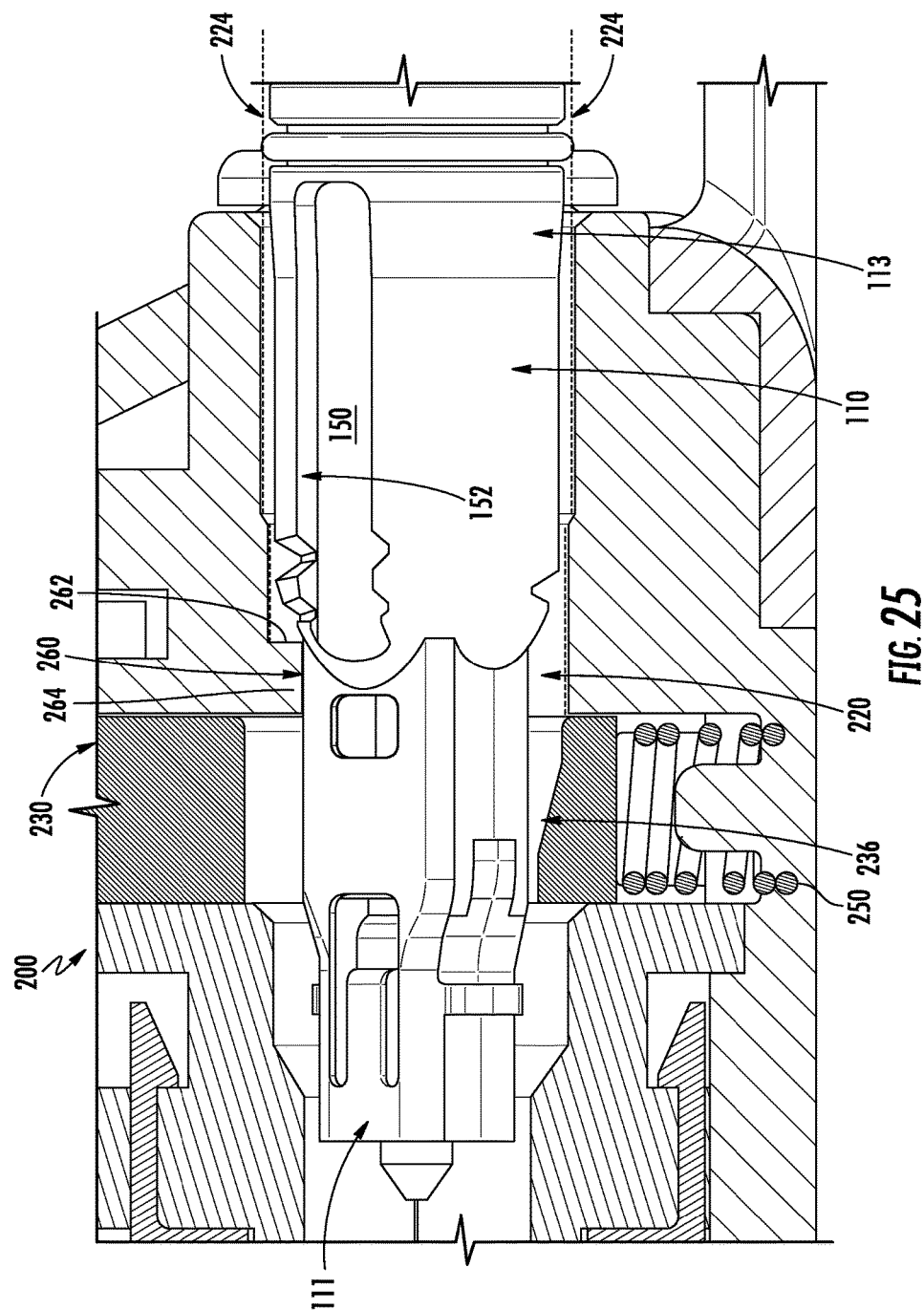
FIG. 25 schematically depicts a side cross-section view of the fiber optic connector inserted within the optical connection port of the multiport assembly of FIG. 16, according to one or more embodiments shown and described herein.

Referring collectively to FIGS. 24 and 25, the optical connector port 220 includes a rotationally discrete keying portion 260 extending inward into the connector insertion path 224. The rotationally discrete keying portion 260 comprises includes rotationally discrete contact surfaces, more particularly a forward-facing surface 262 that is oriented to face the open end of the connection port passageway 222, and one or more lateral-facing surfaces 264 that are configured to engage the contact surfaces 152 of the keying portion 150 of the connector housing 110. Through engagement with the contact surfaces 152 of the keying portion 150 of the connector housing 110, the lateral-facing surfaces 264 are structurally configured to inhibit rotation of the connector housing 110 when inserted into the connection port passageway 222. Each of the rotationally discrete contact surfaces of the keying portion 260 of the multiport assembly 200 have an unobstructed line of sight with an open end of the connection port passageway 222.

As shown in FIGS. 24 and 25, in some instances, the fiber optic connector 100 may be inserted to the connection port passageway 222 with the keying portion 150 of the connector housing 110 mis-aligned with the corresponding keying portion 260 of the connection port passageway 222. In the embodiment depicted in FIGS. 24 and 25, the keying portion 150 of the connector housing 110 includes a recessed portion of the connector housing and the keying portion 260 of the connection port passageway 222 extends inward into the connector insertion path 224. As such the keying portion 260 may mechanically interfere with portions of the connector housing 110 other than the keying portion 150 of the connector housing 110, preventing further insertion of the connector housing 110, as shown in FIGS. 24 and 25. Instead, the connector housing 110 must be rotated to align the keying portion 150 of the connector housing 110 with the keying portion 260 of the connection port passageway 222 to allow further insertion of the connector housing 110 into the connection port passageway 222. In some configurations rotational alignment of the keying portion 150 of the connector housing 110 with the keying portion 260 of the connection port passageway 222 may assist in maintaining a suitable optical connection between the optical fiber 12 (FIG. 3A) with an optical fiber positioned in the optical adapter 210. For example and without being bound by theory, in some configurations, signal loss between the optical fiber 12 (FIG. 3A) and an optical fiber positioned in the optical adapter 210 may depend on the rotational position of the optical fiber 12 (FIG. 3A) with respect to the optical fiber positioned in the optical adapter 210. As such, the optical fiber 12 (FIG. 3A) may be positioned within the connector housing 110 such that the optical fiber 12 is rotationally aligned with the optical fiber positioned in the optical adapter 210 when the keying portion 150 is aligned with the keying portion 260 of the connection port passageway 222.

As described above, in some embodiments, the keying portion 150 of the connector housing 110 includes a positive surface projection (see e.g., FIG. 14), as compared to the recessed keying portion 150 depicted in FIG. 25. In these embodiments, the keying portion 260 of the connection port passageway 222 may include a complementary recessed keying portion 260 that similarly restricts insertion of the connector housing 110 unless the keying portion 150 of the connector housing 110 is rotationally aligned with the keying portion 260 of the connection port passageway 222.

Figure 26:
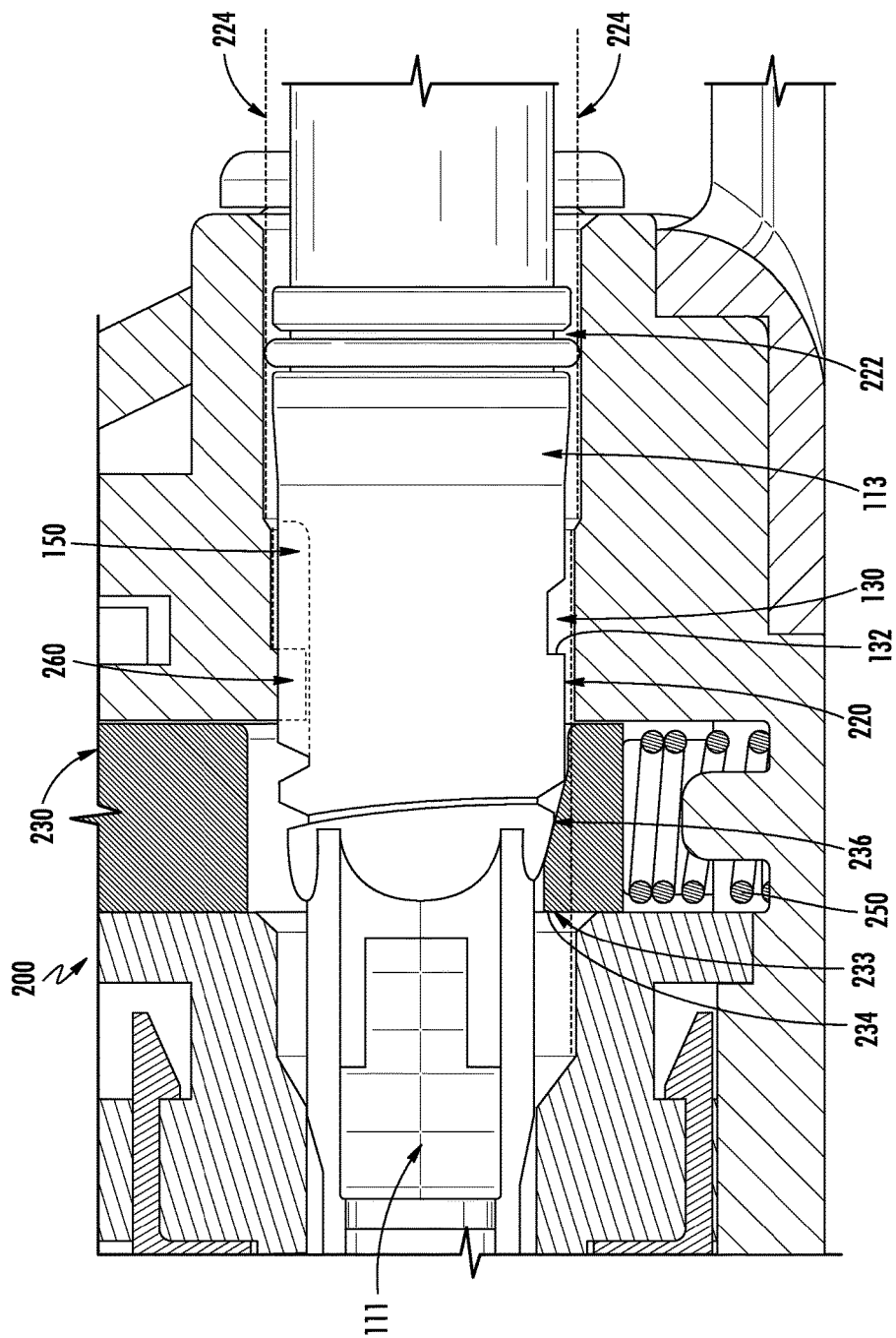
FIG. 26 schematically depicts the fiber optic connector engaging a push-button securing member of the multiport assembly of FIG. 16, according to one or more embodiments shown and described herein.

Referring to FIG. 26, with the keying portion 150 of the connector housing 110 aligned with the keying portion 260 of the connection port passageway 222, the connector housing of the fiber optic connector 100 may be further inserted into the connection port passageway 222. As the connector housing 110 of the fiber optic connector 100 is further inserted, the connector housing 110 contacts the ramp 236 of the push-button securing member 230. As described above, the ramp 236 is oriented to be upward and forward facing. As such, as the connector housing 110 is further inserted into the, axial force exerted on the ramp 236 as the connector housing 110 is inserted may be resolved into downward force applied to the push-button securing member 230. The downward force applied to the push-button securing member 230 moves the push-button securing member 230 downward in a vertical direction that is transverse to the connector insertion path 224, and the locking portion 233 including the connector engagement face 234 of the push-button securing member 230 may be moved out of the connector insertion path 224, thereby moving the push-button securing member 230 into the disengaged position. As described above, in embodiments, the resilient member 250 is engaged with the push-button securing member 230 and biases the push-button securing member 230 into the engaged position. Accordingly, in these embodiments, the biasing force of the resilient member 250 must be overcome to move the push-button securing member 230 into the disengaged position.

Figure 27:
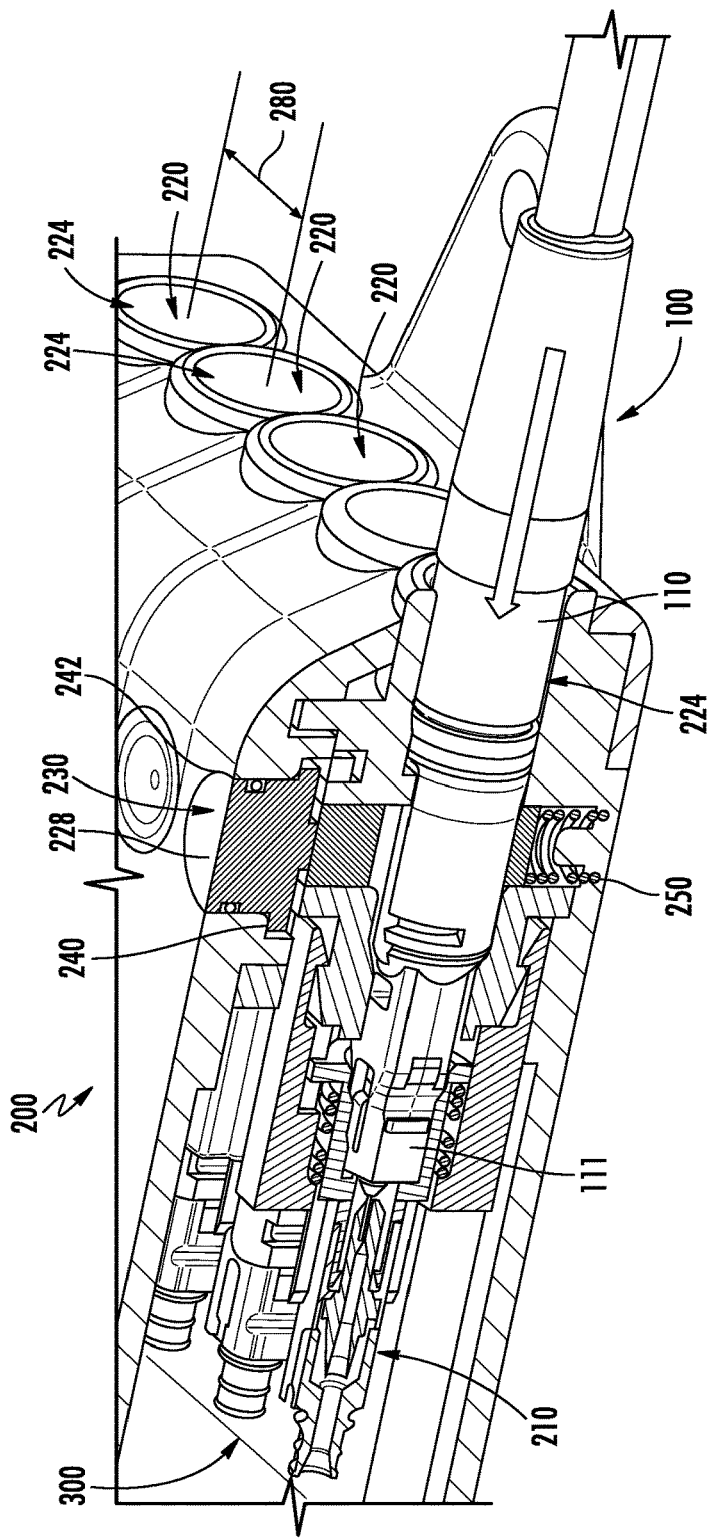
FIG. 27 schematically depicts the fiber optic connector fully inserted to the optical connection port of the multiport assembly of FIG. 16, according to one or more embodiments shown and described herein.

Referring to FIG. 27, when the fiber optic connector 100 is fully inserted to the connection port passageway 222, the front portion 111 of the connector housing 110 may be engaged with the optical adapter 210. Additionally, the push-button securing member 230 may be re-positioned back into the engaged position. More particularly, the port engagement face 132 (FIG. 26) of the connector housing 110 may be engaged with the connector engagement face 234 of the push-button securing member 230, and the ramp 236 (FIG. 26) of the push-button securing member 230 may be positioned within the locking portion recess 134 (FIG. 26) of the connector housing 110. Engagement between the connector engagement face 234 (FIG. 17) of the push-button securing member 230 (FIG. 17) with the port engagement face 132 (FIG. 17) of the connector housing 110 inhibits axial movement of the connector housing along the retracting direction of the fiber optic connector 100 with respect to the multiport assembly 200, selectively coupling the connector housing 110 to the multiport assembly 200. Further, the retention portion 240 of the push-button securing member 230 may strike and contact the shell 202 as the push-button securing member 230 is repositioned to the engaged position, which may produce an audible sound. A user inserting the connector housing 110 may utilize the auditory sound of the retention portion 240 hitting the shell 202 as confirmation that the connector housing 110 is fully inserted and is selectively coupled to the multiport assembly 200.

As best illustrated in the cross-section shown in FIG. 18, a gap may be positioned between the locking portion recess 134 of the connector housing and the ramp 236 of the push-button securing member 230, such that only the port engagement face 132 of the connector housing 110 contacts the push-button securing member 230. In this way, minimal vertical forces may be transmitted from the push-button securing member 230 to the connector housing 110, which may assist in maintaining alignment of the connector housing 110 with the optical adapter 210.

While in FIGS. 22-27, a single optical connector port 220 is shown in cross-section as described above, it should be understood that the other optical connector ports 220 of the multiport assembly 200 may be substantially the same. With the fiber optic connector 100 inserted into the optical connector port 220 and selectively coupled to the push-button securing member 230, the optical fiber 12 (FIG. 1) of the fiber optic connector 100 may be optically coupled to another optical fiber positioned within the optical adapter 210, forming a fiber optic junction 300. By moving from the engaged position to the disengaged position with the insertion of a fiber optic connector 100, and then back to the engaged position upon the full insertion of the fiber optic connector 100, a user may selectively couple the fiber optic connector 100 to the multiport assembly 200 with one hand. In this way, the multiport assembly 200 and the connector housing 110 of the present disclosure may provide a significant benefit over conventional port assemblies which may require the use of two hands to manipulate a bayonet connection, a locking nut connection, or the like.

Furthermore and referring to FIG. 27, the use of push-button securing members 230 that are selectively positioned within a connector insertion path 224 may allow a distance between adjacent optical connection ports 220 to be reduced as compared to conventional port assemblies. For example, some conventional port assemblies utilize bayonet connections and/or locking nut connections, each of which require connection components positioned radially outward of a connector insertion path. By contrast, the push-button securing members 230 of the present disclosure generally intersect the connector insertion paths 224, minimizing the need for connection components positioned outward of the connector insertion paths 224. As such, the distance between adjacent optical connection ports 220 may be reduced, allowing an increase in an overall density of optical connection ports 220 on the multiport assembly 200. For example, in the embodiment depicted in FIG. 27, adjacent optical connection ports 220 may be spaced apart by a distance 280 evaluated between central axes 282 extending along the connector insertion paths 224 of the optical connection ports 220. In embodiments, the distance 280 may be less than about 13 millimeters. Furthermore, while the embodiment depicted in FIG. 21 shows optical connection ports 220 extending across the multiport assembly 200 in a lateral direction, it should be understood that it is contemplated that multiport assemblies 200 according to the present disclosure maybe positioned in any suitable orientation with respect to one another, and may be positioned on top of one another in the vertical direction.

Referring again to FIG. 17, to remove the fiber optic connector 100 from the multiport assembly, the push-button securing member 230 is moved from the engaged position back into a disengaged position by moving the push-button securing member 230 downward in a direction that is transverse to the central axis 282 extending along the connector insertion path 224 (e.g., in the vertical direction as depicted). For example, the push-button securing members 230 may be moved to the disengaged position by depressing a top surface 228 of the push-button securing member 230 to overcome the biasing force of the resilient member 250. In one embodiment, the push-button securing member may be repositioned into the disengaged position under a force exceeding a predetermined threshold between 5 newtons and 50 newtons applied to the push-button securing member 230 in a direction that is transverse to the axis extending along the corresponding connector insertion path 224. In another embodiment, the push-button securing member 230 may be repositioned into the disengaged position under a force exceeding a predetermined threshold between 20 newtons and 25 newtons applied to the push-button securing member 230 in a direction that is transverse to the axis extending along the corresponding connector insertion path 224.

In embodiments, each push-button securing member 230 is configured to permit forcible nondestructive disengagement of an external optical connector 100 from the locking portion 233 of the push-button securing member 230 upon application of a force on the external optical connector 100 in a direction along the central axis 282 extending along the corresponding connector insertion path 224. For example, in embodiments, the push-button securing members 230 are configured to be repositioned into the disengaged position upon the application of a force on the optical connector 100, transmitted to the push-button securing member 230 through the engagement between the connector engagement face 234 of the push-button securing member 230 and the port engagement face 132 of the connector housing 110. As described above, one or both of the connector engagement face 234 of the push-button securing member 230 and the port engagement face 132 of the connector housing 110 may be oriented at an angle with respect to the vertical direction as depicted (i.e., the port engagement face 132 of the connector housing at an angle from perpendicular with the longitudinal axis 114, and the connector engagement face 234 at an angle from perpendicular with respect to the connector insertion path 224). As such, a force applied to the connector housing 110 in an axial direction (i.e., along the connector insertion path 224) may be resolved into a vertical force applied to the push-button securing member 230 by the connector engagement face 234 of the push-button securing member 230 and/or the port engagement face 132 of the connector housing 110. The vertical force may reposition the push-button securing member 230 into the disengaged position.

Furthermore, as described above, the outer end 133 (FIG. 3) of the port engagement face 132 of the connector housing 110 and/or the outer end 235 (FIG. 20) of the connector engagement face 234 of the push-button securing member 230 include chamfered or rounded edges. The chamfered and/or rounded edges of the outer end 133 (FIG. 3) of the port engagement face 132 of the connector housing 110 and/or the outer end 235 (FIG. 20) of the connector engagement face 234 of the push-button securing member 230 may reduce point forces on the connector housing 110 and/or the push-button securing member 230 as the push-button securing member 230 is repositioned into the disengaged position. By reducing point forces on the connector housing 110 and/or the push-button securing member 230, breakage of the connector housing 110 and/or the push-button securing member 230 may be reduced.

In one embodiment, the plurality of push-button securing members 230 are each moved to the disengaged position upon the application upon the application of the force on the external optical connector 100 exceeding a predetermined threshold of between 20 newtons and 500 newtons, inclusive of the endpoints. In some embodiments, the plurality of push-button securing members 230 are each moved to the disengaged position upon the application of the force on the external optical connector 100 exceeding a predetermined threshold of 20 newtons and 25 newtons. As such, a fiber optic connector may be removed from the multiport assembly 200 upon the application of a predetermined force. This selective disengagement may assist in reducing damage to the multiport assembly 200 and/or the fiber optic connector 100, for example in instances when unanticipated or undesired forces are applied to the fiber optic connector 100.

The force required to reposition the plurality of push-button securing members 230 into the disengaged position is related to the relative orientation of the port engagement face 132 of the connector housing 110 and the connector engagement face 234 of the push-button securing member 230 and can be tailored as desired. For example, as described above, the port engagement face 132 is generally oriented to lie in a plane that intersects the longitudinal axis 114 at an angle that is 30 degrees or less from perpendicular, and is oriented to be rearward and outward facing. Increasing the angle from perpendicular of the port engagement face 132 with respect to the longitudinal axis 114 (e.g., orienting the port engagement face 132 to be more downward facing) may reduce the force required to remove the fiber optic connector 100, as more of the axial force on the connector housing 110 may be resolved into the vertical direction. Conversely, as the angle of the port engagement face 132 with respect to the longitudinal axis 114 approaches perpendicular, the force required to remove the fiber optic connector 100 will increase, as less of the axial force on the connector housing 110 is resolved into the vertical direction.

Similarly, as described above, the connector engagement face 234 of each of the push-button securing members 230 defines a plane that intersects the corresponding connector insertion path 224 at an angle that is less than 30 degrees from perpendicular, such that the connector engagement faces 234 face rearward and upward. Increasing the angle from perpendicular of the connector engagement face 234 with respect to the connector insertion path 224 (e.g., orienting connector engagement face 234 to be more upward facing) may reduce the force required to remove the fiber optic connector 100, as more of the axial force on the connector housing 110 may be resolved into the vertical direction. Conversely, as the angle of the connector engagement face 234 with respect to the connector insertion path 224 approaches perpendicular, the force required to remove the fiber optic connector 100 will increase, as less of the axial force on the connector housing 110 is resolved into the vertical direction. In this way the orientation of the port engagement face 132 of the connector housing 110 and the connector engagement face 234 of the push-button securing members 230 may be tailored to achieve a desired force required to remove the connector housing 110 from the multiport assembly 200.

In some embodiments as described above, the port engagement face 132 may include a locking face 135 (FIG. 3B) and a release face 137 (FIG. 3B). In these embodiments, the locking face 135 (FIG. 3B) may be configured to engage a connector engagement face 234 of a push-button securing member 230 that is oriented orthogonal to the connector insertion path 224, thereby securing the connector housing 110 such that the connector housing 110 cannot be forcibly removed from the multiport assembly 200. In particular, as neither the connector engagement face 234 of the push-button securing member 230 or the locking face 135 of the port engagement face 132 resolve axial force applied to the connector housing into a vertical direction (i.e., as both the locking face 135 (FIG. 3B) and the connector engagement face 234 of the push-button securing member 230 are oriented in the vertical direction), the connector housing 110 may not be removed by axial force applied to the connector housing 110. In other configurations, the release face 137 (FIG. 3B) may be configured to engage a connector engagement face 234 of a push-button securing member 230, such that axial force applied to the connector housing 110 may resolve into a vertical force, and the connector housing may be forcibly removed from the multiport assembly as described above. Accordingly, connector housings 110 including the port engagement face 132 with both the locking face 135 (FIG. 3B) and the release face 137 (FIG. 3B) may selectively be removable from multiport assemblies 200 including push-button securing members 230 that engage the release face 137 (FIG. 3B), while may be fixedly attached to multiport assemblies 200 including push-button securing members 200 that engage the locking face 135 (FIG. 3B).

Figure 28:
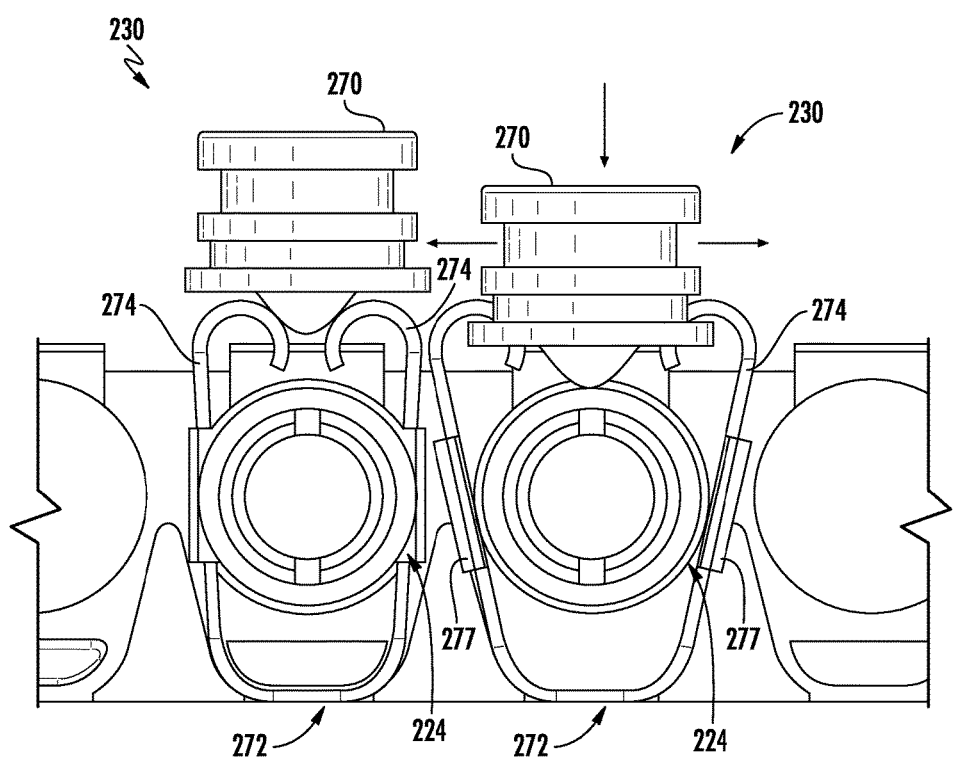
FIG. 28 schematically depicts a front view of another push-button securing member according to one or more embodiments shown and described herein.

Referring now to FIG. 28, another embodiment of a push-button securing member 230 is schematically depicted. In the embodiment depicted in FIG. 28, the push-button securing member 230 includes a push-button 270 and a securing member 272 including a pair of opposing arms 274 that are selectively deformable between the engaged position and the disengaged position, in and out of the connector insertion path 224, respectively. In the embodiment depicted in FIG. 28, the pair of opposing arms 274 are elastically deformable in an outward direction from the connector insertion path 224 upon the depression of the push-button 270. In some configurations, the opposing arms 274 are configured to engage a concave locking portion 130 (FIG. 15) of a connector housing 110.

Figure 29:
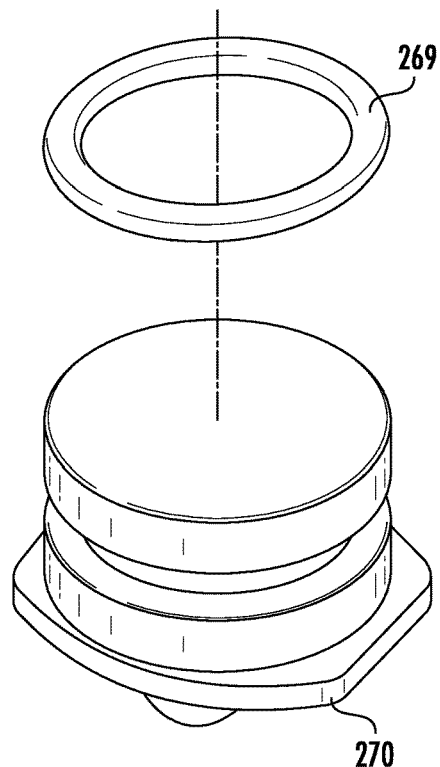
FIG. 29 schematically depicts a top view of a push-button of the push-button securing member of FIG. 28, according to one or more embodiments shown and described herein.
Figure 30:
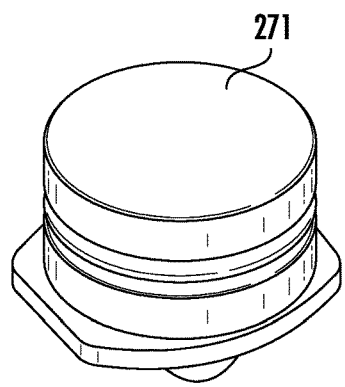
FIG. 30 schematically depicts another top view of the push-button of the push-button securing member of FIG. 28 with an o-ring seated to the push-button, according to one or more embodiments shown and described herein.
Figure 31:
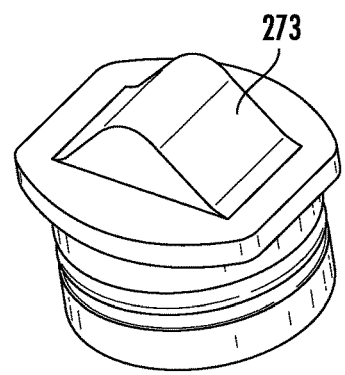
FIG. 31 schematically depicts a bottom view of the push-button of FIG. 29, according to one or more embodiments shown and described herein.

Referring collectively to FIGS. 29-31, top perspective views and a bottom perspective view of the push-button 270 are schematically depicted respectively. In some embodiments, such as the embodiments depicted in FIGS. 29-31, the push-button 270 includes a planar top surface 271 and optionally includes an o-ring 269 that is seated on the push-button 270. Referring particularly to FIG. 31, in embodiments the push-button 270 includes a wedge 273 positioned on a bottom surface that is configured to engage and reposition the opposing arms 274 (FIG. 28) into the disengaged position.

Figure 32:
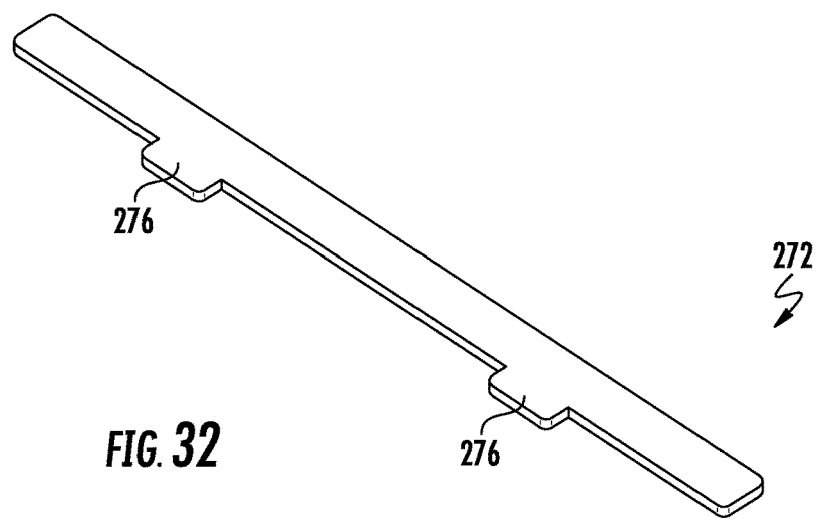
FIG. 32 schematically depicts a blank for making the push-button securing member of FIG. 28, according to one or more embodiments shown and described herein.
Figure 33:
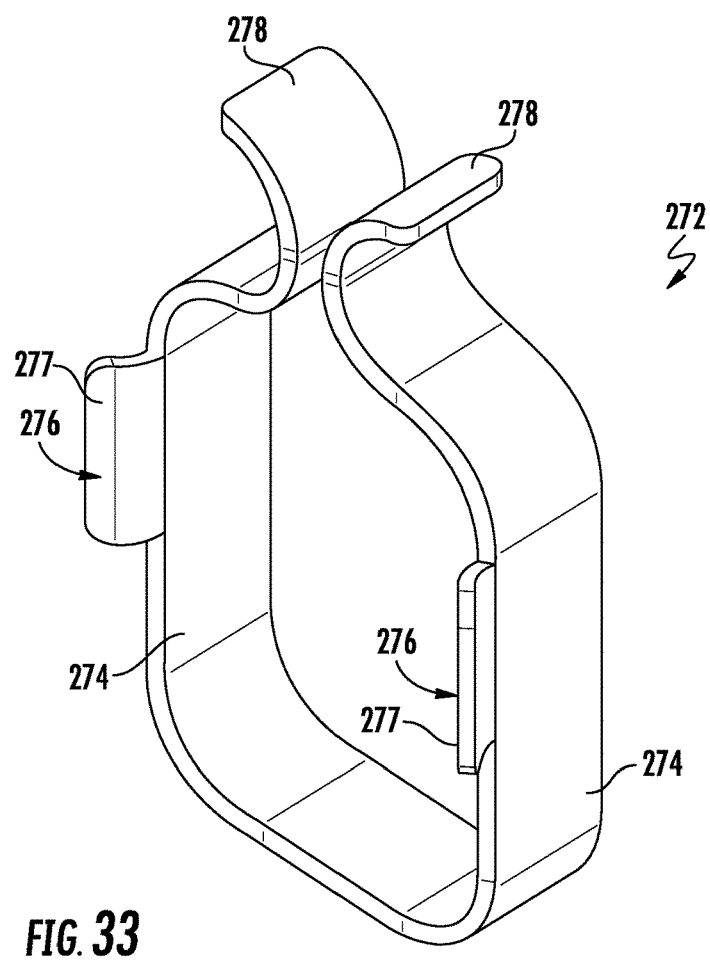
FIG. 33 schematically depicts the push-button securing member of FIG. 28 in isolation, according to one or more embodiments shown and described herein.

Referring to FIGS. 32 and 33, a perspective view of a blank that may be used to form the securing member 272 and a perspective view of a formed securing member 272 are depicted, respectively. The securing member 272 includes the opposing arms 274 that are configured to engage and retain a connector housing 110 (FIG. 27). The securing member 272 further includes tabs 276 that are positioned on and extend outward from the opposing arms 274. Each of the tabs 276 include a flange 277 oriented transverse to the connector insertion path 224 (FIG. 28). The flanges 277 may be configured to engage the connector housing 110 (FIG. 27) and move the opposing arms 274 outward as the connector housing 110 (FIG. 27) is inserted along the connector insertion path 224. The securing member 272 further includes push-button flanges 278 positioned at a top end of the securing member 272. The push-button flanges 278 are oriented to face upward and are configured to engage the push-button 270, such that when the push-button 270 is depressed, the opposing arms 274 move outward to the disengaged position. In embodiments, the securing member 272 may be selected such that the opposing arms 274 may selectively deform outward the application of the force on the external optical connector 100 exceeding a predetermined threshold between 20 newtons and 25 newtons.

Figure 34:
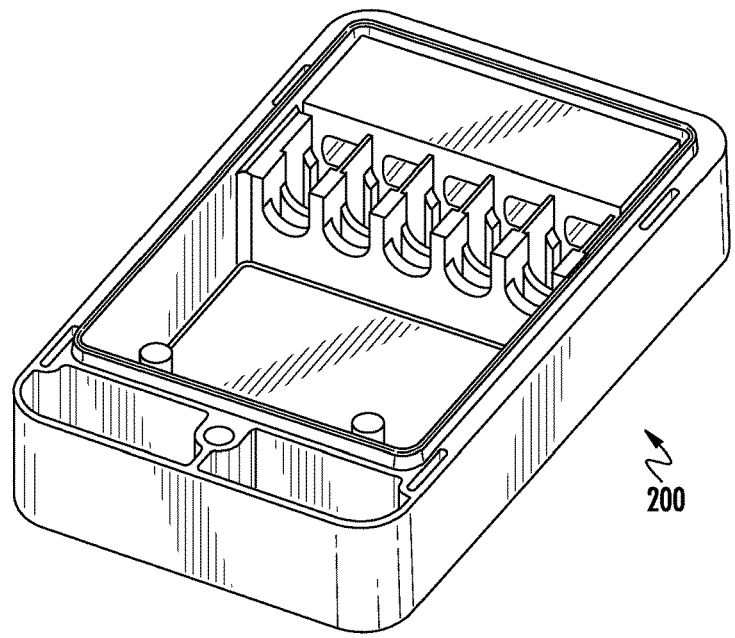
FIG. 34 schematically depicts another multiport assembly including a push-button securing member, according to one or more embodiments shown and described herein.
Figure 35:
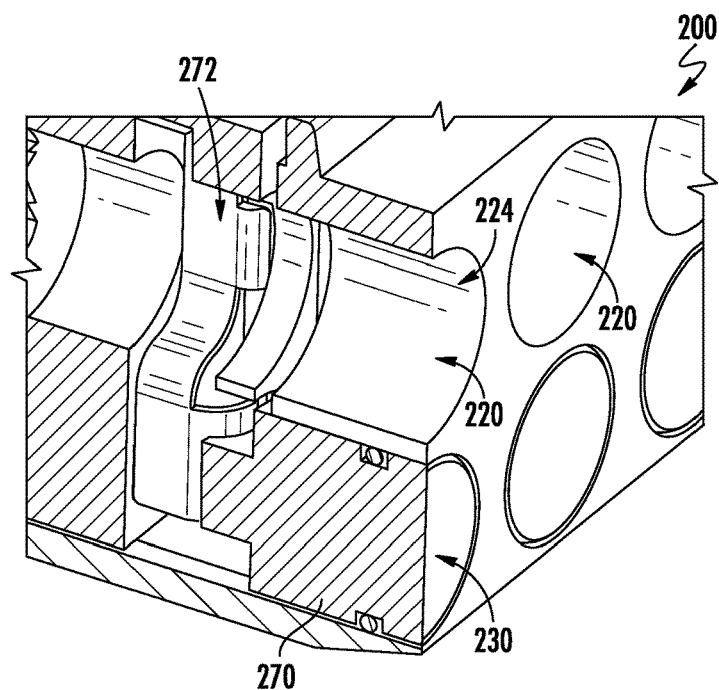
FIG. 35 schematically depicts a cross section of the multiport assembly and push-button securing member of FIG. 34, according to one or more embodiments shown and described herein.
Figure 36:
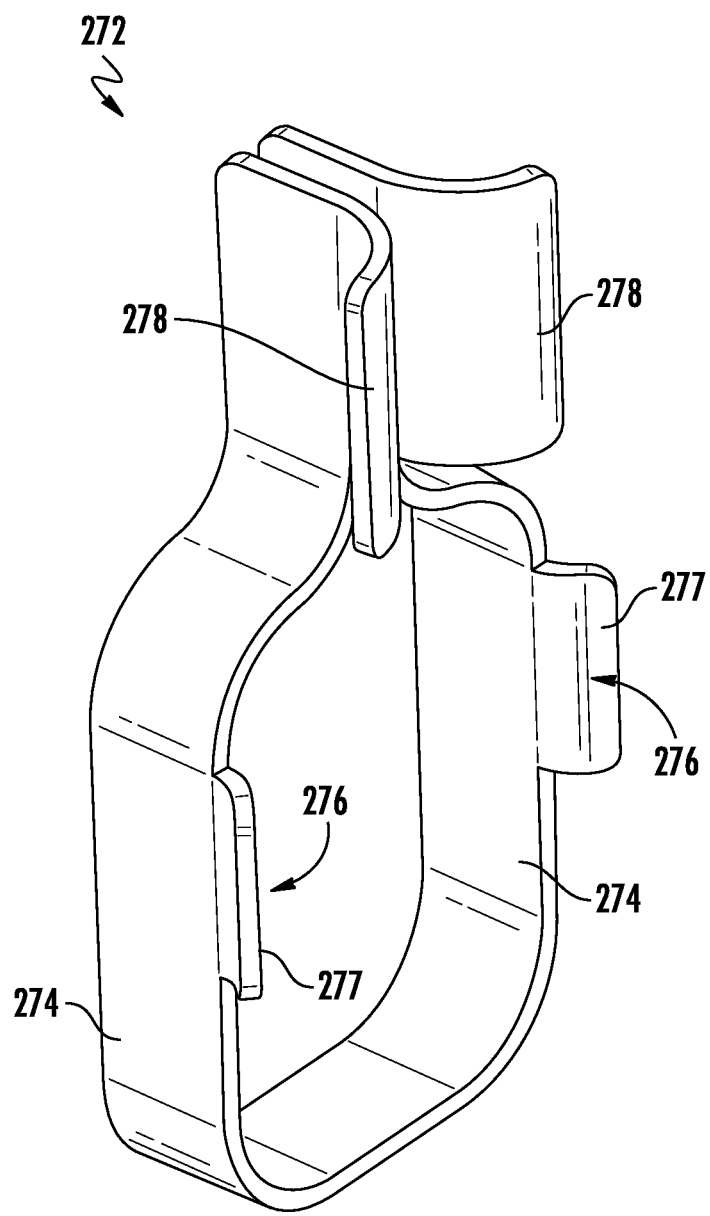
FIG. 36 schematically depicts the push-button securing member of FIG. 34 in isolation, according to one or more embodiments shown and described herein.

Referring to FIGS. 34-36, another embodiment of the push-button securing member 230 is schematically depicted. Like the embodiment described above with respect to FIGS. 28-33, the push-button securing member 230 includes a securing member 272 with selectively deformable arms 274, each having tabs 276 with flanges 277 that are oriented transverse to the connector insertion path 224. However, in this embodiment, the push-button flanges 278 are oriented to face outward and in the same direction as the flanges 277 on the opposing arms 274. This allows for the push-button 270 to be positioned in-line with the connector insertion path 224, as depicted in FIG. 35.

Accordingly, it should now be understood that embodiments described herein include fiber optic connectors including connector housings having a locking portion that selectively engages a push-button securing member of a multiport assembly to selectively couple the fiber optic connector to the multiport assembly. The locking portion of the connector housing and/or the push-button securing member of the multiport assembly may be configured to allow forcible, non-destructive disengagement of the connector housing from the multiport assembly upon the application of a predetermined force to the connector housing. In this way, damage to the multiport assembly and/or the fiber optic connector resulting from unexpected or unintended forces applied to the connector housing may be minimized.

In embodiments, the push-button securing members may generally intersect a connection port passageway of the multiport assembly, which may reduce the need for securing features positioned on the perimeter of the connection port passageway. By reducing the need for securing features positioned on the perimeter of the connection port passageway, adjacent connection port passageways on the multiport assembly may be positioned closer to one another such that a greater number of connection port passageways to be included in a multiport assembly without increasing the overall size of the multiport assembly. Furthermore, the push-button securing members may be configured to automatically engage a connector housing upon the full insertion of the connector housing to the connection port passageway, such that a user may selectively couple the connector housing to the multiport assembly with one hand, thereby simplifying the connection of the connector housing to the multiport assembly. The connector housings may further include a keying portion that selectively engages a corresponding keying portion of the multiport assembly to ensure and maintain the rotational orientation of the fiber optic connector with the multiport assembly.

It is noted that recitations herein of a component of the present disclosure being "structurally configured" in a particular way, to embody a particular property, or to function in a particular manner, are structural recitations, as opposed to recitations of intended use. More specifically, the references herein to the manner in which a component is "structurally configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A connectorized fiber optic cable assembly comprising a ferrule, a connector housing, a cable adapter, a fiber optic cable, and a type SC conversion housing, wherein:
   the connector housing comprises
      a ferrule retaining portion,
      an adapter seating portion,
      a longitudinal axis extending transversely from a leading edge plane of the front portion of the connector housing, through the ferrule retaining portion and the adapter seating portion of the connector housing, to a rear portion of the connector housing,
      a rotationally discrete keying portion defined on the outer surface of the connector housing,
      a rotationally discrete locking portion defined on the outer surface of the connector housing, and
      a nominal housing portion defined on an outer surface of the connector housing and interrupted by the keying portion and the locking portion of the connector housing;
   the ferrule comprises a 2.5 millimeter nominal ferrule diameter, is retained by the ferrule retaining portion of the connector housing, and comprises an optical fiber bore;
   the keying portion of the connector housing comprises at least one rotationally discrete contact surface that is structurally configured to inhibit rotation of the connector housing about the longitudinal axis when engaged with a complementary keying portion of an optical connector port;
   the locking portion of the connector housing comprises a rearwardly facing port engagement face and a locking portion recess that is positioned rearward of the port engagement face;
   the locking portion recess of the locking portion is obstructed from the leading edge plane of the connector housing along the advancing direction of the fiber optic connector by the port engagement face;
   the port engagement face of the locking portion is structurally configured to inhibit axial movement of the connector housing along a retracting direction of the fiber optic connector when engaged with a complementary locking portion of an optical connector port;
   the cable adapter comprises an optical cable passageway, an optical fiber passageway, a housing insert portion seated in the adapter seating portion of the connector housing to align the optical cable passageway and the optical fiber passageway with the longitudinal axis of the connector housing, and an adapter abutment limiting an extent to which the cable adapter extends into the adapter seating portion of the connector housing;
   the fiber optic cable extends along the optical cable passageway of the cable adapter and comprises an optical fiber extending along optical fiber passageway of the cable adapter and the optical fiber bore of the ferrule; and
   the connector housing comprises a line of sight from the keying portion to the leading edge plane of the connector housing that is obstructed only by the type SC conversion housing along an advancing direction of the fiber optic connector.

2. A connectorized fiber optic cable assembly comprising a ferrule, a connector housing, a cable adapter, a fiber optic cable, and a hardened conversion housing, wherein:
   the connector housing comprises
      a ferrule retaining portion,
      an adapter seating portion,
      a longitudinal axis extending transversely from a leading edge plane of the front portion of the connector housing, through the ferrule retaining portion and the adapter seating portion of the connector housing, to a rear portion of the connector housing,
      a rotationally discrete keying portion defined on the outer surface of the connector housing,
      a rotationally discrete locking portion defined on the outer surface of the connector housing, and
      a nominal housing portion defined on an outer surface of the connector housing and interrupted by the keying portion and the locking portion of the connector housing;
   the ferrule comprises a 2.5 millimeter nominal ferrule diameter, is retained by the ferrule retaining portion of the connector housing, and comprises an optical fiber bore;
   the keying portion of the connector housing comprises at least one rotationally discrete contact surface that is structurally configured to inhibit rotation of the connector housing about the longitudinal axis when engaged with a complementary keying portion of an optical connector port;
   the locking portion of the connector housing comprises a rearwardly facing port engagement face and a locking portion recess that is positioned rearward of the port engagement face;
   the locking portion recess of the locking portion is obstructed from the leading edge plane of the connector housing along the advancing direction of the fiber optic connector by the port engagement face;
   the port engagement face of the locking portion is structurally configured to inhibit axial movement of the connector housing along a retracting direction of the fiber optic connector when engaged with a complementary locking portion of an optical connector port;
   the cable adapter comprises an optical cable passageway, an optical fiber passageway, a housing insert portion seated in the adapter seating portion of the connector housing to align the optical cable passageway and the optical fiber passageway with the longitudinal axis of the connector housing, and an adapter abutment limiting an extent to which the cable adapter extends into the adapter seating portion of the connector housing;

the fiber optic cable extends along the optical cable passageway of the cable adapter and comprises an optical fiber extending along optical fiber passageway of the cable adapter and the optical fiber bore of the ferrule;

the hardened conversion housing comprises a pair of opposing fingers comprising opposing interior faces that extend parallel to, and are arranged symmetrically about, the longitudinal axis of the connector housing;

a finger spacing between the opposing interior faces of the opposing fingers is between 10.80 millimeters and 10.85 millimeters;

a finger depth along a direction parallel to the longitudinal axis of the connector housing is between 8.45 millimeters and 8.55 millimeters;

a finger width along a direction perpendicular to the finger depth and the longitudinal axis of the connector housing is less than 10 millimeters;

outer faces of the opposing fingers lie along a common outside diameter of between 15.75 millimeters and 15.85 millimeters;

an outer face of one of the opposing fingers is truncated in a plane parallel to the opposing interior faces to define a truncated span e of between about 14.75 millimeters and about 14.95 millimeters, extending from the outer face of the truncated opposing finger to the outer face of the opposite finger; and the connector housing comprises a line of sight from the keying portion to the leading edge plane of the connector housing that is obstructed only by the hardened conversion housing along an advancing direction of the fiber optic connector.

3. A connectorized fiber optic cable assembly comprising a ferrule, a connector housing, a cable adapter, a fiber optic cable, and a type SC conversion housing, wherein:

the connector housing comprises a ferrule retaining portion positioned at a front portion of the connector housing, an adapter seating portion, a longitudinal axis extending transversely from a leading edge plane of the front portion of the connector housing, through the ferrule retaining portion and the adapter seating portion of the connector housing, to a rear portion of the connector housing, a nominal housing portion defined on an outer surface of the connector housing, and a locking portion defined on the outer surface of the connector housing and interrupting the nominal housing portion of the connector housing;

the locking portion of the connector housing comprises a port engagement face that extends inward from the nominal housing portion of the connector housing toward the longitudinal axis and is oriented transverse to the longitudinal axis;

the locking portion of the connector housing further comprises a locking portion recess positioned rearward of the port engagement face of the locking portion and inward of the nominal housing portion of the connector housing;

the locking portion recess is oriented transverse to the port engagement face of the locking portion and comprises a planar surface extending across at least a portion of the outer surface of the connector housing;

the ferrule comprises a 2.5 millimeter nominal ferrule diameter, is retained by the ferrule retaining portion of the connector housing, and comprises an optical fiber bore;

the cable adapter comprises an optical cable passageway, an optical fiber passageway, a housing insert portion seated in the adapter seating portion of the connector housing to align the optical cable passageway and the optical fiber passageway with the longitudinal axis of the connector housing, and an adapter abutment limiting an extent to which the cable adapter extends into the adapter seating portion of the connector housing;

the fiber optic cable extends along the optical cable passageway of the cable adapter and comprises an optical fiber extending along optical fiber passageway of the cable adapter and the optical fiber bore of the ferrule;

the type SC conversion housing surrounds the ferrule retaining portion of the connector housing and a portion of the connector housing rearward of the ferrule retaining portion of the connector housing; and the type SC conversion housing is positioned forward of the locking portion of the connector housing along the longitudinal axis of the connector housing such that the type SC conversion housing would present potential interfere with engagement of the locking portion of the connector housing with a securing member of an optical port.

4. A connectorized fiber optic cable assembly comprising a ferrule, a connector housing, a cable adapter, a fiber optic cable, and a hardened conversion housing, wherein:

the connector housing comprises a ferrule retaining portion positioned at a front portion of the connector housing, an adapter seating portion, a longitudinal axis extending transversely from a leading edge plane of the front portion of the connector housing, through the ferrule retaining portion and the adapter seating portion of the connector housing, to a rear portion of the connector housing, a nominal housing portion defined on an outer surface of the connector housing, and a locking portion defined on the outer surface of the connector housing and interrupting the nominal housing portion of the connector housing;

the locking portion of the connector housing comprises a port engagement face that extends inward from the nominal housing portion of the connector housing toward the longitudinal axis and is oriented transverse to the longitudinal axis;

the locking portion of the connector housing further comprises a locking portion recess positioned rearward of the port engagement face of the locking portion and inward of the nominal housing portion of the connector housing;

the locking portion recess is oriented transverse to the port engagement face of the locking portion and comprises a planar surface extending across at least a portion of the outer surface of the connector housing;

the ferrule comprises a 2.5 millimeter nominal ferrule diameter, is retained by the ferrule retaining portion of the connector housing, and comprises an optical fiber bore;

the cable adapter comprises an optical cable passageway, an optical fiber passageway, a housing insert portion seated in the adapter seating portion of the connector housing to align the optical cable passageway and the optical fiber passageway with the longitudinal axis of the connector housing, and an adapter abutment limiting an extent to which the cable adapter extends into the adapter seating portion of the connector housing;

the fiber optic cable extends along the optical cable passageway of the cable adapter and comprises an optical fiber extending along optical fiber passageway of the cable adapter and the optical fiber bore of the ferrule;

the hardened conversion housing comprises a pair of opposing fingers comprising opposing interior faces that extend parallel to, and are arranged symmetrically about, the longitudinal axis of the connector housing;

a finger spacing between the opposing interior faces of the opposing fingers is between 10.80 millimeters and 10.85 millimeters;

a finger depth along a direction parallel to the longitudinal axis of the connector housing is between 8.45 millimeters and 8.55 millimeters;

a finger width along a direction perpendicular to the finger depth and the longitudinal axis of the connector housing is less than 10 millimeters;

outer faces of the opposing fingers lie along a common outside diameter of between 15.75 millimeters and 15.85 millimeters;

an outer face of one of the opposing fingers is truncated in a plane parallel to the opposing interior faces to define a truncated span e of between about 14.75 millimeters and about 14.95 millimeters, extending from the outer face of the truncated opposing finger to the outer face of the opposite finger; and the hardened conversion housing surrounds the ferrule retaining portion of the connector housing and the locking portion of the connector housing to interfere with engagement of the locking portion of the connector housing with a securing member of an optical port.

* * * * *

UNITED STATES PATENT AND TRADEMARK OFFICE
CERTIFICATE OF CORRECTION

PATENT NO. : 10,386,584 B2
APPLICATION NO. : 16/018997
DATED : August 20, 2019
INVENTOR(S) : Joel Christopher Rosson et al.

Page 1 of 1

It is certified that error appears in the above-identified patent and that said Letters Patent is hereby corrected as shown below:

In the Claims

In Column 33, Line 28, Claim 2, after "span" delete "e".

In Column 36, Line 9, Claim 4, after "span" delete "e".

Signed and Sealed this
Twenty-fourth Day of December, 2019

Andrei Iancu
*Director of the United States Patent and Trademark Office*